(12) United States Patent
Ito et al.

(10) Patent No.: US 7,212,329 B2
(45) Date of Patent: May 1, 2007

(54) LIGHT EMITTING UNIT AND IMAGE TAKING APPARATUS

(75) Inventors: Yoshihiro Ito, Asaka (JP); Nobuaki Nago, Asaka (JP); Takashi Kato, Minami-Ashigara (JP); Hitoshi Miyano, Saitama (JP)

(73) Assignees: Fujifilm Corporation, Tokyo (JP); Fujinon Corporation, Tokyo (JP)

( * ) Notice: Subject to any disclaimer, the term of this patent is extended or adjusted under 35 U.S.C. 154(b) by 62 days.

(21) Appl. No.: 11/211,601

(22) Filed: Aug. 26, 2005

(65) Prior Publication Data

US 2006/0056008 A1 Mar. 16, 2006

(30) Foreign Application Priority Data

Aug. 26, 2004 (JP) ............................. 2004-246638
Mar. 10, 2005 (JP) ............................. 2005-067038
Aug. 19, 2005 (JP) ............................. 2005-238427

(51) Int. Cl.
*G02B 26/00* (2006.01)
(52) U.S. Cl. .................................................... 359/296
(58) Field of Classification Search ................ 359/296, 359/666; 430/32, 34, 38; 345/105, 107; 204/600, 450
See application file for complete search history.

(56) References Cited

U.S. PATENT DOCUMENTS 6,268,092 B1 * 7/2001 Akashi et al. ................. 430/7

6,919,003 B2 * 7/2005 Ikeda et al. .................. 204/490

FOREIGN PATENT DOCUMENTS

JP 2002-341311 A 11/2002

OTHER PUBLICATIONS

Philips' Fluid Lenses, in Digital Photography Review (dpreview.com), Mar. 3, 2004.

* cited by examiner

*Primary Examiner*—Ricky Mack
*Assistant Examiner*—Tuyen Tra
(74) *Attorney, Agent, or Firm*—Sughrue Mion, PLLC

(57) ABSTRACT

The present invention provides a light emitting unit that can accurately control the light output angle and/or direction over long period and an image taking apparatus provided with the light emitting unit. The light emitting unit has a light source, a reflector provided at the back surface of the light source and an optical member provided at the front of the light source. The optical member having: a container which is light-transmissive at least in a light passage region; a light-transmissive dispersion medium enclosed in the container; a dispersoid which is dispersed in the dispersion medium, which is light-transmissive, and which has a refractive index different from the refractive index of the dispersion medium. The optical member controls the output angle and/or direction of the light emitted from the light source and reflected by the reflector by moving the dispersoid using electromagnetic force.

22 Claims, 39 Drawing Sheets

(a)

(b)

LIGHT EMITTING UNIT AND IMAGE TAKING APPARATUS

BACKGROUND OF THE INVENTION

1. Field of the Invention

The present invention relates to a light emitting unit for emitting light and an image taking apparatus provided with the light emitting unit for performing image taking operation of a subject.

2. Description of the Related Art

As a light emitting unit for emitting light, a flashlight unit is known which has a light emitting tube for emitting flashlight and a reflector (reflecting cap) for reflecting flashlight emitted from the light emitting tube, and in which the angle through which flashlight is distributed is reduced by bringing the light emitting tube closer to the reflector or increased by moving the light emitting tube away from the reflector to perform adjustment for suitably irradiating a subject with the distributed flashlight according to a picture taking condition. Such a flashlight unit, however, requires a mechanism for moving the light emitting tube, which is a hindrance to reducing the size of the flashlight unit.

An arrangement is then taken into consideration in which a variable-focus lens such as one described below is provided in front of the light emitting tube instead of the mechanism for moving the light emitting tube, and in which the refractive index of the variable-focus lens is changed to perform adjustment for suitably irradiating a subject with the distributed flashlight from the light emitting tube. This arrangement eliminates the need for the mechanism for moving the light emitting tube and ensures that the light emitting unit can be implemented in a compact construction.

As a light emitting unit for emitting light, an auxiliary light emitting device for automatic focusing (AF) is also known which assists an AF function by emitting distance-measuring auxiliary light from a light source (light emitting diode (LED)) at the time of picture taking at a low luminance. Distance-measuring auxiliary light emitted from the AF auxiliary light emitting device is radiated to a subject and a focusing operation is performed on the basis of distance-measuring auxiliary light reflected by the subject. In this focusing operation, continuous AF processing based on a so-called "mountain climbing method" is performed. That is, an in-focus position is determined in such a manner that a focusing lens is gradually moved to a position corresponding to the maximum of an evaluated focus value while moving the focusing lens in small steps forward and rearward along the optical axis and checking the direction of increase/reduction in the evaluated focus value.

Ordinarily, an AF auxiliary light emitting device is placed with an offset from the optical axis according to a layout. Therefore, the direction in which distance-measuring auxiliary light is emitted from the AF auxiliary light emitting device intersects the optical axis. For this reason, the light emitting device has a drawback in that the focal length of the lens that can be covered by the distance-measuring auxiliary light is limited to a restricted region and a remote position cannot be reached by the distance-measuring auxiliary light. To overcome this drawback, a larger light source for emitting distance-measuring auxiliary light may be used. However, an increase in size of the light source is undesirable from the viewpoint of reducing the size of the AF auxiliary light emitting device and a problem that the power consumption is increased arises.

A method for adjustment may then be taken into consideration in which a variable-focus lens described below is provided in front of a light source and the refractive index of the variable-focus lens is changed to perform adjustment for suitably irradiating a subject with flashlight emitted from the light source. This method eliminates the need for a larger light source and enables implementation of an AF auxiliary light emitting device in a compact construction while limiting the power consumption.

As a variable-focus lens capable of changing the focal length, a liquid crystal lens capable of changing the focal length by using the electro-optic effect of a liquid crystal is known. For example, Japanese Patent Laid-Open No. 2002-341311 (hereafter referred to as a patent document 1) discloses a liquid crystal lens having first and second light-transmissive substrates in the form of a flat plate, a third light-transmissive substrate having two concave surfaces and provided between the first and second light-transmissive substrates, and a liquid crystal enclosed in each of a space between the first and third light-transmissive substrates and a space between the second and third light-transmissive substrates. In this liquid crystal lens, the orientation of liquid crystal molecules is changed according to the level of an applied voltage to change the refractive index of the liquid crystal lens. The focal length of the lens is thereby changed.

A fluid lens which can be changed in shape by application of a voltage to change its focal length is also known as a variable-focus lens. For example, a fluid lens in which an immiscible fluid constituted of a non-electroconductive oil and an electroconductive aqueous solution is enclosed in a tube having its inner wall surface covered with a water-repellent coating is proposed in "Philips' Fluid Lenses", [online], Mar. 03, 2004, Royal Philips Electronics, [searched on Mar. 31, 2004], Internet <URL: ns.asp>(hereafter referred to as a non-patent document 1). In this fluid lens, when no voltage is applied, the aqueous solution constituting the immiscible fluid is a semispherical mass and the interface of the aqueous solution on the oil is convex. This interface changes between the convex state and a concave state according to the level of the applied voltage. Consequently, the radius of curvature of the lens can be changed and the focal length of the lens is freely variable.

In the technique disclosed in the patent document 1, the focal length of the lens is changed by using the difference $\Delta n(n\|-n\zeta)$ between the refractive index $(n\|)$ in the major-axis direction and the refractive index $(n\zeta)$ in the minor-axis direction of liquid crystal molecules. However, there is a problem that the difference $\Delta n$ is so small that the refractive index of the lens cannot be freely changed. In a case where this liquid crystal lens is used in the above-described flashlight unit, therefore, a problem arises that the angle through which flashlight is output cannot be freely changed. Also, in a case where the liquid crystal lens is used in the above-described AF auxiliary light emitting device, a problem arises that the direction in which distance-measuring auxiliary light is output cannot be freely changed.

In the technique proposed in the non-patent document 1, the focal length of the fluid lens is changed by applying a voltage to the immiscible fluid. When a voltage is applied to the immiscible fluid, a current flows through the electroconductive aqueous solution constituting the immiscible fluid. Therefore, there is a risk of the aqueous solution being decomposed by electrolysis to generate hydrogen and oxygen, and there is a problem that during use over a long time period a gas constituted of generated hydrogen and oxygen is accumulated to form bubbles which scatter light and deteriorate the performance of the lens. In a case where the fluid lens is used in the above-described flashlight unit, a problem arises that it is difficult to output light through an increased output angle with accuracy during use over a long time period. Also, in a case where the fluid lens is used in the above-described AF auxiliary light emitting device, a problem arises that it is difficult to output light in a direction with accuracy during use over a long time period.

SUMMARY OF THE INVENTION

The present invention has been made in view of the above circumstances and provides a light emitting unit in a compact construction capable of freely controlling the light output angle and/or output direction with high accuracy over a long time period and an image taking apparatus provided with the light emitting unit.

The present invention provides a light emitting unit having a light source, and an optical member provided in front of the light source, the optical member outputting light emitted from the light source by expanding the light through a predetermined output angle and/or by setting the direction of output of the light to a predetermined output direction, the optical member having a container which is light-transmissive at least in a light passage region, a light-transmissive dispersion medium enclosed in the container, a dispersoid which is dispersed in the dispersion medium, which is light-transmissive, and which has a refractive index different from the refractive index of the dispersion medium, and an electromagnetic field generator controlling the output angle and/or the output direction of the light emitted from the light source and passing through the light passage region by moving the dispersoid dispersed in the dispersion medium using electromagnetic force.

The light emitting unit of the present invention has the optical member provided in front of the light source, the optical member outputting light emitted from the light source by expanding the light through a predetermined output angle, outputting the light in a predetermined output direction, or outputting the light by expanding the light through the predetermined output angle and setting the direction of output of the light to the predetermined output direction. This optical member is an optical element which controls the output angle and/or the output direction of the light emitted from the light source and passing through the light passage region by moving the dispersoid using electromagnetic force which is dispersed in the light-transmissive dispersion medium enclosed in the container, which is light-transmissive, and which has a refractive index different from that of the dispersion medium. That is, the optical member is an optical element which controls the light output angle and/or output direction according to a refractive index determined by the dispersion medium and the amount of the dispersoid moved into the light passage region. The dispersoid dispersed in the dispersion medium is moved by an electric field and magnetic field produced by the electromagnetic field generator, and no current is caused through the dispersion medium. Therefore, the risk of electrolysis is reduced in comparison of the technique using a current flowing through an electroconductive aqueous solution as proposed in the non-patent document 1. Consequently, the deterioration of the performance of the optical member can be limited over a long time period. The light emitting unit of the present invention is provided with this optical member and is, therefore, capable of freely controlling the light output angle and/or output direction with high accuracy over a long time period while being provided in a compact configuration.

Preferably, the light emitting unit is an electrode which causes electrophoresis of the dispersoid.

According to the light emitting unit causing electrophoresis, the dispersoid is moved by an electric field and thus the light output and/or direction is controlled. The amount of the dispersoid moved by electrophoresis can be freely controlled according to the waveform and the pattern in which a voltage is applied to the electrode, the placement, shape and structure of the electrode and other factors. Therefore, the distribution of refraction rate can be determined with flexibility in comparison with the technique of controlling the refraction of light using the refractive index of liquid crystal molecules as disclosed in the patent document 1.

In the light emitting unit effecting electrophoresis, the dispersoid includes preferably titanium oxide nanoparticles.

If the dispersoid includes titanium oxide nanoparticles, the optical member having a higher reflective index can be realized. The availability of titanium oxide is high.

Also in the light emitting unit effecting electrophoresis, the dispersoid may include alumina nanoparticles.

If the dispersoid includes alumina nanoparticles, the manufacturing cost of the dispersoid is low.

In the first light emitting unit according to the present invention, preferably, the dispersion medium is an organic dispersion medium.

If the dispersion medium is an organic dispersion medium, it is electrically stable.

In the light emitting unit effecting electrophoresis, the dispersion medium is a hydrocarbon-based organic dispersion medium.

If the dispersion medium is a hydrocarbon-based organic dispersion medium, it is further electrically stable in comparison with an organic dispersion medium having a functional group.

Further in the light emitting unit effecting electrophoresis, an inner surface of the electrode is preferably coated with an insulating film, and the insulating film is placed in contact with the dispersion medium.

This arrangement enables prevention of agglomeration of the dispersoid on the electrode.

Also in the light emitting unit effecting electrophoresis, preferably, the insulating film is a polyimide insulating film.

If this film is used, the heat resistance and durability of the electrode can be improved.

Further in the light emitting unit of the present invention, preferably, the dispersoid is magnetic and the electromagnetic field generator is a magnetic field generator which causes magnetophoresis of the dispersoid.

In the light emitting unit using this magnetophoresis, the output angle and/or the output direction of the light passing through the light passage region is controlled by causing magnetophoresis of the magnetic dispersoid in the dispersion medium instead of causing electrophoresis. Control of an electric field is required for electrophoresis of a dispersoid. However, control of a magnetic field easier than control of an electric field suffices for magnetophoresis of the magnetic dispersoid, thus enabling the output angle and/or the output direction of light to be reliably adjusted.

Preferably, in the light emitting unit using magnetophoresis of the present invention the dispersoid includes titanium-cobalt oxide.

Titanium-cobalt oxide can form magnetic particles having high optical transmissivity and easily producible.

Preferably, the light emitting unit has a reflector which is provided at the rear of the light source, and which reflects toward the optical member the light emitted from the light source and traveling rearward.

If such a reflector is provided, both the light from the light source and the light reflected by the reflector enter the optical member, thereby enabling the range of radiation of light from the light emitting unit of the present invention to be increased.

At least the light passage region of the container may be a container having the shape of a lens having a positive refractive power.

This arrangement enables the optical member to be used as a convex variable-focus lens.

Further, at least the light passage region of the container may be a container having the shape of a lens having a negative refractive power.

This arrangement enables the optical member to be used as a concave variable-focus lens.

Further, at least the light passage region of the container may be a container having the shape of an aspheric lens.

This arrangement enables the optical member to be used as an aspheric variable-focus lens.

Also, at least the light passage region of the container may be a container having the shape of a wedge.

This arrangement enables the optical member to be used as a prism.

Preferably, the dispersoid includes nanoparticles having a particle size of approximately 5 nm to 100 nm.

If the dispersoid includes nanoparticles having a particle size of approximately 5 nm to 100 nm, its liability to scatter light is reduced and high transmissivity of the optical member can be maintained. Particles having a particle size in this range are easy to handle.

Preferably, the dispersion medium is water.

If the dispersion medium is water, the dispersibility of the dispersoid is high and the manufacturing cost of the dispersoid is low.

Preferably, at least the light passage region of the container is formed by a plastic.

If such a material is used, the container can be obtained as a lightweight container having high impact resistance.

According to the present invention, an image taking apparatus having the light emitting unit, an image taking operation is performed using subject light from a subject irradiated with the light, the output angle and/or direction of which is controlled by the light emitting unit.

Therefore, the image taking apparatus of the present invention can accurately radiate the subject with light over a long time period to take high-quality images.

Incidentally, although only a basic embodiment of the image taking apparatus is mentioned here to avoid redundancy, there are various embodiments corresponding to those of the light emitting unit mentioned earlier.

Preferably, in the image taking apparatus the subject light is used for detecting an in-focus position to focus on the subject.

As the subject is radiated with light efficiently, focusing on the subject can be carried out with high accuracy.

Further, in the image taking apparatus the subject light may be used for actual image taking operation to obtain an image of the subject.

The image taking apparatus of the present invention can obtain images with high contrast even in dark shooting environment.

As mentioned above, the present invention can provide the light emitting unit that can freely control the light output angle and/or direction in a compact configuration with high accuracy over a long period and the image taking apparatus provided with the light emitting unit.

BRIEF DESCRIPTION OF THE DRAWINGS

Preferred embodiments of the present invention will be described in detail based on the following figures, wherein.

DETAILED DESCRIPTION OF THE INVENTION

The present invention will be described with respect to embodiments thereof.

Figure 1:
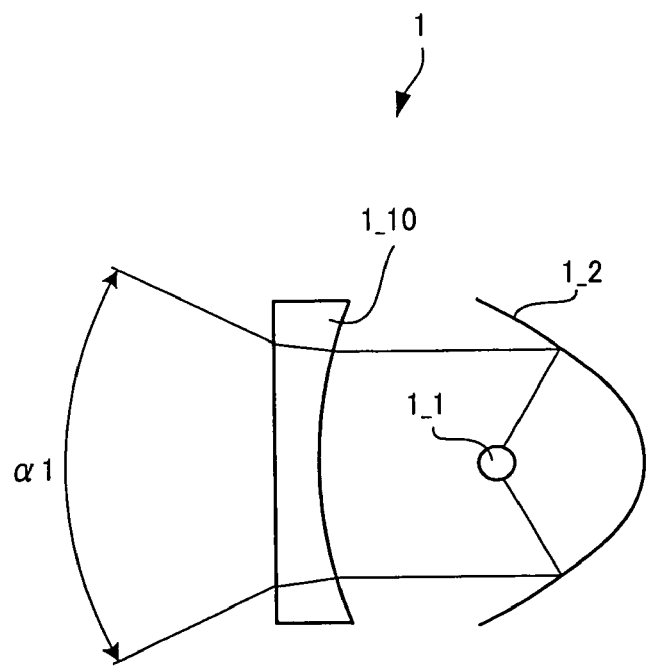
FIG. 1 is a diagram showing a sectional configuration of a flashlight unit which is a first embodiment of a light emitting unit in accordance with the present invention.
Figure 2:
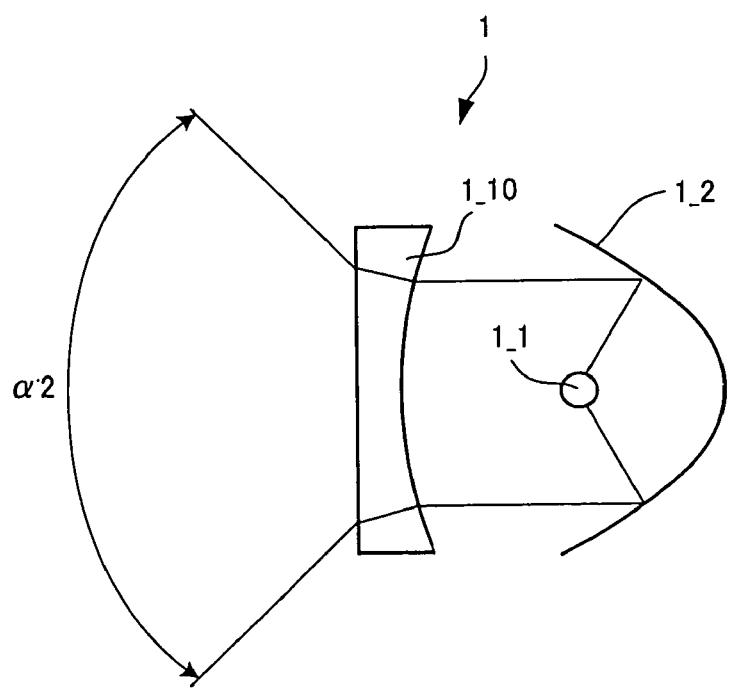
FIG. 2 is a diagram showing a state in which the angle through which flashlight is output is increased in the flashlight unit shown in FIG. 1.

FIG. 1 is a diagram showing a sectional configuration of a flashlight unit which is a first embodiment of a light emitting unit in accordance with the present invention. FIG. 2 is a diagram showing a state in which the angle through which flashlight is output is increased in the flashlight unit shown in FIG. 1. FIG. 1 shows a state of the flashlight unit in which the output angle is reduced.

FIG. 1 shows the flashlight unit 1 as a first embodiment of a light emitting unit in accordance with the present invention. The flashlight unit 1 is suitable for use in a state of being incorporated in a digital camera and is capable of changing, in two steps, according to a picture taking situation, the angle through which flashlight is distributed. The flashlight unit 1 has a light source 1_1. The flashlight unit 1 also has an optical member 1_10 which is provided in front of the light source 1_1, and which has negative refractive powers such as to output light emitted from the light source 1_1 by expanding the light through one of two output angles. The flashlight unit 1 further has a reflector 1_2 which is provided at the rear of the light source 1_1, and which reflects toward the optical member 1_10 light emitted from the light source 1_1 and traveling rearward. The light source 1_1 corresponds to one example of a light source of the present invention.

In the flashlight unit 1, both the light emitted from the light source 1_1 and the light reflected by the reflector 1_2 enter the optical member 1_10. The optical member 1_10 can be controlled so as to change the refractive index in two steps, as described below. When the optical member 1_10 is controlled so that the refractive index is low, an output angle $\alpha 1$ through which the light emitted from the light source 1_1 is output is comparatively small, as shown in FIG. 1. The flashlight unit in this state enables flashlight photography at the telephoto end to be suitably performed. When the optical member 1_10 is controlled so that the refractive index is high, an output angle α2 through which the light emitted from the light source 1_1 is output is comparatively large, as shown in FIG. 2. The flashlight unit in this state enables flashlight photography at the wide end (wide-angle end) to be suitably performed.

Figure 3:
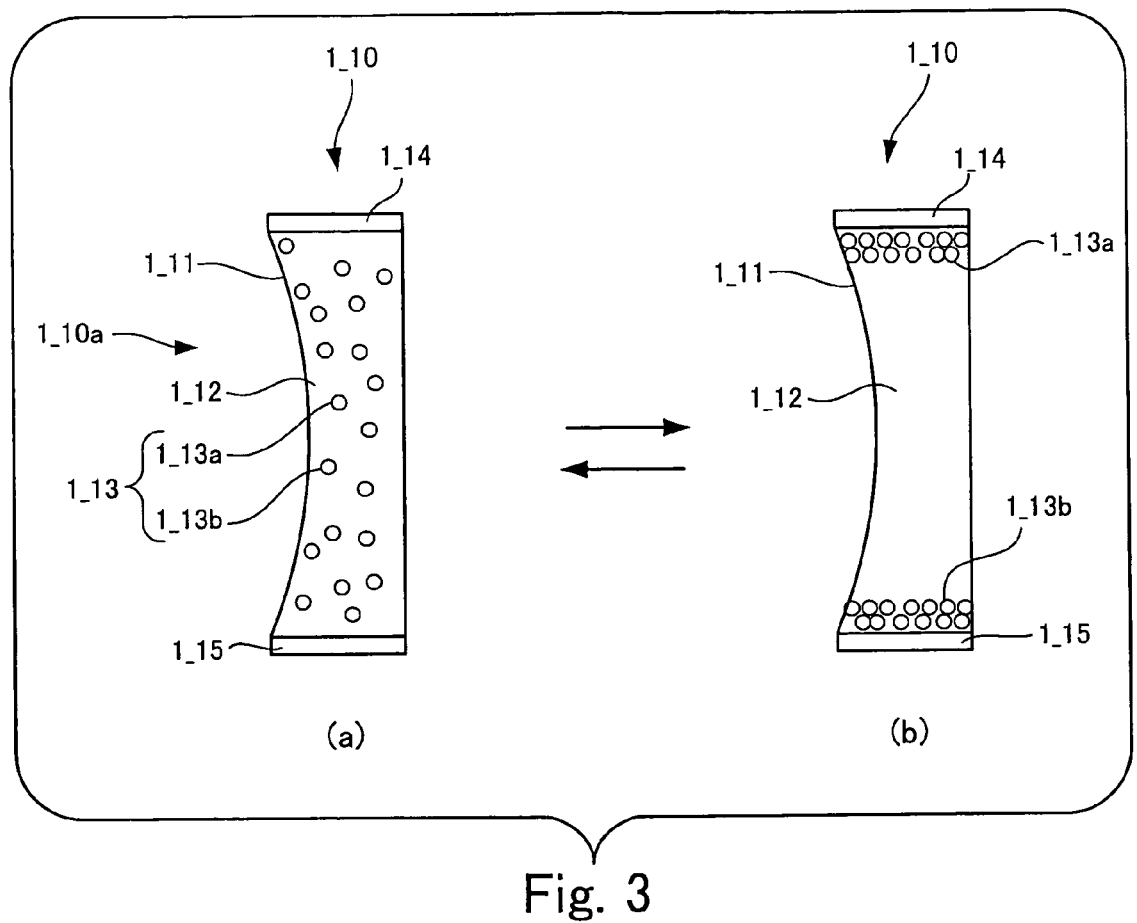
FIG. 3 is a diagram showing a sectional configuration of an optical member provided in the flashlight unit shown in FIG. 1.

FIG. 3 is a diagram showing a sectional configuration of the optical member provided in the flashlight unit shown in FIG. 1.

The optical member 1_10 shown in parts (a) and (b) of FIG. 3 has a container 1_11 which is light-transmissive at least in a light passage region 1_10a, and which has the shape of a lens. At least the light passage region 1_10a of the container 1_11 has the shape of a lens having a concave outer surface. The optical member 1_10 corresponds to one example of the optical member of the present invention and the container 1_11 corresponds to one example of the container of the present invention.

In the optical member 1_10, a light-transmissive dispersion medium 1_12 enclosed in the container 1_11 is provided.

In the optical member 1_10, a dispersoid 1_13 is also provided which is dispersed in the dispersion medium 1_12, which is light-transmissive, and which has a refractive index higher than that of the dispersion medium 1_12. In general, a dispersion is constituted of a dispersion medium and a dispersoid. The dispersoid is, for example, particles. The dispersion medium 1_12 corresponds to one example of a dispersion medium and the dispersoid 1_13 corresponds to one example of the dispersoid according to the present invention.

The optical member 1_10 also has a cathode 1_14 and an anode 1_15 which are electrodes for controlling the refraction of light passing through the light passage region 1_10a by effecting electrophoresis of the dispersoid 1_13 dispersed in the dispersion medium 1_12. More specifically, the dispersoid 1_13 is nanoparticles 1_13a positively charged and nanoparticles 1_13b negatively charged. The cathode 1_14, which is a negative electrode for attracting the dispersoid 1_13, and the anode 1_15, which is a positive electrode for attracting the dispersoid 1_13, are placed in such positions as to surround the light passage region 1_10a in the container 1_11. The cathode 1_14 and the anode 1_15 correspond to one example of the electromagnetic field generator as well as the electrodes according to the present invention.

Any material may be used as the material of the nanoparticles. The nanoparticles are, for example, particles of silica, alumina, zirconia, titanium oxide, tungsten oxide, zinc oxide, tin oxide or barium titanate. Preferably, the nanoparticles are particles of titanium oxide, silica gel ($SiO_2$), alumina or a polymer. The nanoparticles may be prepared by any of a solid phase method, a liquid phase method, and a vapor phase method. Preferably, a liquid phase method or a vapor phase method is used. A method suitable for preparation of the nanoparticles is described in detail in a document "Preparation of Nanoparticles and Control of and Evaluation of Dispersion and Agglomeration of Nanoparticles, Technical Information Institute Co., Ltd., 2003". The particle size is preferably 100 nm or less. If the particle size exceeds 100 nm, scattering of light occurs to impair the transparency (transmissivity).

It is preferable to modify the surface of the nanoparticles for the purpose of improving the stability of dispersion in the dispersion medium 1_12. Examples of a method of modifying the surface are a method using a titanium coupling agent (such as isopropyl triisostearoyl titanate), a silane coupling agent (such as pentadecafluorodecyl trimethylsilane) or an aluminum coupling agent (such as acetoalkoxyaluminum diisopropylate) and graft polymerization. Polyethylene graft polymerization or polystyrene graft polymerization may be used as graft polymerization on titanium oxide. Graft polymerization using a silanol group may be used as graft polymerization on silica gel.

As the dispersion medium 1_12 in which the nanoparticles are dispersed, water or a non-aqueous organic dispersion medium may be used. A mixture of water and an organic dispersion medium may also be used. Examples of a non-aqueous organic dispersion medium preferably used as the dispersion medium 1_12 are hydrocarbons (such as hexane, heptane, pentane, octane and ISOPAR (a product from Exxon Mobile Corporation)), hydrocarbon aromatic compounds (such as benzene, toluene, xylene, mesitylene and ethylbenzene), halogen hydrocarbons (such as difluoropropane, dichloroethane, chloroethane and bromoethane), halogen hydrocarbon aromatic compounds (such as chlorobenzene), ether compounds (such as dibutyl ether, anisole and diphenyl ether), alcohol compounds (such as glycerin), compounds having a carbonyl group (such as propylene carbonate), nitrocompounds (such as nitromethane), nitrile compounds (such as acetonitrile and benzonitrile). Also, water is preferably used as the dispersion medium 1_12.

Preferably, the refractive index, specific gravity, viscosity, resistivity and dielectric constant of the dispersion medium 1_12 are adjusted in relation to use of the optical member 1_10. This adjustment may be performed by mixing a certain number of dispersion mediums.

Additives including stabilizing agents for stabilization under an acid, an alkali and a salt, a stabilizing agent for stabilization of dispersion, stabilizing agents for antioxidation and ultrasonic absorption, an antibacterial agent and a preservative agent may be added to the dispersion medium 1_12.

As a member forming the container 1_11, a glass base plate, a film or a base plate of a high polymer such as polyester, polyimide, polymethyl methacrylate, polystyrene, polypropylene, polyethylene, polyamide, nylon, polyvinyl chloride, polyvinylidene chloride, polycarbonate, polyether sulfone, a silicone resin, a polyacetal resin, a fluororesin, a cellulose derivative, polyolefin or the like, a metallic base plate or an inorganic base plate such as a ceramic base plate is preferably used. The container 1_11 has a transmissivity of preferably 50% or higher, more preferably 80% or higher.

As the cathode 1_14 and the anode 1_15, an electrode member on which a layer of gold, silver, copper, aluminum, magnesium, nickel, platinum, carbon, an electroconductive high polymer or a metal oxide typified by tin oxide-indium oxide (ITO), tin oxide or zinc oxide is formed is preferably used. For use on a portion through which light is to be transmitted, transparent electrodes are preferably used. A metal oxide typified by tin oxide-indium oxide (ITO), tin oxide or zinc oxide is preferred.

In the optical member 1_10, the refraction of light passing through the light passage region 1_10a is controlled through electrophoresis of the dispersoid 1_13 which is dispersed in the light-transmissive dispersion medium 1_12 enclosed in the container 1_11 having the shape of a lens, and which has a refractive index higher than that of the dispersion medium 1_12, the electrophoresis being effected according to the voltage applied between the cathode 1_14 and the anode 1_15. The optical member 1_10 is therefore obtained as a refractive index-variable optical member having a refractive index determined by the dispersion medium 1_12 and the amount of movement of the dispersoid 1_13 in the light passage region 1_10a caused by electrophoresis, as described below in detail.

When no voltage is applied between the cathode 1_14 and the anode 1_15, the dispersoid 1_13 is uniformly dispersed in the dispersion medium 1_12, as shown in part (a) of FIG. 3. The dispersoid 1_13 is constituted of nanoparticles 1_13a positively charged and nanoparticles 1_13b negatively charged. The optical member 1_10 in this state has a comparatively high refractive index resulting from the refractive index of the dispersion medium 1_12 and a refractive index determined by the amount (the number of particles) of dispersoid 1_13 uniformly dispersed in the dispersion medium 1_12.

When a predetermined voltage is applied between the cathode 1_14 and the anode 1_15, the positively charged nanoparticles 1_13a in the dispersoid 1_13 uniformly dispersed in the dispersion medium 1_12 are attracted to the cathode 1_14 and the negatively charged nanoparticles 1_13b are attracted to the anode 1_15, as shown in part (b) of FIG. 3. The optical member 1_10 therefore has a comparatively low refractive index determined by the refractive index of the dispersion medium 1_12 only. When the application of the voltage between the cathode 1_14 and the anode 1_15 is stopped, the optical member 1_10 is again settled in the state shown in part (a) of FIG. 3.

The amount of the dispersoid 1_13 electrophoretically moved from the state of being positioned in the light passage region 1_10a can be freely controlled according to the waveform and the pattern in which the voltage is applied between the cathode 1_14 and the anode 1_15, the placement, shape and structure of the cathode 1_14 and the anode 1_15, and other factors. Therefore, the distribution rate can be determined with more flexibility in comparison with the technique of controlling the refraction of light using the refractive index of liquid crystal molecules as disclosed in the patent document 1. Also, the dispersoid 1_13 dispersed in the dispersion medium 1_12 is moved by an electric field produced by applying a voltage between the cathode 1_14 and the anode 1_15 and no current is caused therebetween. Therefore, the risk of electrolysis is reduced in comparison of the technique using a current flowing through an electroconductive aqueous solution as proposed in the non-patent document 1. Consequently, the deterioration of the performance of the optical member can be limited over a long time period.

Since the above-described optical member 1_10 is provided in the flashlight unit 1, the flashlight unit 1_10 is implemented in a compact construction and is capable of changing the flashlight distribution angle with high accuracy over a long time period.

Figure 4:
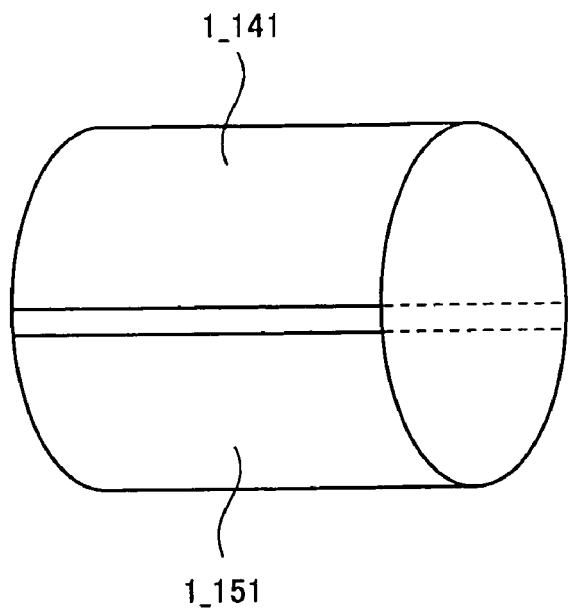
FIG. 4 is a diagram showing an example of the placement of the cathode and the anode different from that shown in FIG. 3.

FIG. 4 is a diagram showing an example of the placement of the cathode and the anode different from that shown in FIG. 3.

A cathode 1_141 and an anode 1_151 shown in FIG. 4 are respectively placed in upper and lower positions on the side surface surrounding the light passage region in the container constituting the optical member. If the cathode 1_141 and the anode 1_151 are placed in this manner, positive nanoparticles and negative nanoparticles can be rapidly attracted to the upper and lower surfaces of the container.

Figure 5:
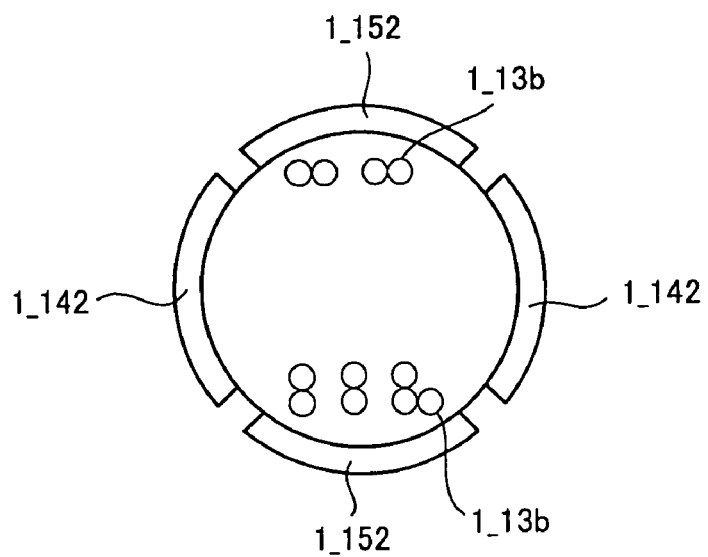
FIG. 5 is a diagram showing another example of the placement of the cathode and the anode different from that shown in FIG. 3.

FIG. 5 is a diagram showing another example of the placement of the cathode and the anode different from that shown in FIG. 3.

Referring to FIG. 5, first and second cathodes 1_142 are placed in left and right positions on the surface surrounding the light passage region in the container constituting the optical member. Also, third and fourth anodes 1_152 are placed in upper and lower positions on the surface surrounding the light passage region in the container constituting the optical member. The cathodes 1_142 and the anodes 1_152 are placed in this manner and negative nanoparticles 1_13b are dispersed in the dispersion medium. Amounts of nanoparticles 1_13b attracted to the third and fourth anodes 1_152 may be distributed, for example, by setting the voltage applied to the fourth anode 1_152 higher than the voltage applied to the third anode 1_152.

Figure 6:
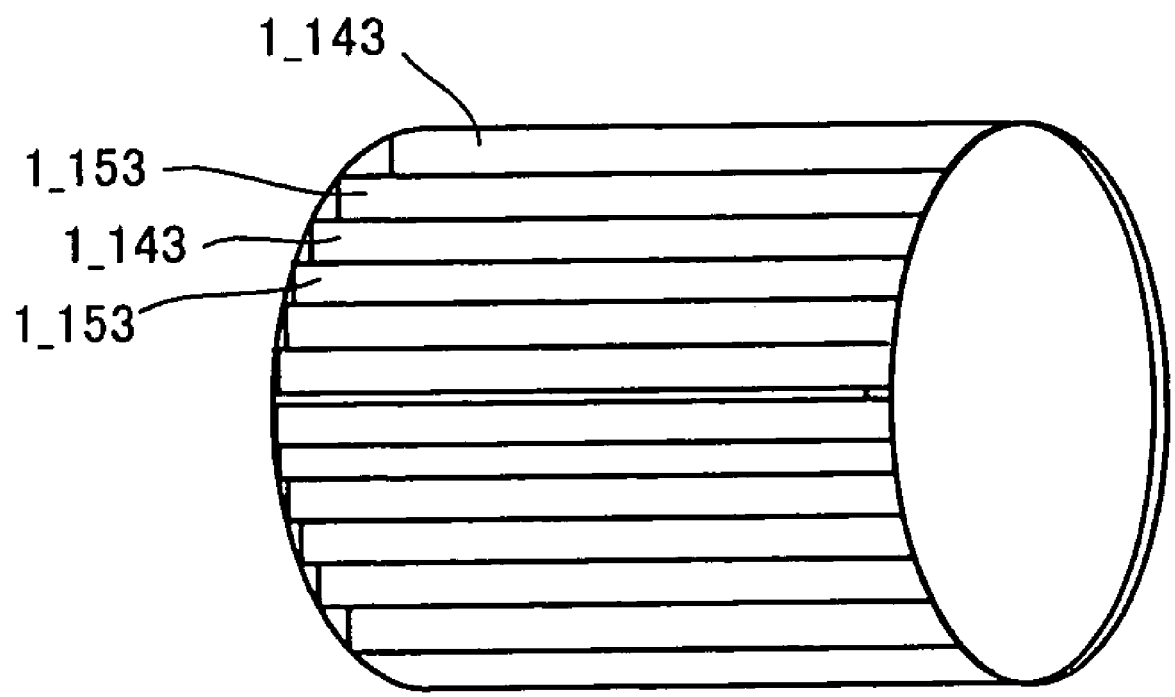
FIG. 6 is a diagram showing a further example of the placement of the cathode and the anode different from that shown in FIG. 3.

FIG. 6 is a diagram showing a further example of the placement of the cathode and the anode different from that shown in FIG. 3.

Referring to FIG. 6, cathodes 1_143 and anodes 1_153 are alternately placed along the side surface surrounding the light passage region in the container constituting the optical member. Cathodes 1_143 and anodes 1_153 may be alternately placed in this manner to enable the distributions of positive nanoparticles and negative nanoparticles to be freely controlled.

Figure 7:
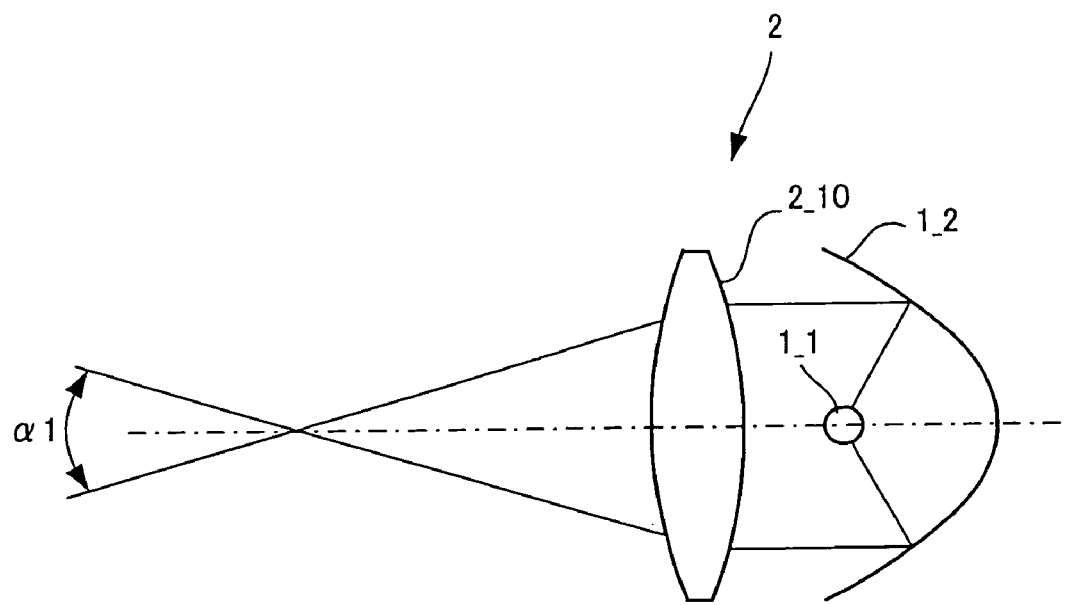
FIG. 7 is a diagram showing a sectional configuration a flashlight unit which is a second embodiment of the light emitting unit in accordance with the present invention.
Figure 8:
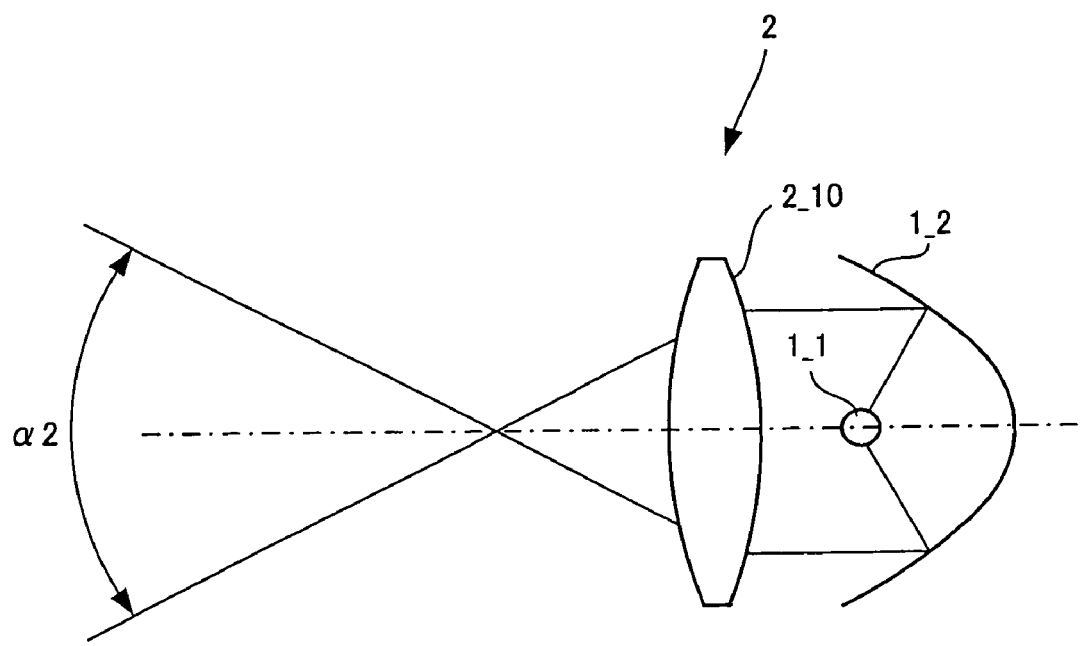
FIG. 8 is a diagram showing a state in which the angle through which flashlight is output is increased in the flashlight unit shown in FIG. 7.

FIG. 7 is a diagram showing a sectional configuration a flashlight unit 2 which is a second embodiment of the light emitting unit in accordance with the present invention. FIG. 8 is a diagram showing a state in which the angle through which flashlight is output is increased in the flashlight unit shown in FIG. 7.

The flashlight unit 2 shown in FIG. 7 as the second embodiment of the light emitting unit in accordance with the present invention differs from the flashlight unit 1 shown in FIG. 1 in that an optical member 2_10 having a positive refractive power is provided in place of the optical member 1_10 having a negative refractive power.

In the flashlight unit 2, both light emitted from the light source 1_1 and light reflected by the reflector 1_2 enter the optical member 2_10. The optical member 2_10 can be controlled so as to change the refractive index in two steps, as described below. When the optical member 2_10 is controlled so that the refractive index is low, an output angle α1 through which the light emitted from the light source 1_1 is output is comparatively small, as shown in FIG. 7. The flashlight unit in this state enables flashlight photography at the telephoto end to be suitably performed. When the optical member 2_10 is controlled so that the refractive index is high, an output angle α2 through which the light emitted from the light source 1_1 is output is comparatively large, as shown in FIG. 8. The flashlight unit in this state enables flashlight photography at the wide end (wide-angle end) to be suitably performed.

Figure 9:
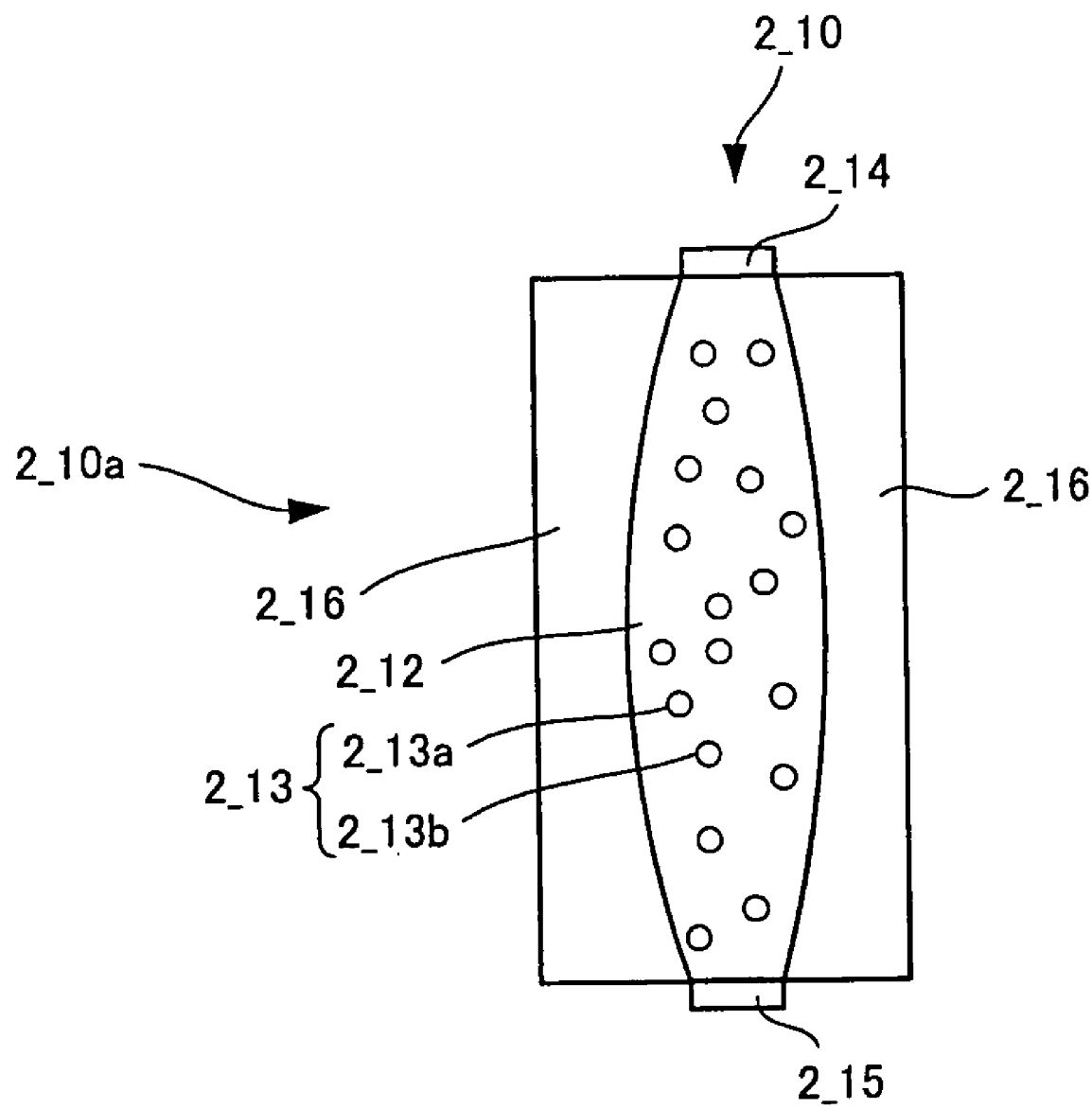
FIG. 9 is a diagram showing a sectional configuration of an optical member provided in the flashlight unit shown in FIG. 7.

FIG. 9 is a diagram showing a sectional configuration of the optical member 2_10 provided in the flashlight unit shown in FIG. 7.

The optical member 2_10 shown in FIG. 9 has a container 2_16 which is light-transmissive at least in a light passage region 2_10a. The container 2_16 is formed of a plastic. Therefore, the container 2_16 can be realized as a light-weight container having high impact resistance. The container 2_16 may be formed of glass instead of a plastic.

In the optical member 2_10, a light-transmissive dispersion medium 2_12 enclosed in the container 2_16 is provided.

In the optical member 2_10, a dispersoid 2_13 is also provided which is dispersed in the dispersion medium 2_12, which is light-transmissive, and which has a refractive index higher than that of the dispersion medium 2_12.

The optical member 2_10 also has a cathode 2_14 and an anode 2_15 which are electrodes for controlling the refraction of light passing through the light passage region 2_10a by effecting electrophoresis of the dispersoid 2_13 dispersed in the dispersion medium 2_12. More specifically, the dispersoid 2_13 is nanoparticles 2_13a positively charged and nanoparticles 2_13b negatively charged. The cathode 2_14, which is a negative electrode for attracting the dispersoid 2_13, and the anode 2_15, which is a positive electrode for attracting the dispersoid 2_13, are placed in such positions as to surround the light passage region 2_10a in the container 2_16.

In the optical member 2_10, control of the refraction of light passing through the light passage region 2_10a is performed in the same manner as that in the above-described optical member 1_10. That is, the refraction of light passing through the light passage region 2_10a is controlled through electrophoresis of the dispersoid 2_13 which is dispersed in the light-transmissive dispersion medium 2_12 enclosed in the container 2_16, and which has a refractive index higher than that of the dispersion medium 2_12, the electrophoresis being effected according to the voltage applied between the cathode 2_14 and the anode 2_15. The optical member 2_10 is therefore obtained as a refractive index-variable optical member having a refractive index determined by the dispersion medium 2_12 and the amount of movement of the dispersoid 2_13 in the light passage region 2_10a caused by electrophoresis. The optical member 2_10 is operated in the same manner as the above-described optical member 1_10, as described below. When no voltage is applied between the cathode 2_14 and the anode 2_15, the dispersoid 2_13 is uniformly dispersed in the dispersion medium 2_12, as shown in FIG. 9. The dispersoid 2_13 is constituted of nanoparticles 2_13a positively charged and nanoparticles 2_13b negatively charged. The optical member 2_10 in this state has a comparatively high refractive index resulting from the refractive index of the dispersion medium 2_12 and a refractive index determined by the amount (the number of particles) of dispersoid 2_13 uniformly dispersed in the dispersion medium 2_12.

When a predetermined voltage is applied between the cathode 2_14 and the anode 2_15, the positively charged nanoparticles 2_13a in the dispersoid 2_13 uniformly dispersed in the dispersion medium 2_12 are attracted to the cathode 2_14 and the negatively charged nanoparticles 2_13b are attracted to the anode 2_15. The optical member 2_10 therefore has a comparatively low refractive index determined by the refractive index of the dispersion medium 2_12 only. Since the above-described optical member 2_10 is provided in the flashlight unit 2, the flashlight unit 2_10 is implemented in a compact construction and is capable of changing the flashlight output angle with high accuracy over a long time period.

Now descriptions will be made on various modes of applicable optical members in place of the optical member 1_10 in FIG. 3 and the optical member in FIG. 9.

Figure 10:
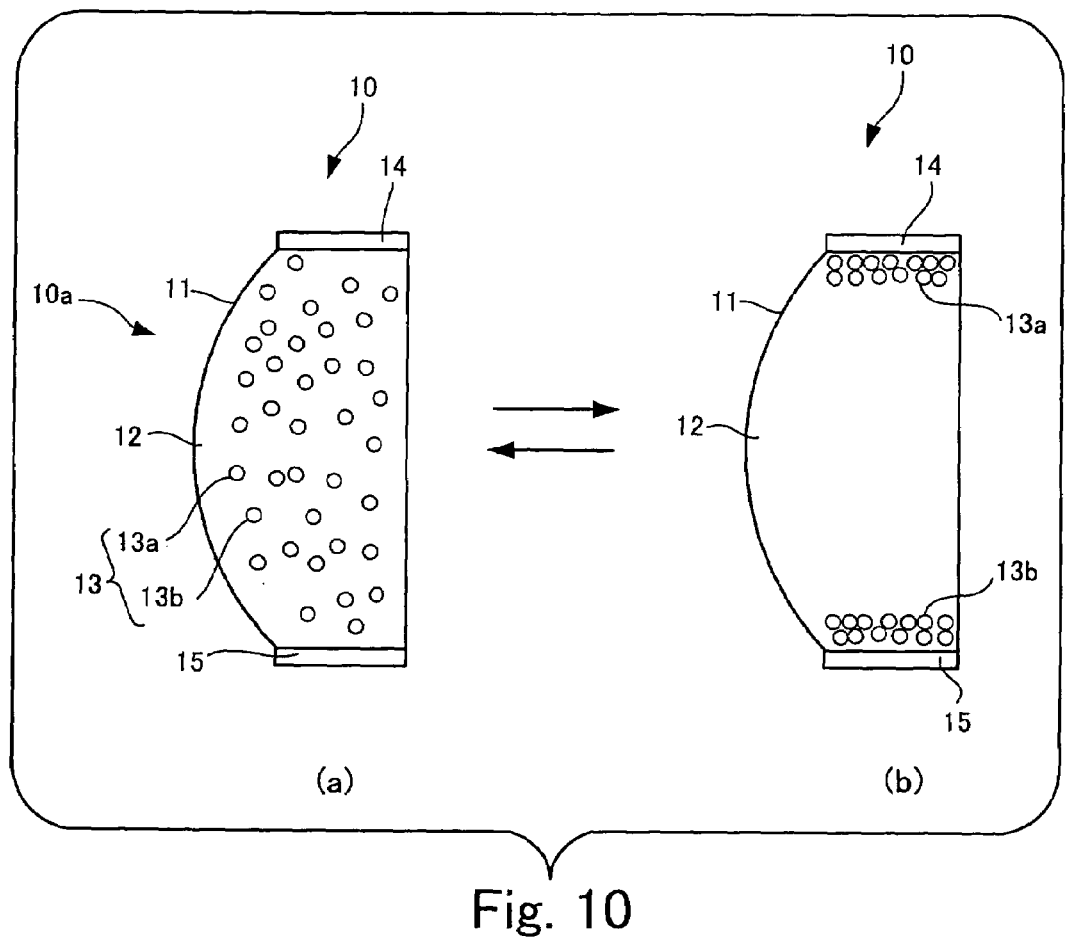
FIG. 10 is a diagram showing a sectional configuration of an optical member different from the optical member shown in FIG. 7.

FIG. 10 is a diagram showing a sectional configuration of an optical member 10 different from the optical member shown in FIG. 7.

The optical member 10 shown in parts (a) and (b) of FIG. 10 has a container 11 which is light-transmissive at least in a light passage region 10a, and which has the shape of a lens. At least the light passage region 10a of the container 11 has the shape of a lens having a convex outer surface.

In the optical member 10, a light-transmissive dispersion medium 12 enclosed in the container 11 is provided.

In the optical member 10, a dispersoid 13 is also provided which is dispersed in the dispersion medium 12, which is light-transmissive, and which has a refractive index higher than that of the dispersion medium 12.

The optical member 10 also has a cathode 14 and an anode which are electrodes for controlling the refraction of light passing through the light passage region 10a by effecting electrophoresis of the dispersoid 13 dispersed in the dispersion medium 12. More specifically, the dispersoid 13 is nanoparticles 13a positively charged and nanoparticles 13b negatively charged. The cathode 14, which is a negative electrode for attracting the dispersoid 13, and the anode 15, which is a positive electrode for attracting the dispersoid 13, are placed in such positions as to surround the light passage region 10a in the container 11.

When no voltage is applied between the cathode 14 and the anode 15, the dispersoid 13 is uniformly dispersed in the dispersion medium 12, as shown in part (a) of FIG. 10. The dispersoid 13 is constituted of nanoparticles 13a positively charged and nanoparticles 13b negatively charged. The optical member 10 in this state has a comparatively high refractive index resulting from the refractive index of the dispersion medium 12 and a refractive index determined by the amount (the number of particles) of dispersoid 13 uniformly dispersed in the dispersion medium 12.

When a predetermined voltage is applied between the cathode 14 and the anode 15, the positively charged nanoparticles 13a in the dispersoid 13 uniformly dispersed in the dispersion medium 12 are attracted to the cathode 14 and the negatively charged nanoparticles 13b are attracted to the anode 15, as shown in part (b) of FIG. 10. The optical member 10 therefore has a comparatively low refractive index determined by the refractive index of the dispersion medium 12 only.

A method of changing the refractive index stepwise by electrophoresis will be described. When the nanoparticles positively charged and negatively charged (hereafter referred to as "charged particles") are moved by electrophoresis, the amount of the moved charged particles can be changed according to the waveform and the pattern in which the voltage is applied. An optical element capable of changing the refractive index stepwise can be obtained as a result of use of the method of changing the amount of the charged particles positioned in the light passage region 10a in the optical member 10. A method of applying a rectangular wave is preferably used to change the amount of charged particles. In a document "IDWO3 Proceedings (Proceedings of the 10th International Display Workshops), p 239, 2003", an example of 4-step-gradation display by electrophoresis is reported. An example of 8-step-gradation display is also reported in "IDWO3 Proceedings, p 243, 2003". It is possible to change the amount of charged particles stepwise by using one of the application methods for the display described in this document.

An embodiment of the optical member constituting the light emitting unit in accordance with the present invention will next be described.

In the present embodiment, nanoparticles of titanium oxide are used as dispersoid 13. The titanium oxide nanoparticles are prepared, as described below. Hydrous titanium oxide is made formless by an alkali, thereafter aged in hydrochloric acid, and formed into particles having a particle size of 10 nm by a heat treatment. The surfaces of the particles are processed by using a titanium coupling agent (isopropyl triisostearoyl titanate) solution. The optical member 10 is made by dispersing the thus-obtained titanium oxide nanoparticles in ISOPAR (a product from Exxon Mobile Corporation).

If about 20% by volume of the titanium oxide nanoparticles (having a refractive index of 2.30) are mixed in ISOPAR (having a refractive index of 1.48), the refractive index changes from 1.48 to 1.644. In the case of mixing of about 30% by volume, the refractive index changes from 1.48 to 1.726. By using these mixtures, lenses formed as shown in FIG. 11 (mediums including nanoparticles) are made.

Figure 11:
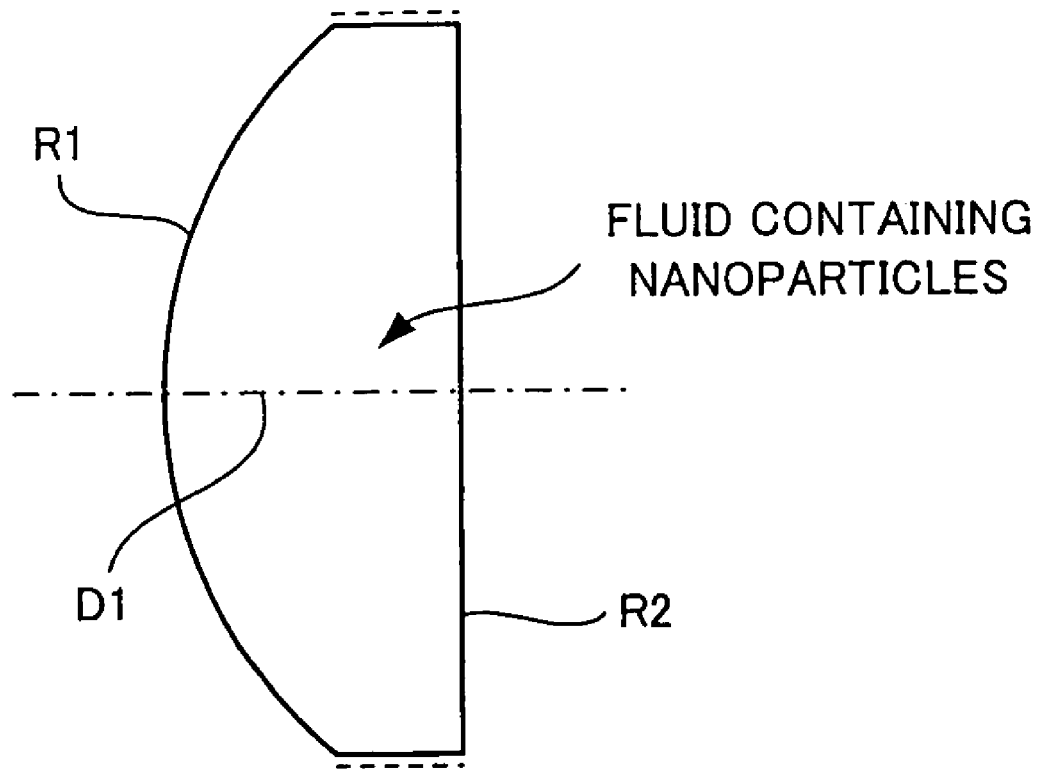
FIG. 11 shows the curvature and thickness of a lens having a medium including nanoparticles.

FIG. 11 below shows the curvature and thickness of lenses having mediums including nanoparticles.

| Lens curvature R: | 5.00 mm |
| Lens thickness D: | 3.00 mm |

(1_1) In the case where only ISOPAR (refractive index: 1.48) is contained

| Focal length: | 10.42 mm |
| Back focus: | 8.39 mm |
| Front focus: | −10.42 mm |

(1_2) In the case where 20% of titanium oxide nanoparticles are mixed (refractive index: 1.644)

| Focal length: | 7.76 mm |
| Back focus: | 5.94 mm |
| Front focus: | −7.76 mm |

(1_3) In the case where 30% of titanium oxide nanoparticles are mixed (refractive index: 1.726)

| Focal length: | 6.89 mm |
| Back focus: | 5.15 mm |
| Front focus: | −6.89 mm |

Thus, the focal length can be changed from 10.42 to 7.76 or to 6.89.

Figure 12:
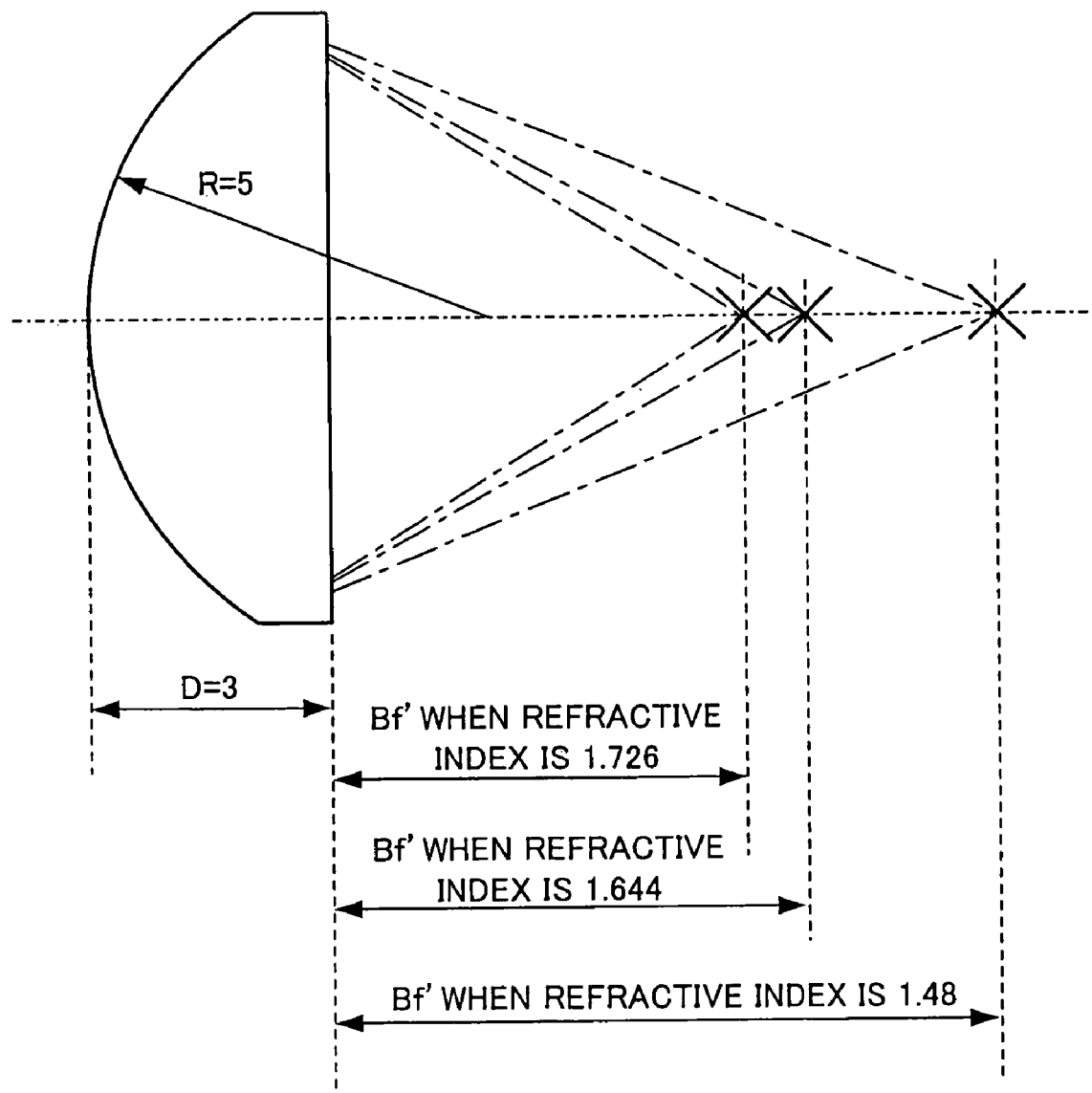
FIG. 12 is a diagram showing the back focus of the optical member in the case where the refractive index is changed from 1.48 to 1.644 and 1.726.

FIG. 12 is a diagram showing the back focus of the optical member in the case where the refractive index is changed from 1.48 to 1.644 and 1.726.

As described above, the focal length of the optical member in the case where the refractive index is changed from 1.48 to 1.644 and 1.726 is changed from 10.42 to 7.76 and 6.89. The corresponding back focus is as shown in FIG. 12. The back focus Bf' (8.39) when the refractive index is 1.48 is the largest, and the back focus Bf' is successively reduced to the back focus Bf' (5.94) when the refractive index is 1.644 and to the back focus (5.15) when the refractive index is 1.726.

Lenses (mediums including nanoparticles) are also made by using a combination with ordinary glass (BK7; refractive index 1.51633).

Figure 13:
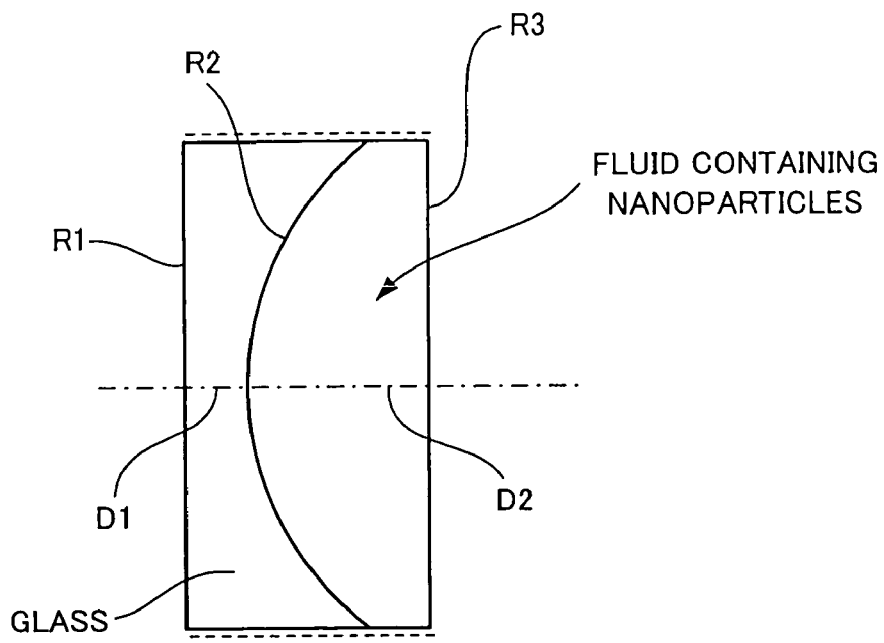
FIG. 13 is a diagram showing the lens curvature and thickness in the case of a combination with ordinary glass.

FIG. 13 is a diagram showing the lens curvature and thickness in the case of a combination with ordinary glass.

| Glass curvature R1: | infinity |
| Glass thickness D1: | 1.00 mm |
| Lens curvature R2: | 5.00 mm |
| Lens thickness D2: | 3.00 mm |
| Lens curvature R3: | infinity |

(2_1) In the case where only ISOPAR (refractive index: 1.48) is contained

| Focal length: | −137.6 mm |
| Back focus: | −133.7 mm |
| Front focus: | 138.3 mm |

(2_2) In the case where 20% of titanium oxide nanoparticles are mixed (refractive index: 1.644)

| Focal length: | 39.2 mm |
| Back focus: | 37.3 mm |
| Front focus: | −38.5 mm |

(2_3) In the case where 30% of titanium oxide nanoparticles are mixed (refractive index: 1.726)

| Focal length: | 23.8 mm |
| Back focus: | 22.1 mm |
| Front focus: | −23.2 mm |

Thus, the focal length can be changed from −137.6 mm to 39.2 mm or to 23.8.

Further, lenses are made by enclosing nanoparticles in ordinary glass (BK7; refractive index 1.51633).

Figure 14:
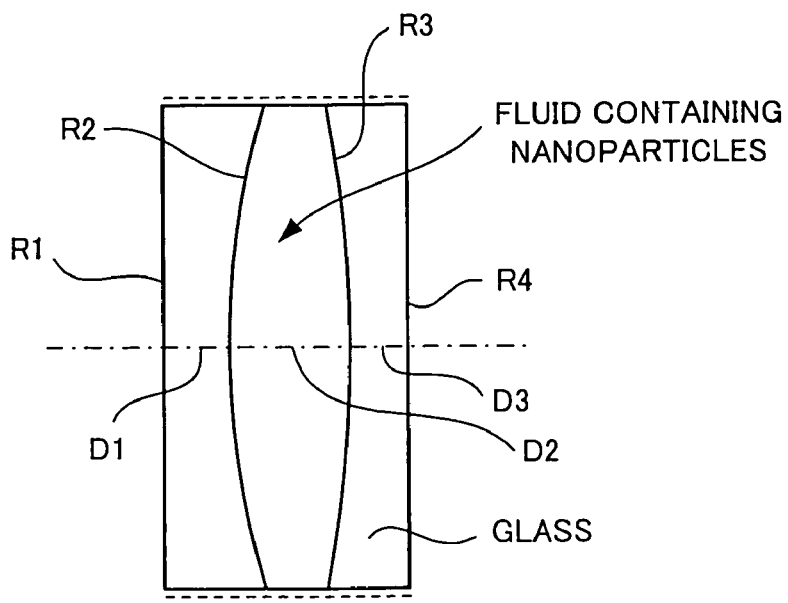
FIG. 14 is a diagram showing the lens curvature and thickness in the case where nanoparticles are enclosed in ordinary glass.

FIG. 14 is a diagram showing the lens curvature and thickness in the case where nanoparticles are enclosed in ordinary glass.

| First glass curvature R1: | infinity |
| First glass thickness D1: | 1.00 mm |
| Second glass curvature R2: | 13.634 |
| | (the curvature of the medium containing nanoparticles) |
| Second glass thickness D2: | 2.00 mm |
| | (the thickness of the medium containing nanoparticles) |
| Third glass curvature R3: | −20.2 mm |
| Third glass thickness D3: | 1.00 mm |
| Fourth glass curvature R4: | infinity |

(3_1) In the case where only ISOPAR (refractive index: 1.48) is contained

| Focal length: | −223.7 mm |
| Back focus: | −225.2 mm |
| Front focus: | 224.9 mm |

(3_2) In the case where 20% of titanium oxide nanoparticles are mixed (refractive index: 1.644)

| | |
|---|---|
| Focal length: | 64.1 mm |
| Back focus: | 62.7 mm |
| Front focus: | −62.9 mm |

(3_3) In the case where 30% of titanium oxide nanoparticles are mixed (refractive index: 1.726)

| | |
|---|---|
| Focal length: | 39.1 mm |
| Back focus: | 37.7 mm |
| Front focus: | −38.0 mm |

Thus, the focal length can be changed from −223.7 mm to 64.1 mm or to 39.1 mm.

Figure 15:
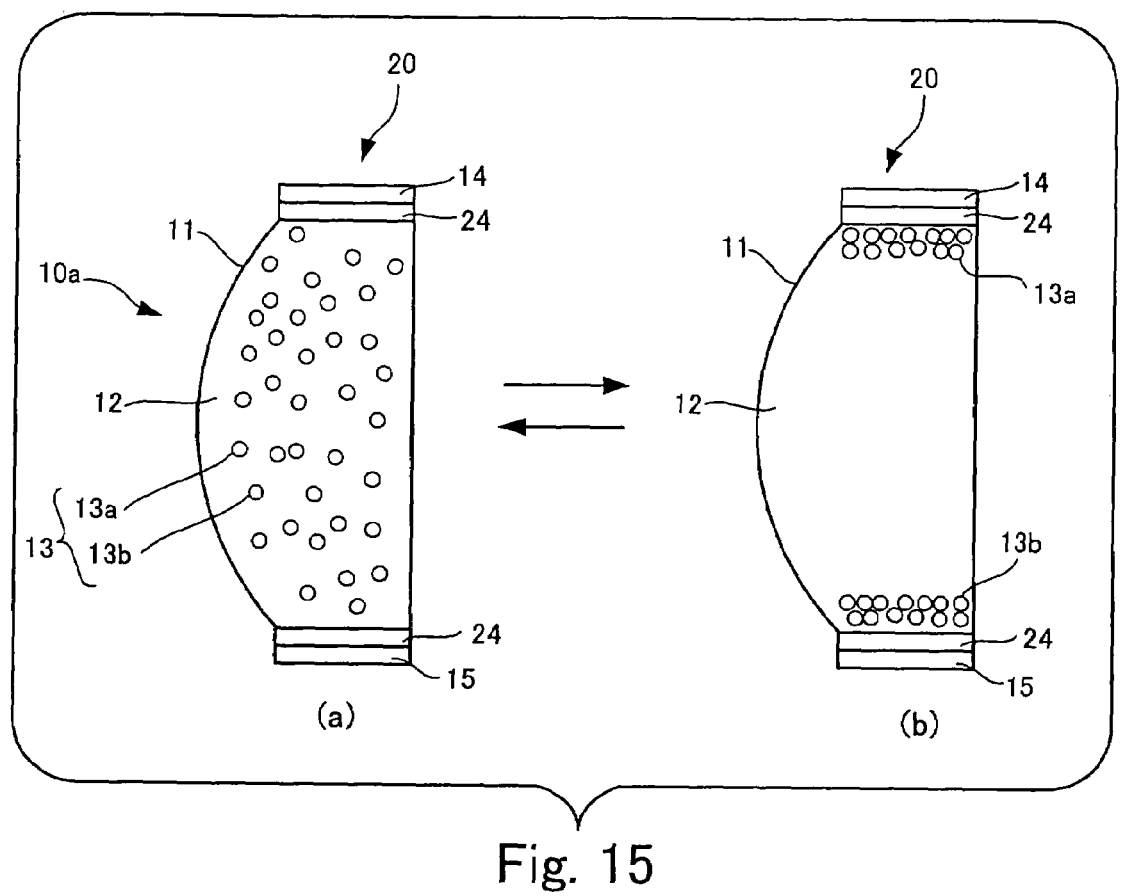
FIG. 15 is a diagram showing a sectional configuration of an optical member in which inner surfaces of a cathode and an anode are coated with an insulating film.

FIG. 15 is a diagram showing a sectional configuration of an optical member 20 in which inner surfaces of a cathode and an anode are coated with an insulating film.

The optical member 20 shown in FIG. 15 differs from the optical member 10 shown in FIG. 10 in that each of the inner surfaces of the cathode 14 and the anode 15 is coated with insulating film 24 which is placed adjacent to the dispersion medium 12. In this optical member 20, the insulating film 24 provided as a coating on the inner surfaces of the cathode 14 and the anode 15 prevents agglomeration of the dispersoid 13 on the cathode 14 and the anode 15. The insulating film 24 is a polyimide insulating film. Therefore, the cathode 14 and the anode 15 have improved heat resistance and durability. In the optical member 20 thus constructed, the refraction of light passing through the light passage region 10a may be controlled through electrophoresis of the dispersoid 13.

Figure 16:
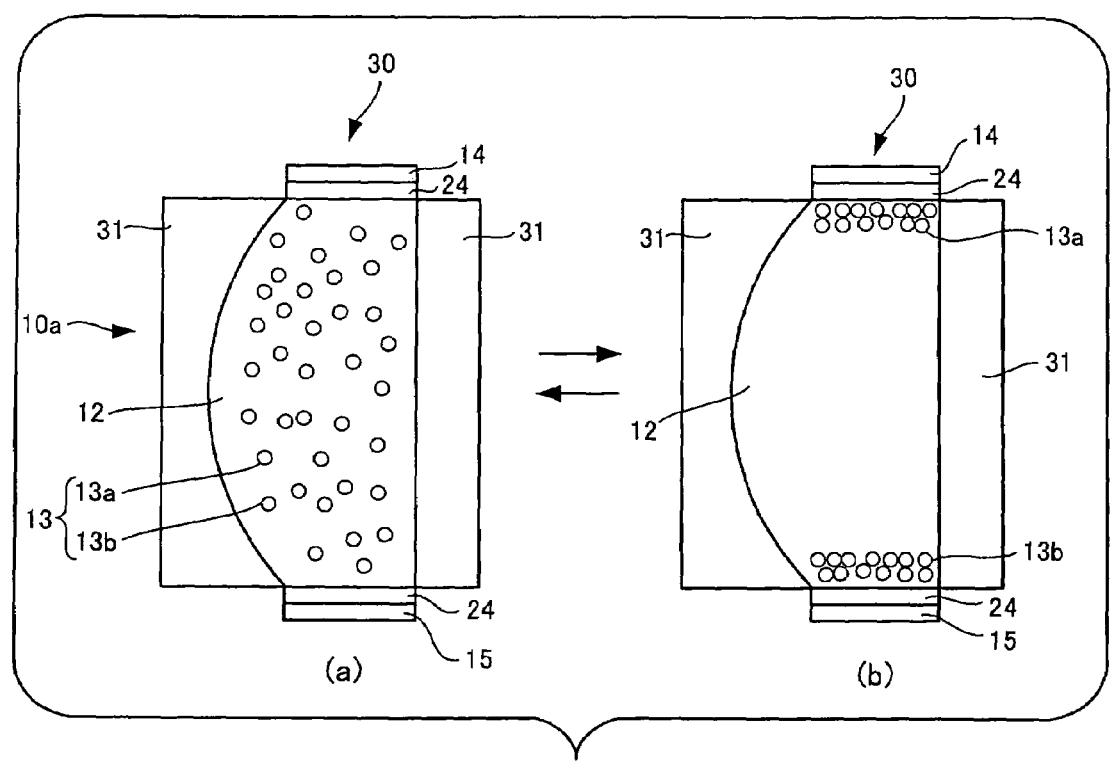
FIG. 16 is a diagram showing a sectional configuration of an optical member having a container formed of a plastic.

FIG. 16 is a diagram showing a sectional configuration of an optical member 30 having a container formed of a plastic.

The optical member 30 shown in FIG. 16 has a container 31 which is light-transmissive at least in a light passage region, and which has the shape of a lens. At least portions of the container 31 facing the light passage region 10a are formed of a plastic. Therefore, the container 31 can be realized as a lightweight container having high impact resistance. In the optical member 30 having such a container 31, the refraction of light passing through the light passage region 10a may be controlled by effecting electrophoresis of the dispersoid 13. The container 31 may be formed of glass instead of a plastic.

Figure 17:
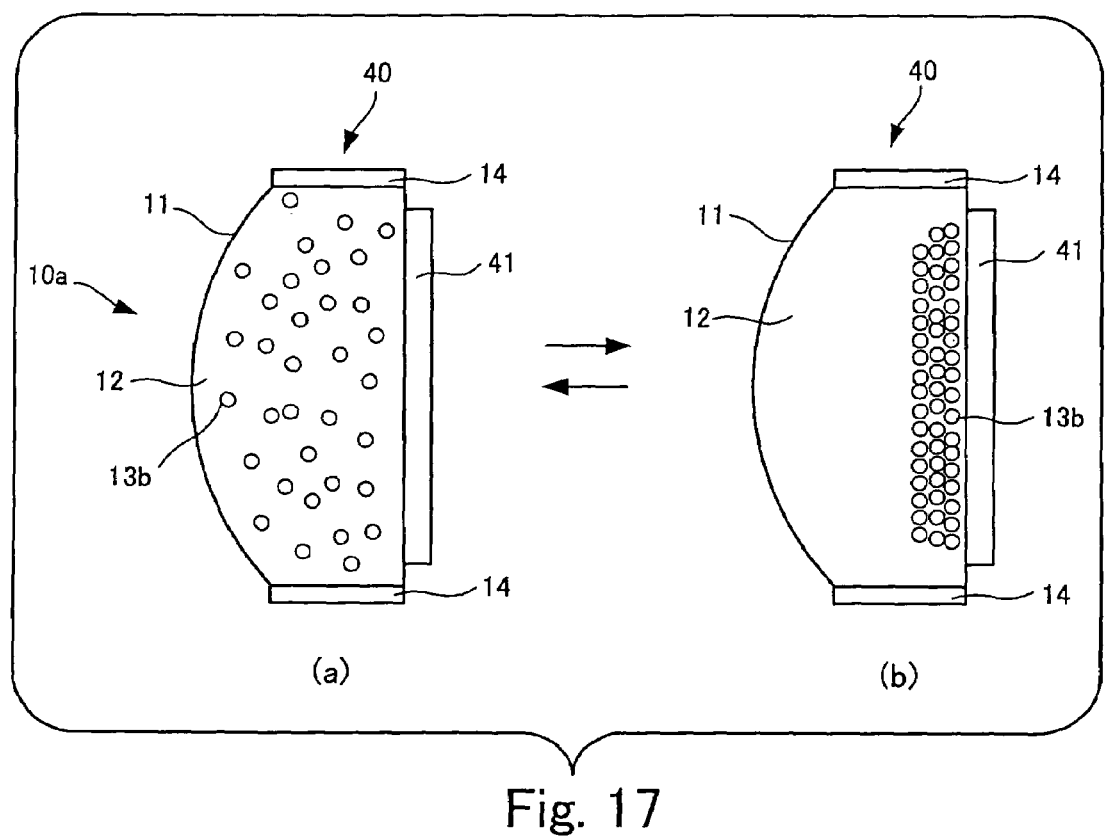
FIG. 17 is a diagram showing a sectional configuration of an optical member having a cathode and an anode placed in a such a position as to surround a light passage region and a position on a back surface.

FIG. 17 is a diagram showing a sectional configuration of an optical member having a cathode and an anode placed in such a position as to surround a light passage region and a position on a back surface.

In the optical member 40 shown in FIG. 17, nanoparticles 13b negatively charged are dispersed in a dispersion medium 12. In the optical member 40, a cathode 14 is placed in such a position as to surround the light passage region 10a. Further, in the optical member 40, an anode 41 for attracting nanoparticles 13b is placed on the back surface of the container 11 facing the light passage region 10a.

When no voltage is applied between the cathode 14 and the anode 41, the nanoparticles 13b are uniformly dispersed in the dispersion medium 12, as shown in part (a) of FIG. 17. That is, the convex portion of the light passage region 10a in the container 11 has also uniformly dispersed nanoparticles 13b. Accordingly, the optical member 40 serves as a lens having a positive refractive power. When a predetermined voltage is applied between the cathode 14 and the anode 41, the nanoparticles 13b uniformly dispersed in the dispersion medium 12 are attracted to the anode 41, as shown in part (b) of FIG. 17. At this time, therefore, no nanoparticles 13b are dispersed in the convex portion of the container 11, so that the positive refractive power is reduced. The positive refractive power can be controlled in this way.

Figure 18:
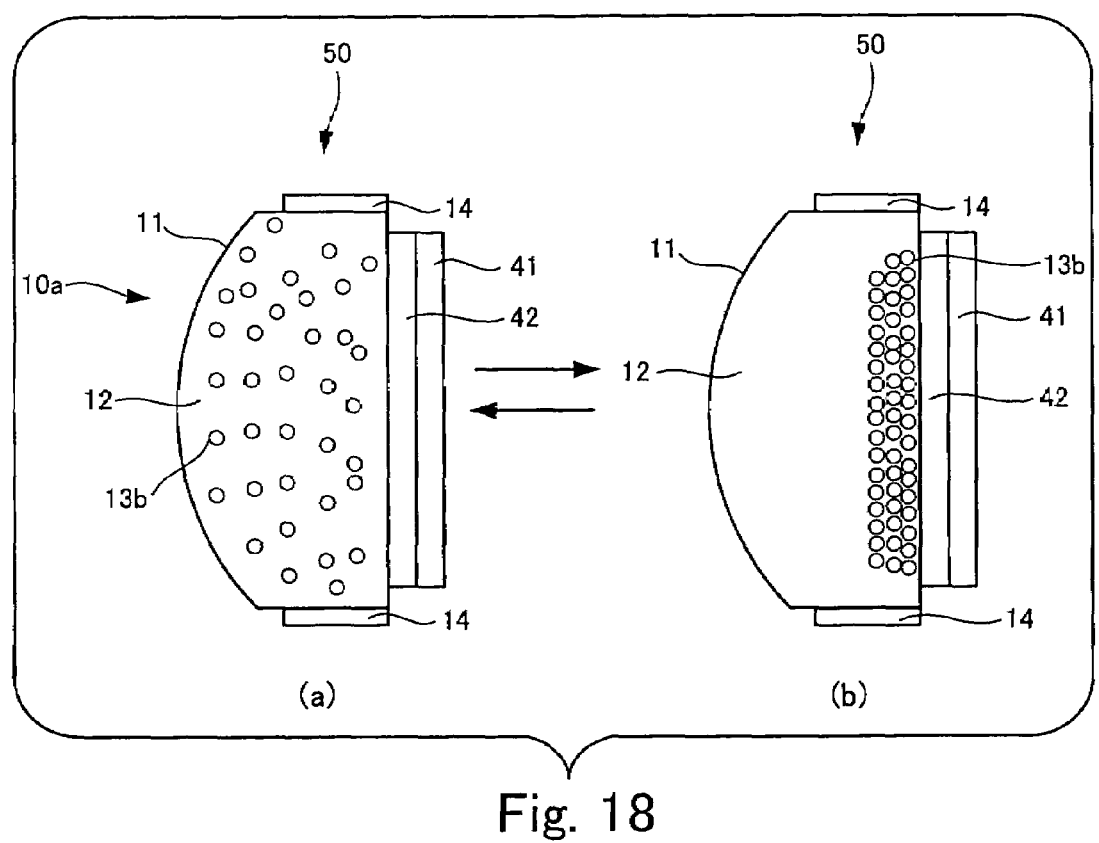
FIG. 18 is a diagram showing a sectional configuration of an optical member in which the inner surface of an anode is coated with an insulating film.

FIG. 18 is a diagram showing a sectional configuration of an optical member in which the inner surface of an anode is coated with an insulating film.

The optical member 50 shown in FIG. 18 differs from the optical member 40 shown in FIG. 17 in that the inner surface of the anode 41 is coated with insulating film 42 which is placed adjacent to the dispersion medium 12. In the optical member 50, the insulating film 42 provided as a coating on the inner surface of the anode 41 prevents agglomeration of nanoparticles 13b on the anode 41. Since the insulating film 42 is a polyimide film, the anode 41 has improved heat resistance and durability.

Figure 19:
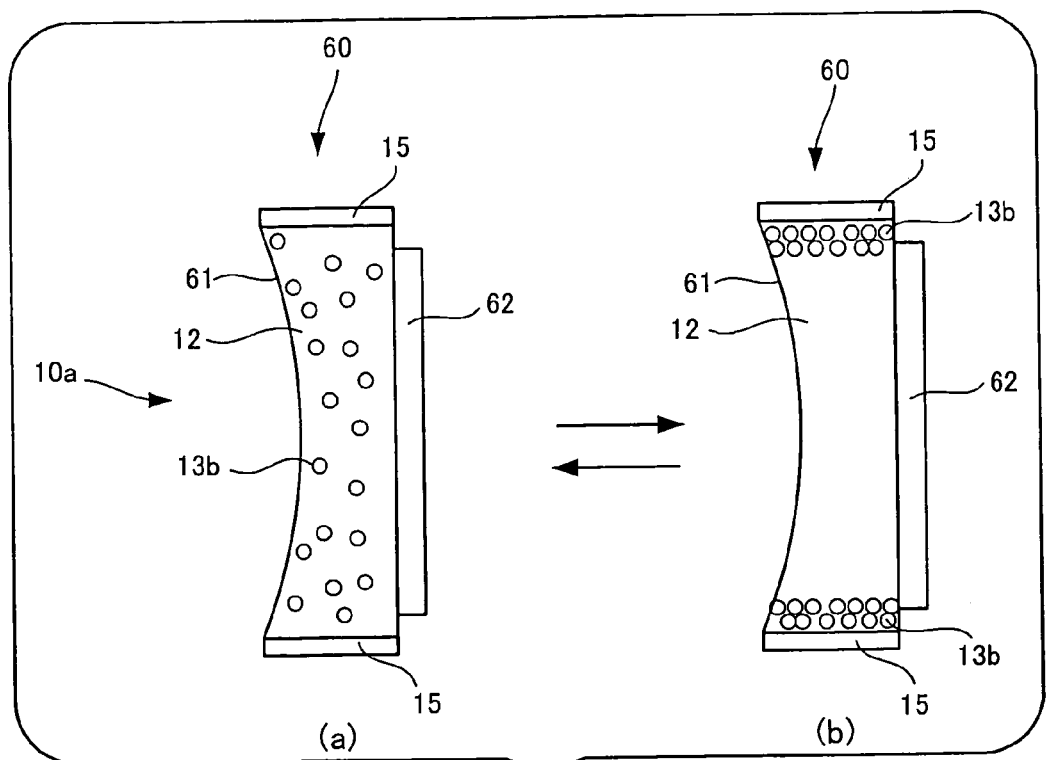
FIG. 19 is a diagram showing a sectional configuration of a first optical member provided with a container having the shape of a lens having a concave outer surface.

FIG. 19 is a diagram showing a sectional configuration of a first optical member provided with a container having the shape of a lens having a concave outer surface.

The first optical member 60 shown in FIG. 19 has a container 61 which is light-transmissive at least in a light passage region 10a, and which has the shape of a lens. At least the light passage region 10a of the container 61 has the shape of a lens having a concave outer surface.

In the optical member 60, an anode 15 is placed in such a position on the container 61 as to surround the light passage region 10a. Further, in the optical member 60, a cathode 62 is placed on a back surface of the container 61 facing the light passage region 10a.

When no voltage is applied between the anode 15 and the cathode 62, nanoparticles 13b are uniformly dispersed in the dispersion medium 12, as shown in part (a) of FIG. 19. That is, nanoparticles 13b are also dispersed uniformly in the concave portion of the container 61 in the light passage region 10a. Accordingly, the optical member 60 serves as a lens having a negative refractive power. When a predetermined voltage is applied between the anode 15 and the cathode 62, the nanoparticles 13b uniformly dispersed in the dispersion medium 12 are attracted to the anode 15, as shown in part (b) of FIG. 19. At this time, therefore, no nanoparticles 13b are dispersed in the greater part of the concave portion of the container 61 (the portion other than upper and lower portions shown in part (b) of FIG. 19), i.e., in a large portion of the container in the light passage region 10a, so that the negative refractive power is reduced.

Figure 20:
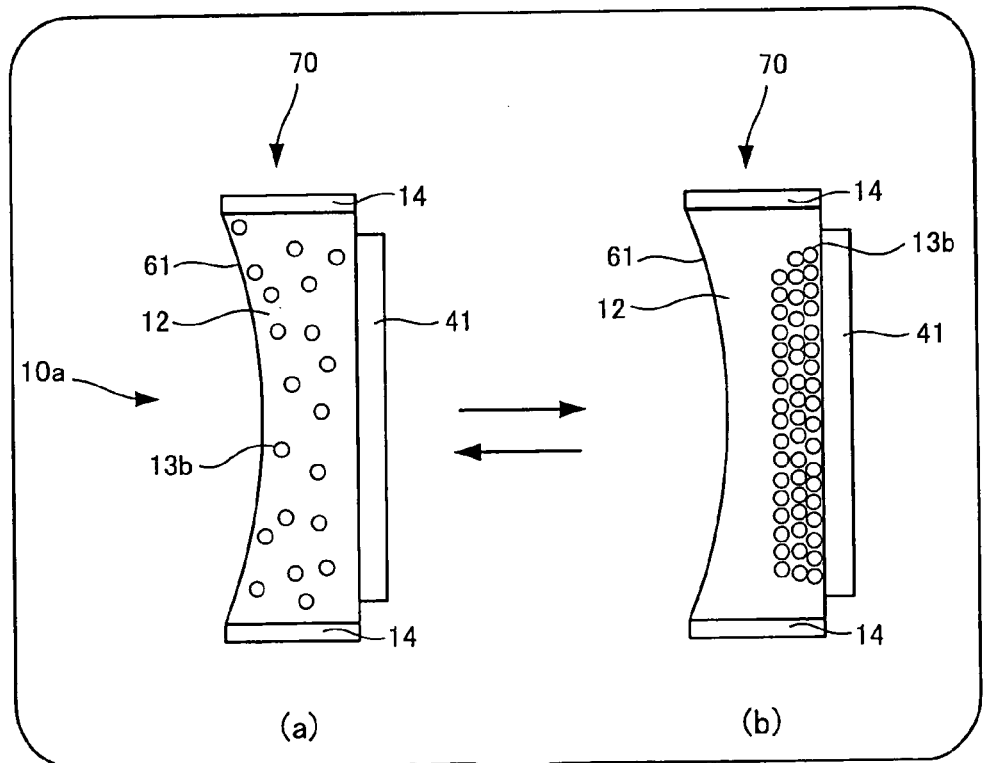
FIG. 20 is a diagram showing a sectional configuration of a second optical member provided with a container having the shape of a lens having a concave outer surface.

FIG. 20 is a diagram showing a sectional configuration of a second optical member 70 provided with a container having the shape of a lens having a concave outer surface.

In the second optical member 70 shown in FIG. 20, a cathode 14 is placed in such a position on a container 61 as to surround a light passage region 10a. In the optical member 70, an anode 41 for attracting nanoparticles 13b is also placed on a back surface of the container 61 facing the light passage region 10a.

When no voltage is applied between the cathode 14 and the anode 41, nanoparticles 13b are uniformly dispersed in the dispersion medium 12, as shown in part (a) of FIG. 20. That is, nanoparticles 13b are also dispersed uniformly in the concave portion of the container 61 in the light passage region 10a. Accordingly, the optical member 70 serves as a lens having a negative refractive power. When a predetermined voltage is applied between the cathode 14 and the anode 41, the nanoparticles 13b uniformly dispersed in the dispersion medium 12 are attracted to the anode 41, as shown in part (b) of FIG. 20. At this time, therefore, no nanoparticles 13b are dispersed in the concave portion of the container 61, so that the negative refractive power is reduced.

Figure 21:
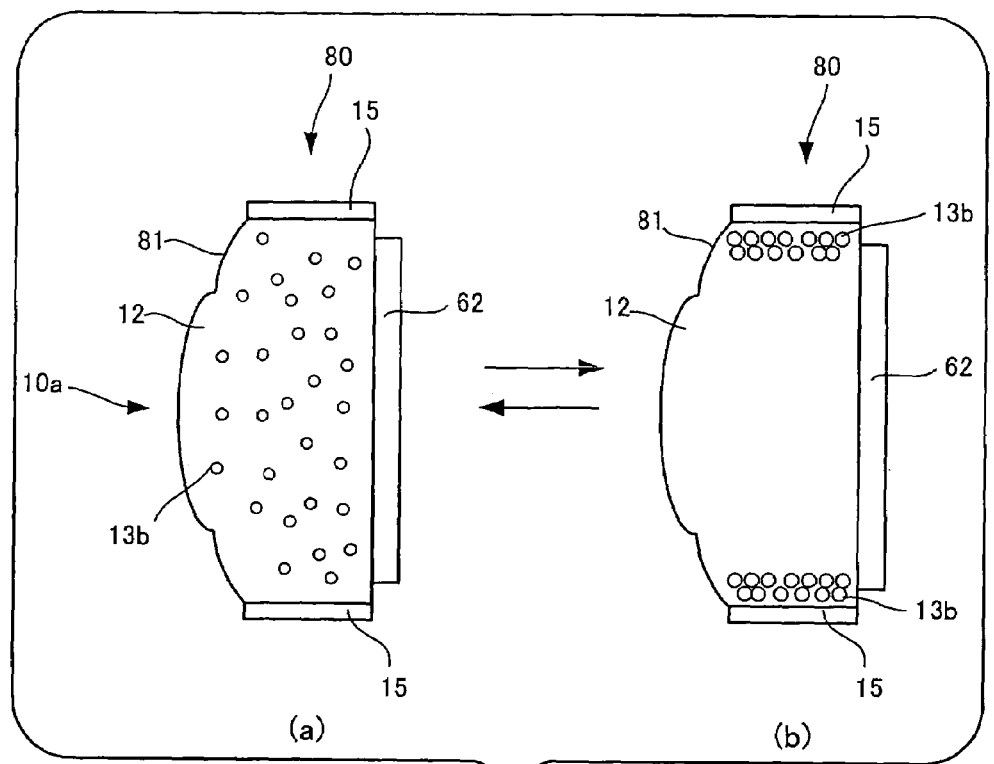
FIG. 21 is a diagram showing a sectional configuration of a first optical member provided with a container having an aspheric shape.

FIG. 21 is a diagram showing a sectional configuration of a first optical member provided with a container having an aspheric shape.

The first optical member 80 shown in FIG. 21 has a container 81 which is light-transmissive at least in a light passage region 10a, and which has the shape of an aspheric lens. At least the light passage region 10a of the container 81 has the shape of an aspheric lens.

When no voltage is applied between the anode 15 and the cathode 62, nanoparticles 13b negatively charged are uniformly dispersed in the dispersion medium 12, as shown in part (a) of FIG. 21. That is, nanoparticles 13b are also dispersed uniformly in the portion of the container 81 having the aspheric lens shape in the light passage region 10a. Accordingly, the optical member 80 serves as an aspheric lens. When a predetermined voltage is applied between the anode 15 and the cathode 62, the nanoparticles 13b uniformly dispersed in the dispersion medium 12 are attracted to the anode 15, as shown in part (b) of FIG. 21. At this time, therefore, no nanoparticles 13b are dispersed in the portion of the container 81 having the aspheric lens shape, so that the effect of the aspheric lens is reduced.

Figure 22:
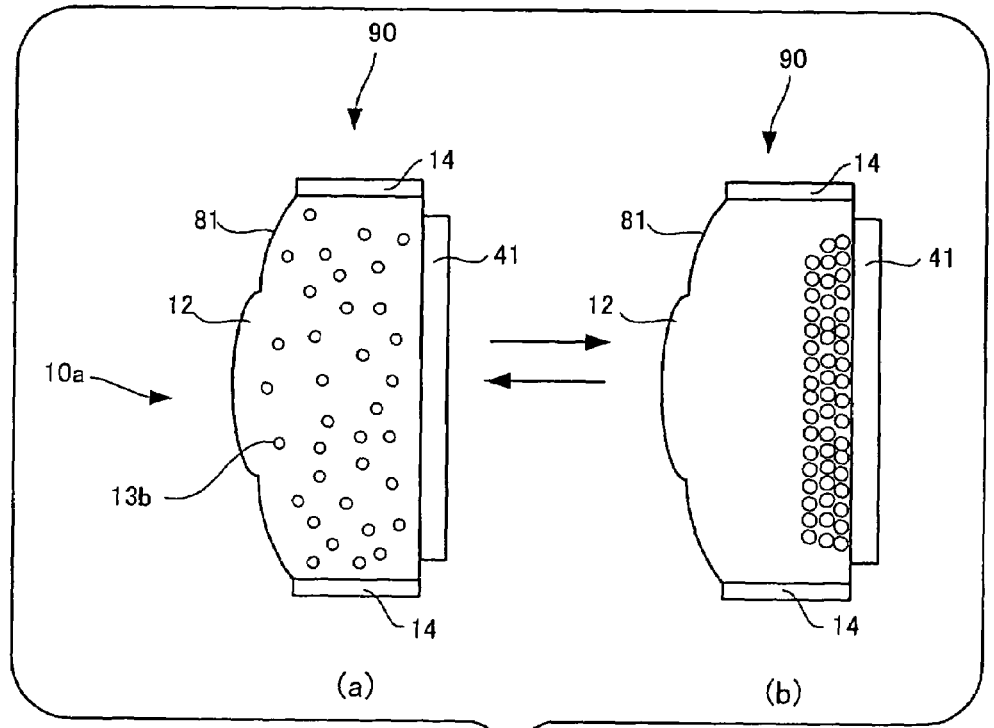
FIG. 22 is a diagram showing a sectional configuration of a second optical member provided with a container having an aspheric shape.

FIG. 22 is a diagram showing a sectional configuration of a second optical member provided with a container having an aspheric shape.

In the optical member 90 shown in FIG. 22, a cathode 14 is placed in such a position on the container 81 as to surround the light passage region 10a. In the optical member 90, an anode 41 for attracting nanoparticles 13b is also placed on a back surface of the container 81 facing the light passage region 10a.

When no voltage is applied between the cathode 14 and the anode 41, nanoparticles 13b are uniformly dispersed in the dispersion medium 12, as shown in part (a) of FIG. 22. That is, nanoparticles 13b are also dispersed uniformly in the portion of the container 81 having the aspheric lens shape in the light passage region 10a. Accordingly, the optical member 90 serves as an aspheric lens. When a predetermined voltage is applied between the cathode 14 and the anode 41, the nanoparticles 13b uniformly dispersed in the dispersion medium 12 are attracted to the anode 41, as shown in part (b) of FIG. 22. At this time, therefore, no nanoparticles 13b are dispersed in the portion of the container 81 having the aspheric lens shape, so that the effect of the aspheric lens is reduced.

Figure 23:
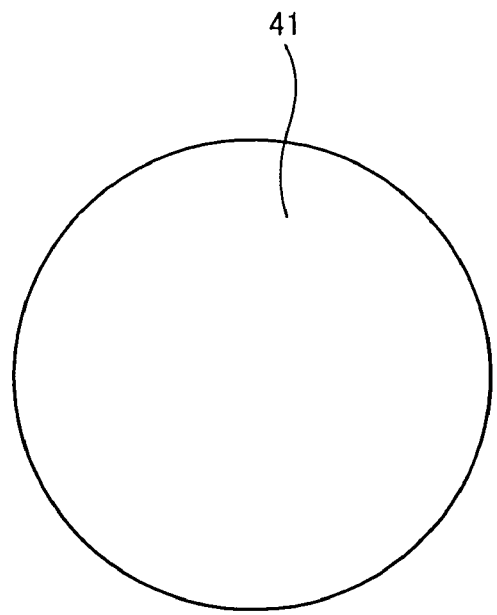
FIG. 23 is a plan view of an anode placed on a back surface in a light passage region of a container constituting an optical member.

FIG. 23 is a plan view of an anode placed on a back surface in a light passage region of a container constituting an optical member.

FIG. 23 shows in a plan view an anode 41 placed on a back surface in a light passage region of a container constituting an optical member. The anode 41 having a circular shape as illustrated may be placed on the back surface of the container in the light passage region to attract negative nanoparticles uniformly distributed in the dispersion medium in the container.

Figure 24:
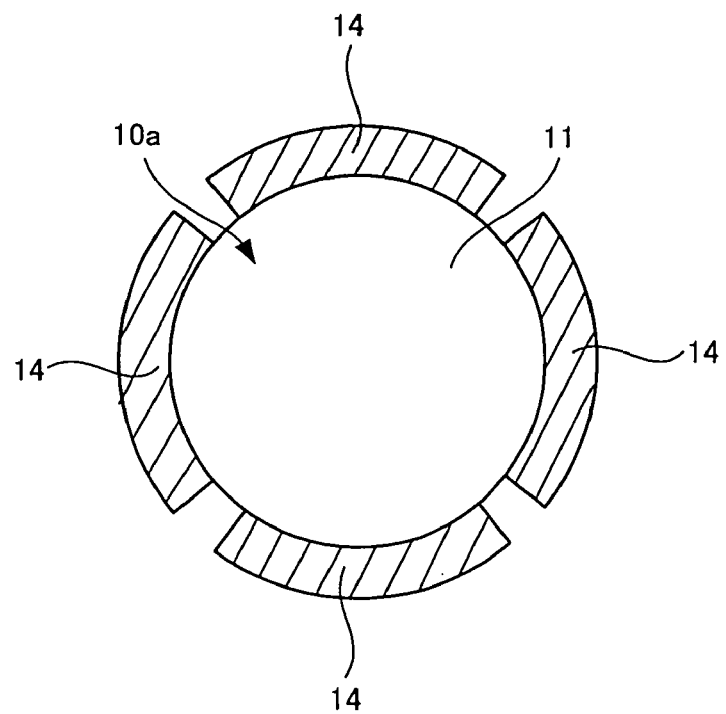
FIG. 24 is a diagram viewed from the incident-light side showing a container constituting an optical member and cathodes placed in such positions on the container as to surround a light passage region.

FIG. 24 is a diagram showing a container constituting an optical member and cathodes placed in such positions on the container as to surround a light passage region. The diagram is viewed from the incident light side.

Four divided cathodes 14 are placed in such positions on the container 11 shown in FIG. 24 as to surround the light passage region 10a. The distribution of positive nanoparticles dispersed in a dispersion medium may be freely controlled by using four divided cathodes 14 provided in such positions on the container 11 as to surround the light passage region 10a as described above.

Figure 25:
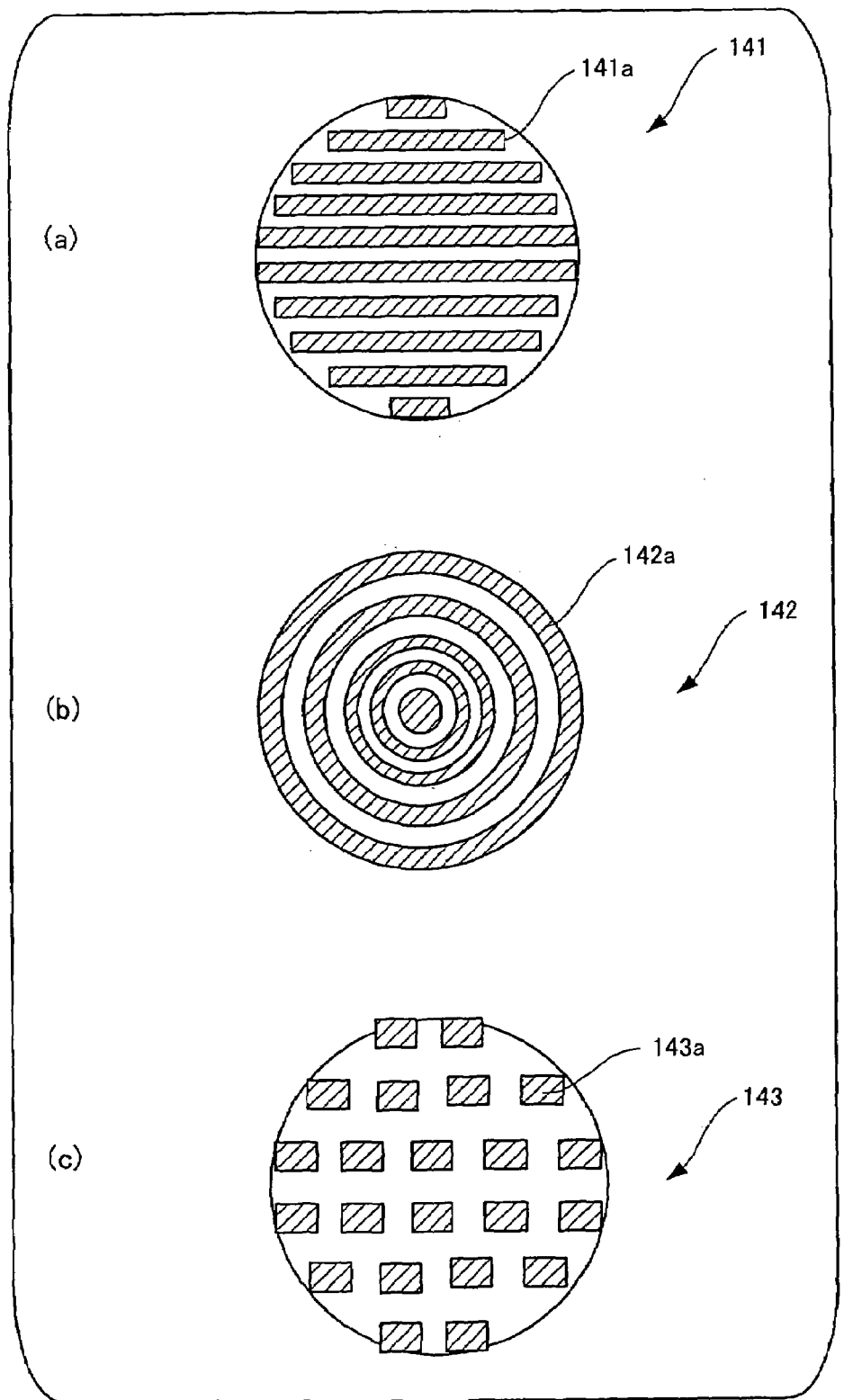
FIG. 25 is a diagram showing examples of various patterns for placement of anodes on a back surface in a light passage region of a container constituting an optical member.

FIG. 25 is a diagram showing examples of various patterns for placement of anodes on a back surface in a light passage region of a container constituting an optical member.

An anode 141 shown in part (a) of FIG. 25 has a pattern 141a of electrode elements in the form of horizontal stripes. An anode 142 shown in part (b) of FIG. 25 has a pattern 142a of concentric-circle electrode elements. An anode 143 shown in part (c) of FIG. 25 has a pattern 143a of electrode elements in matrix form. Voltages having various waveforms and various application patterns may be selectively applied to an electrode pattern such as the patterns 141a, 142a or 143a to control the distribution of negative nanoparticles using such anodes 141, 142 and 143. The refractive index of the optical member may be freely controlled by controlling the distribution of negative nanoparticles in this manner.

Figure 26:
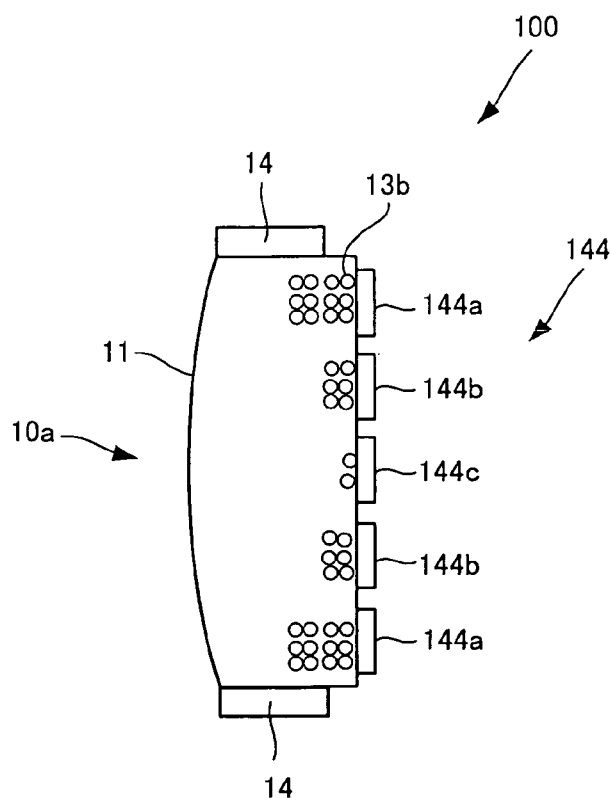
FIG. 26 is a diagram showing an example of control of the refractive index of an optical member using the pattern of concentric-circle electrode elements shown in part (b) of FIG. 25.

FIG. 26 is a diagram showing an example of control of the refractive index of an optical member using the pattern of concentric-circle electrode elements shown in part (b) of FIG. 25.

An anode 144 for attracting nanoparticles 13b is placed on a back surface in a light passage region 10a of a container 11 constituting an optical member 100. The anode 144 has a first concentric-circle electrode element 144a in the pattern and a second concentric-circle electrode element 144b in the pattern in order from the outer circumferential side. The anode 144 also has a circular electrode element 144c at a center. The highest voltage is applied to the electrode element 144a, a lower voltage is applied to the electrode element 144b, and the lowest voltage is applied to the electrode element 144c.

Since the highest voltage is applied to the electrode element 144a, a larger amount of nanoparticles 13b is attracted to the electrode element 144a. Amounts of nanoparticles 13b according to the voltages applied to the electrode patterns 144b and 144c are respectively attracted to the electrode patterns 144b and 144c. The distribution of nanoparticles 13b may be controlled according to the voltages applied to the electrode elements 144a, 144b and 144c of the anode 144 in the electrode pattern as described above.

In the pattern of electrode elements 141a in stripe form shown in part (a) of FIG. 25, lower to higher voltages may be applied to the electrode elements 141a in correspondence with the uppermost to lowermost positions to realize an optical member having a prism effect. Also, in the pattern of electrode elements 143a in matrix form shown in part (c) of FIG. 25, voltages selected as desired may be applied to the electrode elements 143a to realize an optical member for correcting ordinary lens aberrations.

Figure 27:
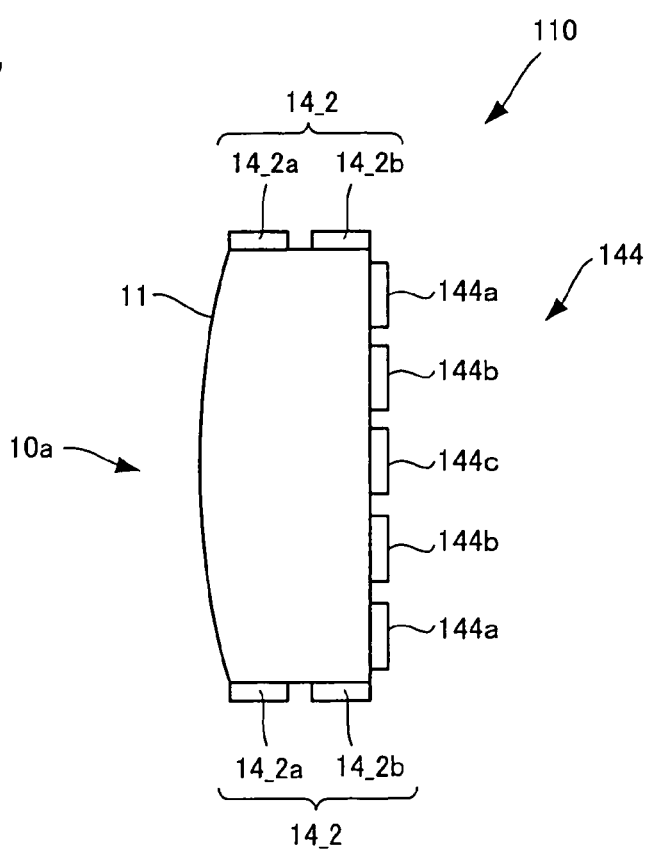
FIG. 27 is a diagram showing an example of the placement of a cathode having two electrode elements placed in such positions as to surround a light passage region of a container constituting an optical member.

FIG. 27 is a diagram showing an example of the placement of a cathode having two electrode elements placed in such positions as to surround a light passage region of a container constituting an optical member.

Referring to FIG. 27, a cathode 14_2 has two electrode elements 14_2a and 14_2b placed in such positions as to surround a light passage region 10a of a container 11 constituting an optical member 110. The distribution of nanoparticles 13b may be freely controlled by applying desired voltages to the electrode elements 14_2a and 14_2b of the cathode 14_2 and applying desired voltages to electrode elements 144a, 144b and 144c of the anode 144.

Figure 28:
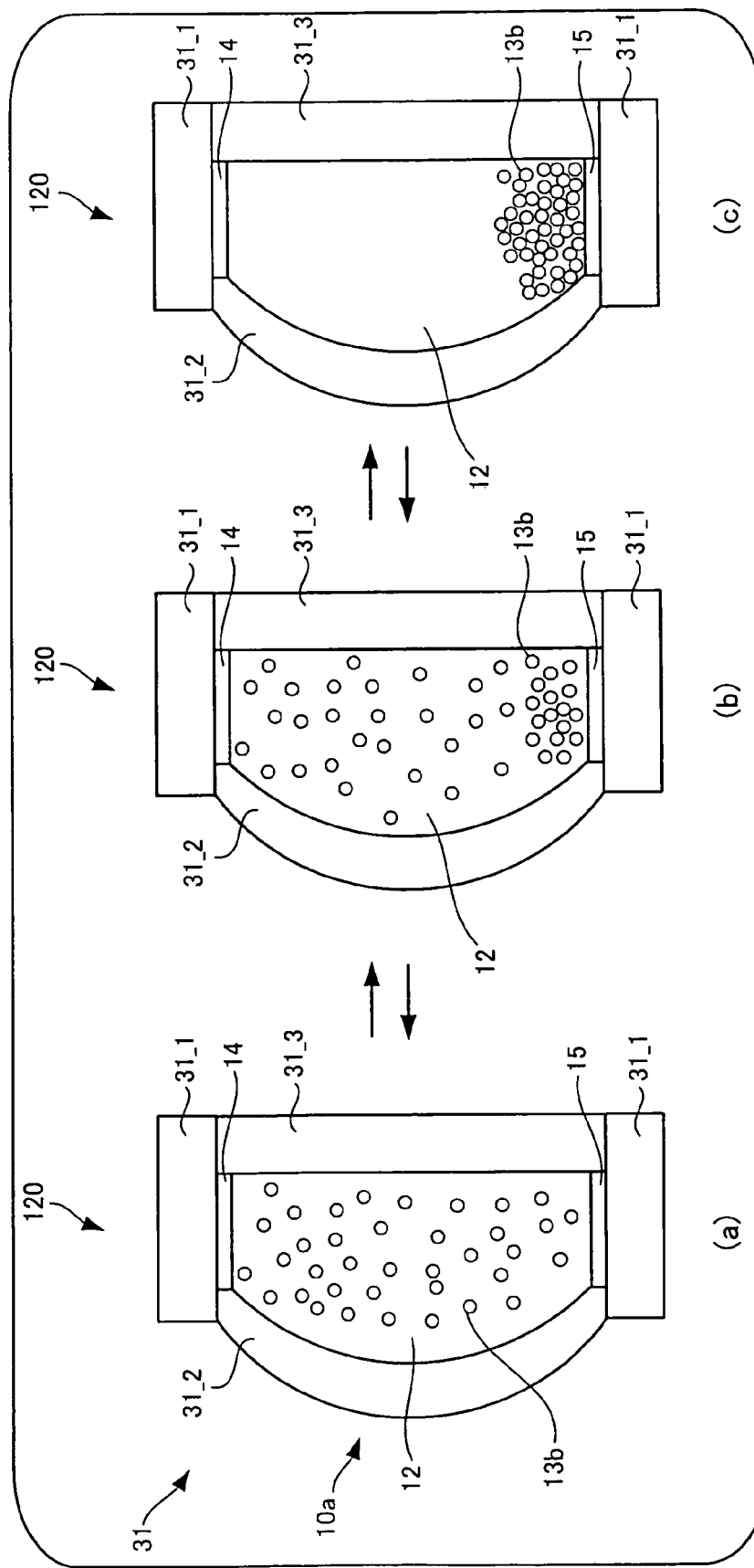
FIG. 28 is a diagram showing the movement of nanoparticles in a dispersion medium in an optical member having the shape of a lens having a convex outer surface.

FIG. 28 is a diagram showing the movement of nanoparticles in a dispersion medium in an optical member having the shape of a lens having a convex outer surface.

The optical member 120 shown in FIG. 28 has a container 31 constituted by a cylindrical member 31_1 placed so as to surround a cathode 14 and an anode 15 and light-transmissive members 31_2 and 31_3 fitted in front and rear portions of the member 31_1. These members 31_1, 31_2, and 31_3 are formed of a plastic. Therefore, the container 31 can be realized as a lightweight container having high impact resistance.

As shown in part (a) of FIG. 28, nanoparticles 13b negatively charged are uniformly distributed in the dispersion medium 12. When a predetermined voltage is applied between the cathode 14 and the anode 15, the nanoparticles 13b uniformly distributed in the dispersion medium 12 are gradually attracted to the anode 15, as shown in part (b) of FIG. 28. Finally, the greater part of the nanoparticles 13b distributed in the dispersion medium 12 are attracted to the anode 15, as shown in part (c) of FIG. 28. Correspondingly, the refractive index of the optical member 120 changes from a comparatively high value resulting from the refractive index of the dispersion medium 12 and a refractive index determined by the nanoparticles 13b to a comparatively low value determined by the refractive index of the dispersion medium 12 only.

Figure 29:
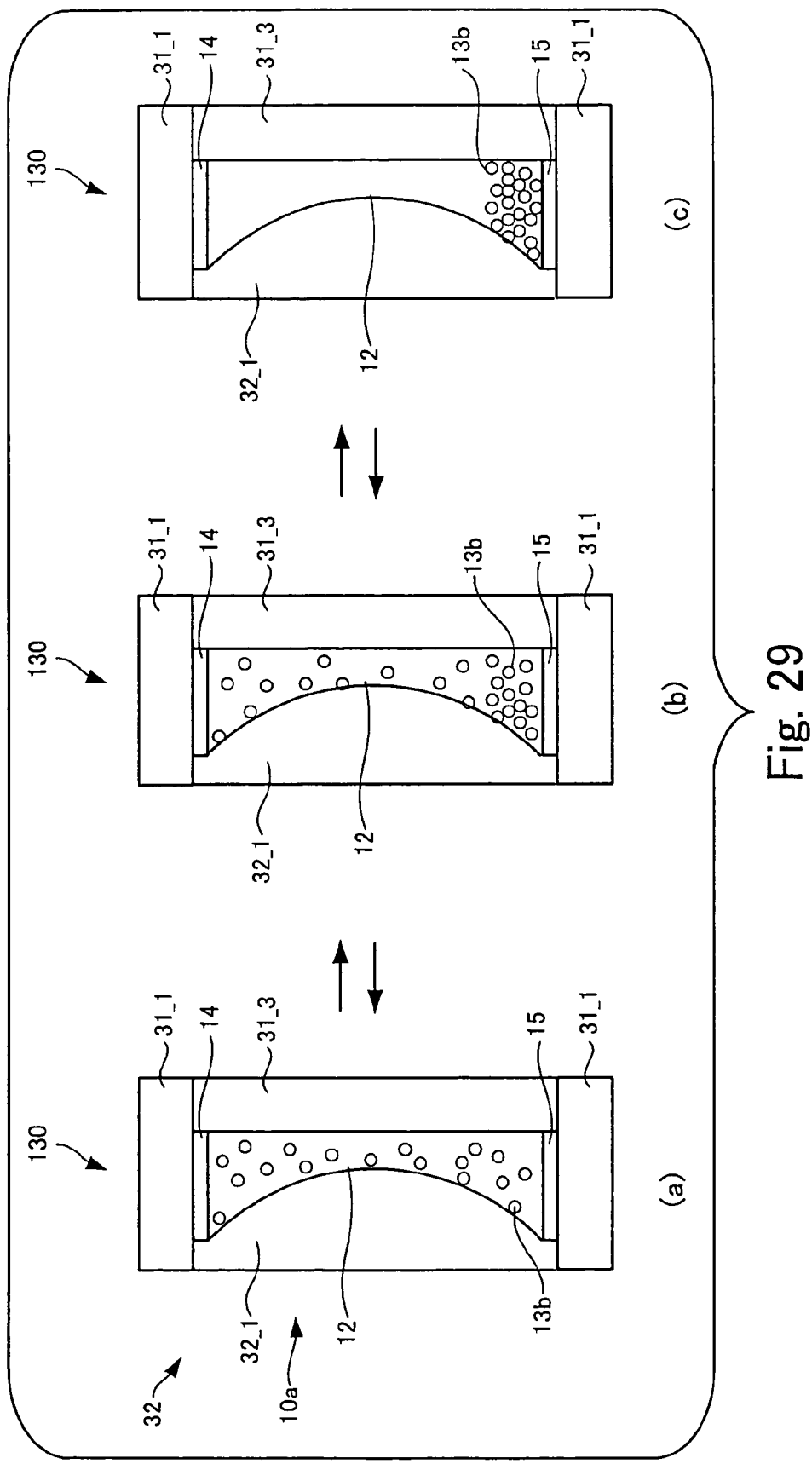
FIG. 29 is a diagram showing the movement of nanoparticles in a dispersion medium in an optical member having the shape of a lens having a concave outer surface.

FIG. 29 is a diagram showing the movement of nanoparticles in a dispersion medium in an optical member 130 having the shape of a lens having a concave outer surface.

The optical member 130 shown in FIG. 29 has a container 32 constituted by a cylindrical member 31_1 placed so as to surround a cathode 14 and an anode 15 and light-transmissive members 32_1 and 31_3 fitted in front and rear portions of the member 31_1. These members 31_1, 32_1, and 31_3 are formed of a plastic. As shown in part (a) of FIG. 29, nanoparticles 13b negatively charged are uniformly distributed in the dispersion medium 12.

When a predetermined voltage is applied between the cathode 14 and the anode 15, the nanoparticles 13b uniformly distributed in the dispersion medium 12 are gradually attracted to the anode 15, as shown in part (b) of FIG. 29. Finally, the greater part of the nanoparticles 13b distributed in the dispersion medium 12 are attracted to the anode 15, as shown in part (c) of FIG. 29. Correspondingly, the refractive index of the optical member 130 changes from a comparatively high value resulting from the refractive index of the dispersion medium 12 and a refractive index determined by the nanoparticles 13b to a comparatively low value determined by the refractive index of the dispersion medium 12 only.

Figure 30:
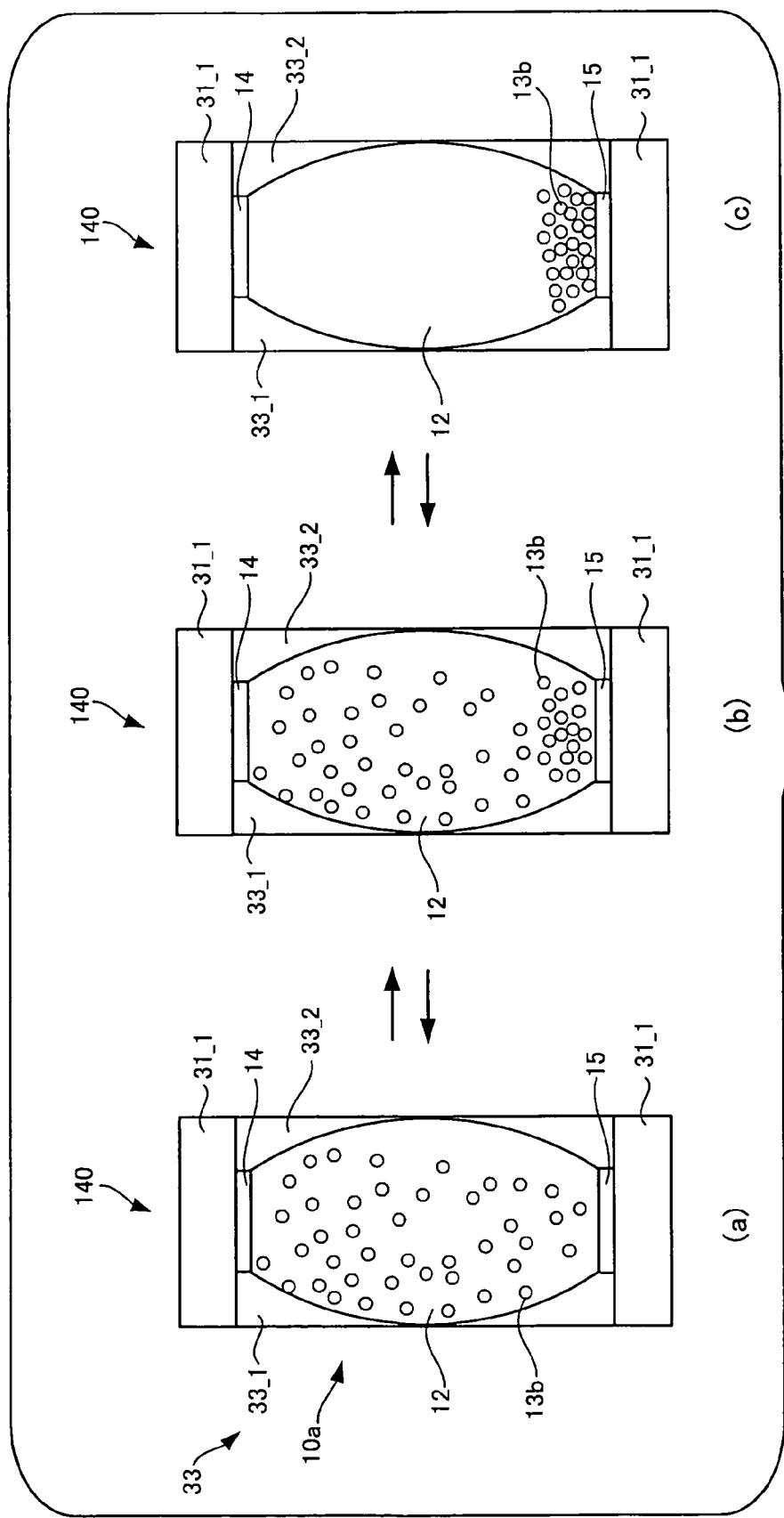
FIG. 30 is a diagram showing the movement of nanoparticles in a dispersion medium in an optical member having the shape of a lens having two convex outer surfaces.

FIG. 30 is a diagram showing the movement of nanoparticles in a dispersion medium in an optical member having the shape of a lens having two convex outer surfaces.

The optical member 140 shown in FIG. 30 has a container 33 constituted by a cylindrical member 31_1 placed so as to surround a cathode 14 and an anode 15 and light-transmissive members 33_1 and 33_2 fitted in front and rear portions of the member 31_1. As shown in part (a) of FIG. 30, nanoparticles 13b negatively charged are uniformly distributed in the dispersion medium 12. When a predetermined voltage is applied between the cathode 14 and the anode 15, the nanoparticles 13b uniformly distributed in the dispersion medium 12 are gradually attracted to the anode 15, as shown in part (b) of FIG. 30. Finally, the greater part of the nanoparticles 13b distributed in the dispersion medium 12 are attracted to the anode 15, as shown in part (c) of FIG. 30. Correspondingly, the refractive index of the optical member 140 changes from a comparatively high value resulting from the refractive index of the dispersion medium 12 and a refractive index determined by the nanoparticles 13b to a comparatively low value determined by the refractive index of the dispersion medium 12 only.

Figure 31:
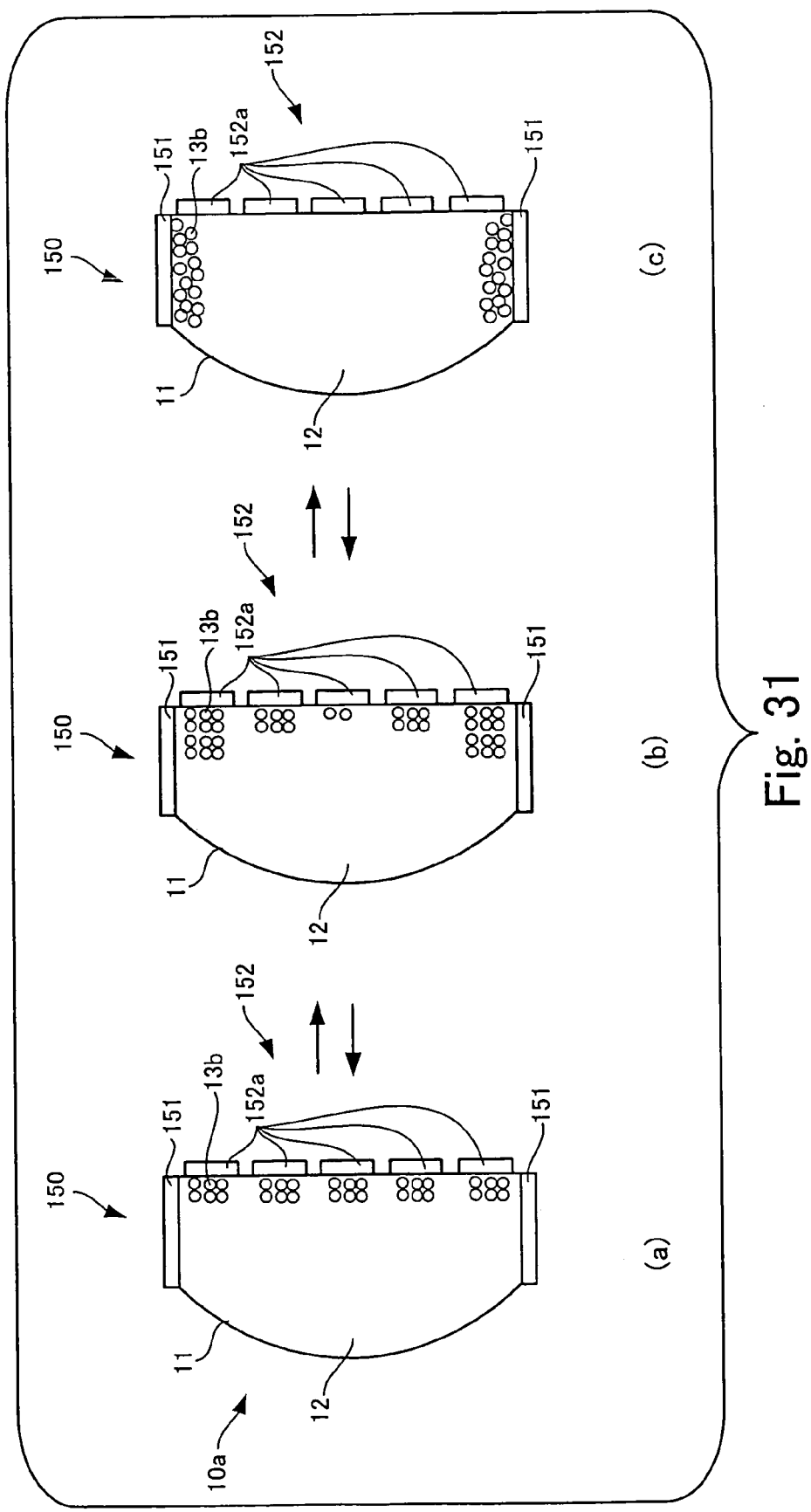
FIG. 31 is a diagram showing a sectional configuration of an optical member which has electrodes to which negative and positive voltages are freely applied, and which has the shape of a lens having a convex outer surface.

FIG. 31 is a diagram showing a sectional configuration of an optical member which has electrodes to which negative and positive voltages are freely applied, and which has the shape of a lens having a convex outer surface.

A first electrode 151 is placed in such a position on a container 11 constituting the optical member 150 as to surround a light passage region 10a. Also, a second electrode 152 constituted of a certain number of electrode elements 152 is placed on a back surface of the container 11 facing the light passage region 10a. Further, negative nanoparticles 13b are dispersed in a dispersion medium 12.

If a negative voltage and a positive voltage are respectively applied to the first and second electrodes 151 and 152, the first and second electrodes 151 and 152 serve as a cathode and an anode, respectively. If a positive voltage and a negative voltage are respectively applied to the first and second electrodes 151 and 152, the first and second electrodes 151 and 152 serve as an anode and a cathode, respectively.

It is assumed that a negative voltage and a positive voltage are first applied respectively to the first and second electrodes 151 and 152 in the optical member 150 shown in part (a) of FIG. 31. The first and second electrodes 151 and 152 then serve as a cathode and an anode, respectively. It is assumed here that equal positive voltages are applied to the electrode elements 152a constituting the second electrode 152. Accordingly, in this case, equal amounts of nanoparticles 13b are attracted to the electrode elements 152a.

Subsequently, the highest positive voltage is applied to the electrode elements 152a at the opposite ends in the electrode elements 152a constituting the second electrode 152; the lowest positive voltage is applied to the central electrode element 152a; and a medium positive voltage is applied to the electrode elements 152a positioned between the electrode elements 152a at the opposite ends and the central electrode element 152a. Then, the largest amounts of nanoparticles 13b are attracted to the electrode elements 152a at the opposite ends and a small amount of nanoparticles 13b is attracted to the central electrode element 152a, as shown in part (b) of FIG. 31. Also, medium amounts of nanoparticles 13b are attracted to the electrode elements 152a between the electrode elements 152a at the opposite ends and the central electrode element 152a.

Further, a positive voltage and a negative voltage are respectively applied to the first and second electrodes 151 and 152. The first and second electrodes 151 and 152 then serve as an anode and a cathode, respectively, and nanoparticles 13b are attracted to the first electrode 151, as shown in part (c) of FIG. 31. The distribution of nanoparticles 13b may be controlled in this manner.

Figure 32:
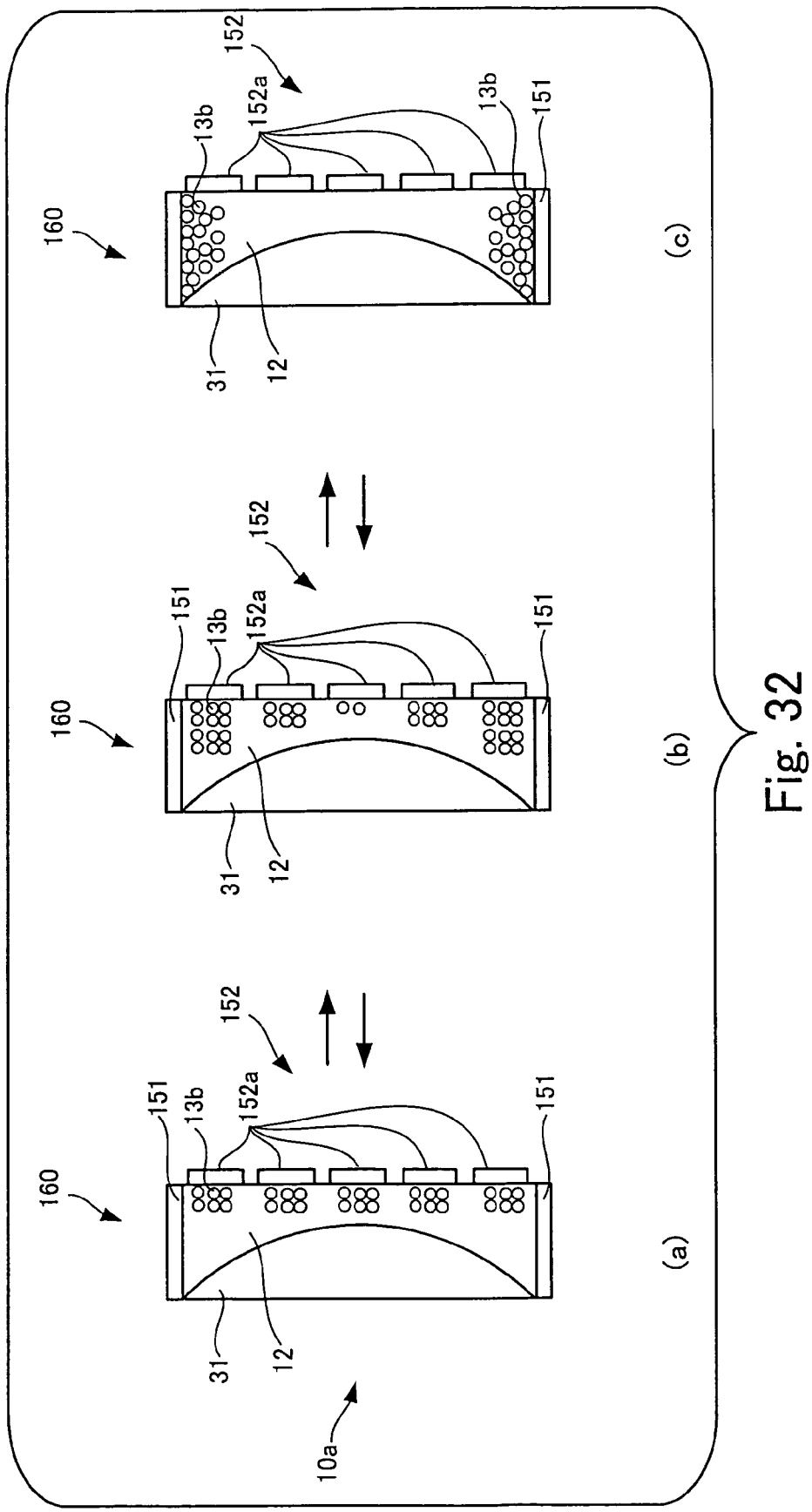
FIG. 32 is a diagram showing a sectional configuration of an optical member which has electrodes to which negative and positive voltages are freely applied, and which has the shape of a lens having a concave outer surface.

FIG. 32 is a diagram showing a sectional configuration of an optical member which has electrodes to which negative and positive voltages are freely applied, and which has the shape of a lens having a concave outer surface.

A first electrode 151 is placed in such a position on a container 31 constituting the optical member 160 as to surround a light passage region 10a. Also, a second electrode 152 constituted of a certain number of electrode elements 152a is placed on a back surface of the container 31 facing the light passage region 10a. Further, negative nanoparticles 13b are dispersed in a dispersion medium 12.

In the optical member 160 shown in part (a) of FIG. 32, a negative voltage and a positive voltage are first applied respectively to the first and second electrodes 151 and 152. It is assumed here that equal positive voltages are applied to the electrode elements 152*a* constituting the second electrode 152. Accordingly, equal amounts of nanoparticles 13*b* are attracted to the electrode elements 152*a*.

Subsequently, the highest positive voltage is applied to the electrode elements 152*a* at the opposite ends in the electrode elements 152*a* constituting the second electrode 152; the lowest positive voltage is applied to the central electrode element 152*a*; and a medium positive voltage is applied to the electrode elements 152*a* positioned between the electrode elements 152*a* at the opposite ends and the central electrode element 152*a*. Then, the largest amounts of nanoparticles 13*b* are attracted to the electrode elements 152*a* at the opposite ends and a small amount of nanoparticles 13*b* are attracted to the central electrode element 152*a*, as shown in part (b) of FIG. 32. Also, medium amounts of nanoparticles 13*b* are attracted to the electrode elements 152*a* between the electrode elements 152*a* at the opposite ends and the central electrode element 152*a*.

Further, a positive voltage and a negative voltage are respectively applied to the first and second electrodes 151 and 152 as shown in part (c) of FIG. 32. The first and second electrodes 151 and 152 then serve as an anode and a cathode, respectively, and nanoparticles 13*b* are attracted to the first electrode 151.

Figure 33:
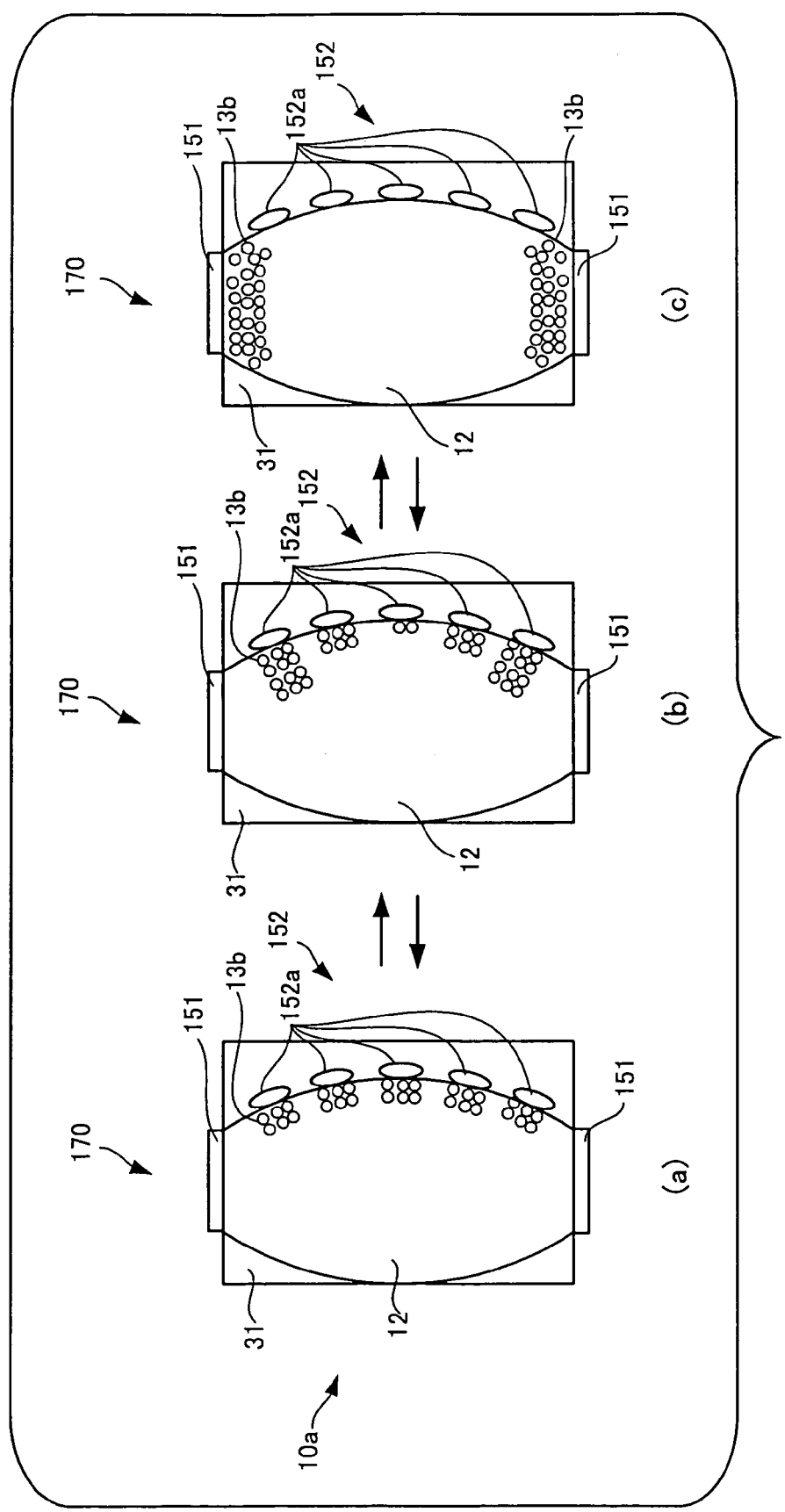
FIG. 33 is a diagram showing a sectional configuration of an optical member which has electrodes to which negative and positive voltages are freely applied, and which has the shape of a lens having two convex outer surface.

FIG. 33 is a diagram showing a sectional configuration of an optical member 170 which has electrodes to which negative and positive voltages are freely applied, and which has the shape of a lens having two convex outer surfaces.

In the optical member 170 shown in part (a) of FIG. 33, a negative voltage and a positive voltage are respectively applied to the first and second electrodes 151 and 152. It is assumed here that equal positive voltages are applied to the electrode elements 152*a* constituting the second electrode 152. Accordingly, equal amounts of nanoparticles 13*b* are attracted to the electrode elements 152*a*.

Subsequently, the highest positive voltage is applied to the electrode elements 152*a* at the opposite ends in the electrode elements 152*a* constituting the second electrode 152; the lowest positive voltage is applied to the central electrode element 152*a*; and a medium positive voltage is applied to the electrode elements 152*a* positioned between the electrode elements 152*a* at the opposite ends and the central electrode element 152*a*. Then, the largest amounts of nanoparticles 13*b* are attracted to the electrode elements 152*a* at the opposite ends and a small amount of nanoparticles 13*b* are attracted to the central electrode element 152*a*, as shown in part (b) of FIG. 33. Also, medium amounts of nanoparticles 13*b* are attracted to the electrode elements 152*a* between the electrode elements 152*a* at the opposite ends and the central electrode element 152*a*.

Further, a positive voltage and a negative voltage are respectively applied to the first and second electrodes 151 and 152. The first and second electrodes 151 and 152 then serve as an anode and a cathode, respectively, and nanoparticles 13*b* are attracted to the first electrode 151, as shown in part (c) of FIG. 33.

Figure 34:
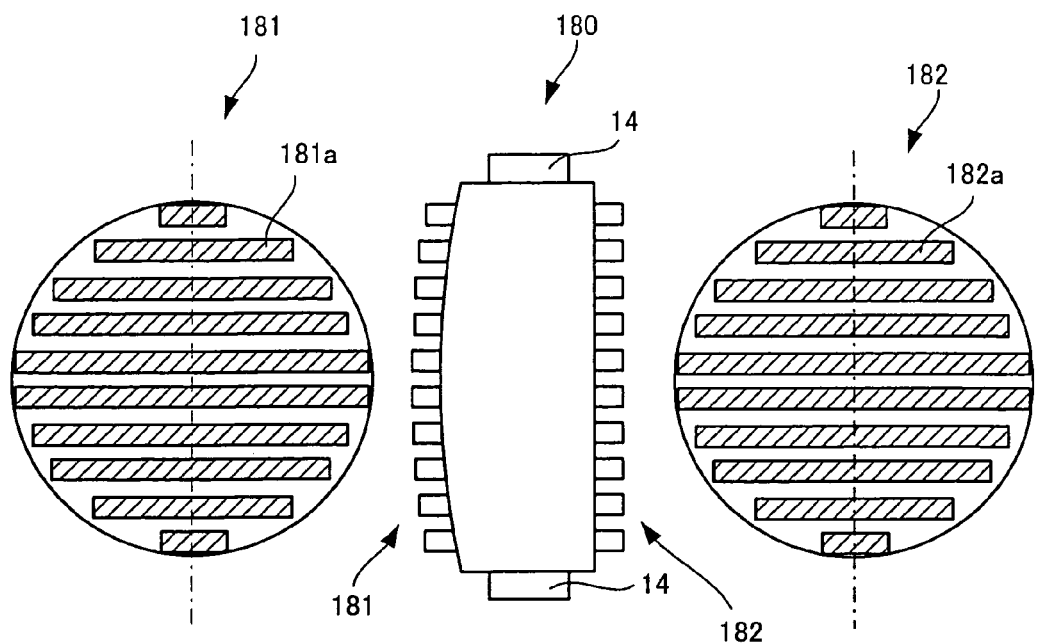
FIG. 34 is a diagram showing a sectional configuration of a first optical member having a devised electrode pattern.

FIG. 34 is a diagram showing a sectional configuration of a first optical member having a devised electrode pattern.

In the optical member 180 shown in FIG. 34, a cathode 14 is placed in such a position on a container such as to surround a light passage region 10*a*. In the optical member 180, an anode 181 having a pattern of electrode elements 181*a* in the form of horizontal stripes is placed on a front surface of the container facing the light passage region 10*a*. Further, in the optical member 180, an anode 182 having a pattern of electrode elements 182*a* in the form of horizontal stripes is placed on a back surface of the container facing the light passage region 10*a*. Since the electrode patterns 181*a* and 182*a* of the anodes 181 and 182 are symmetrical, this optical member 180 is capable of rapidly controlling the refractive index, for example, by applying voltages such that the voltage value is gradually reduced (or increased) from the top to the bottom of the electrode patterns 181*a* and 182*a*. A prism effect can be rapidly produced in this way. The thus-constructed optical member 180 may be provided in a camera together with an acceleration sensor for camera shake correction to perform vertical camera shake correction of a lens provided in the camera according to a signal from the acceleration sensor. Also, the thus-constructed optical member 180 may be provided in a viewfinder of a camera to make parallax correction.

Figure 35:
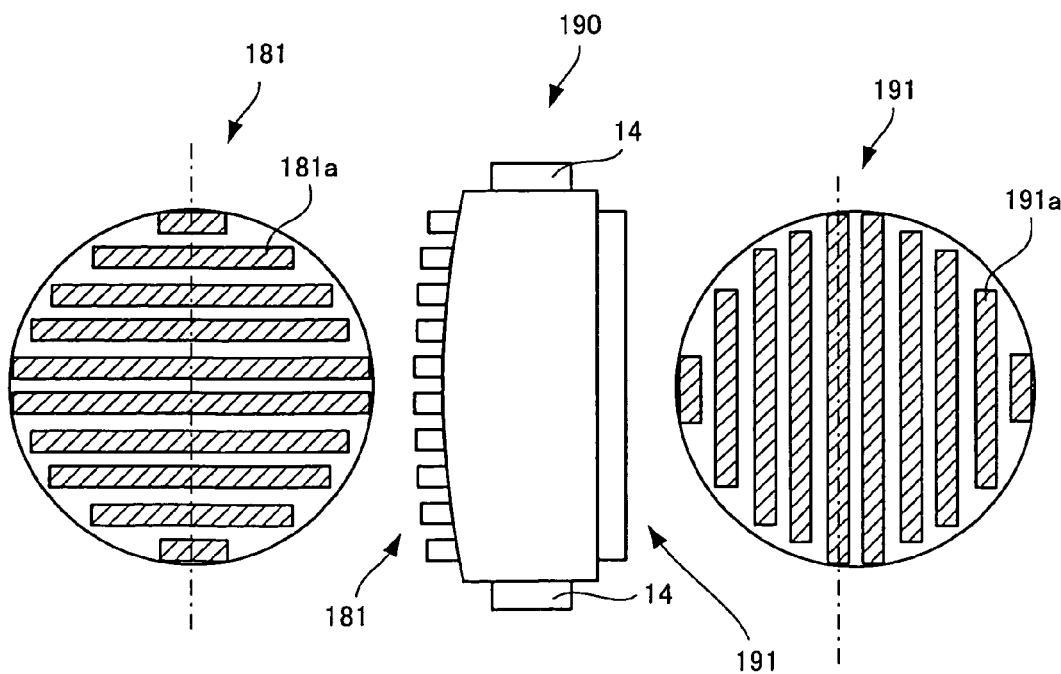
FIG. 35 is a diagram showing a sectional configuration of a second optical member having a devised electrode pattern.

FIG. 35 is a diagram showing a second optical member having a devised electrode pattern.

The optical member 190 shown in FIG. 35 differs from the optical member 180 shown in FIG. 34 in that an anode 191 having a pattern of electrode elements 191*a* in the form of vertical stripes is provided in place of the anode 182 having the pattern of electrode elements 182*a* in the form of horizontal stripes. Camera shake correction and parallax correction along the vertical and horizontal directions of a lens may be performed by controlling the refractive index in the vertical direction by means of the electrode pattern 181*a* and controlling the refractive index in the horizontal direction by means of the electrode pattern 191*a*.

Figure 36:
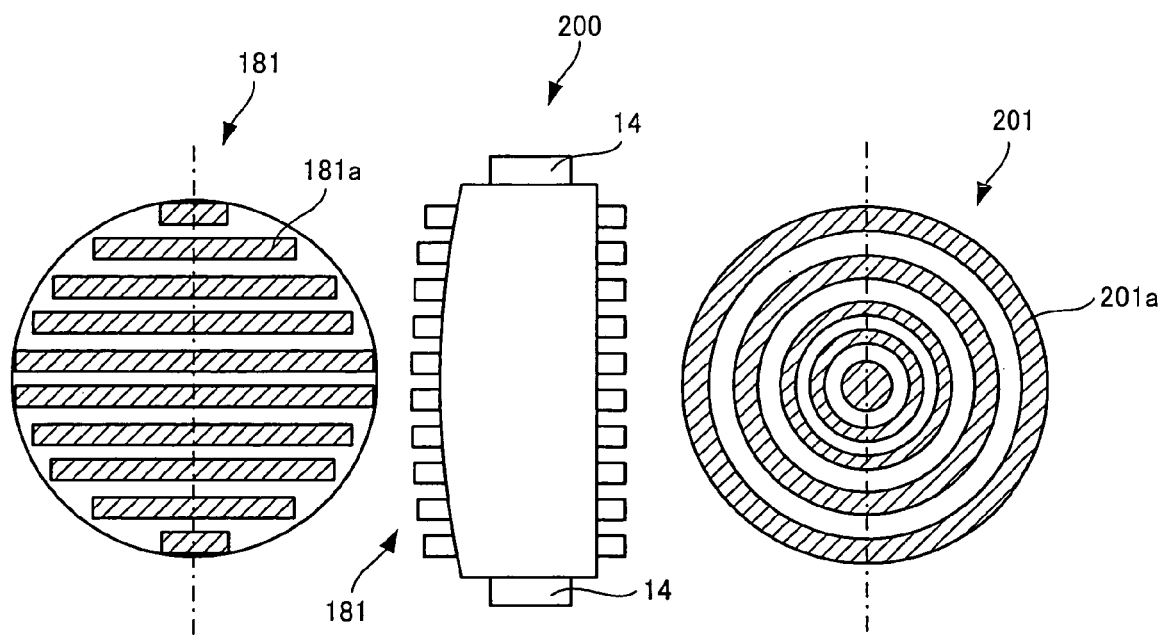
FIG. 36 is a diagram showing a sectional configuration of a third optical member having a devised electrode pattern.

FIG. 36 is a diagram showing a third optical member having a devised electrode pattern.

The optical member 200 shown in FIG. 36 differs from the optical member 190 shown in FIG. 35 in that an anode 201 having a pattern of concentric-circle electrode elements 201*a* is provided in place of the anode 191 having a pattern of electrode elements 191*a* in the form of vertical stripes. A picture-taking lens using one optical member 200 for camera shake correction and for focusing may be implemented by realizing a convex lens by means of the electrode pattern 201*a* and by realizing a prism effect by means of the electrode pattern 181*a*. Also, this optical member 200 may be used in a viewfinder optical system of a camera having a zoom lens to realize a zoom finder capable of changing according to the field of view changed by the zoom lens. Further, the same anode as the anode 201 having the pattern of concentric-circle electrode elements 201*a* may be provided in place of the anode 181 having the pattern of electrode elements 181*a* in the form of horizontal stripes to be operated in association with the anode 201 so as to rapidly move nanoparticles in the case of increasing the positive refractive power for example.

Figure 37:
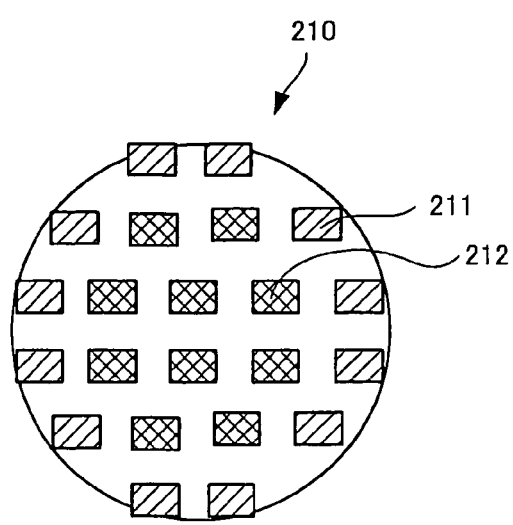
FIG. 37 is a diagram showing an anode having a pattern of electrode elements in matrix form.

FIG. 37 is a diagram showing an anode having a pattern of electrode elements in matrix form.

An electrode 210 shown in FIG. 37 has a pattern of electrode elements in matrix form: electrode elements 211 placed in a peripheral region and electrode elements 212 placed in a central region. An optical member having this electrode 210 may be placed adjacent to an ordinary lens, and an aberration of the lens may be corrected as described below. An aberration correction table formed of data for correcting an aberration of the lens is prepared and the distribution of nanoparticles is controlled by applying the voltage to the electrode 210 according to the data in the aberration correction table. The refractive index of the optical member is thereby controlled so that the aberration of the lens is corrected.

The examples of optical members having a lens form have been described. Now, the examples of optical members having a shape other than a lens form will be described.

Figure 38:
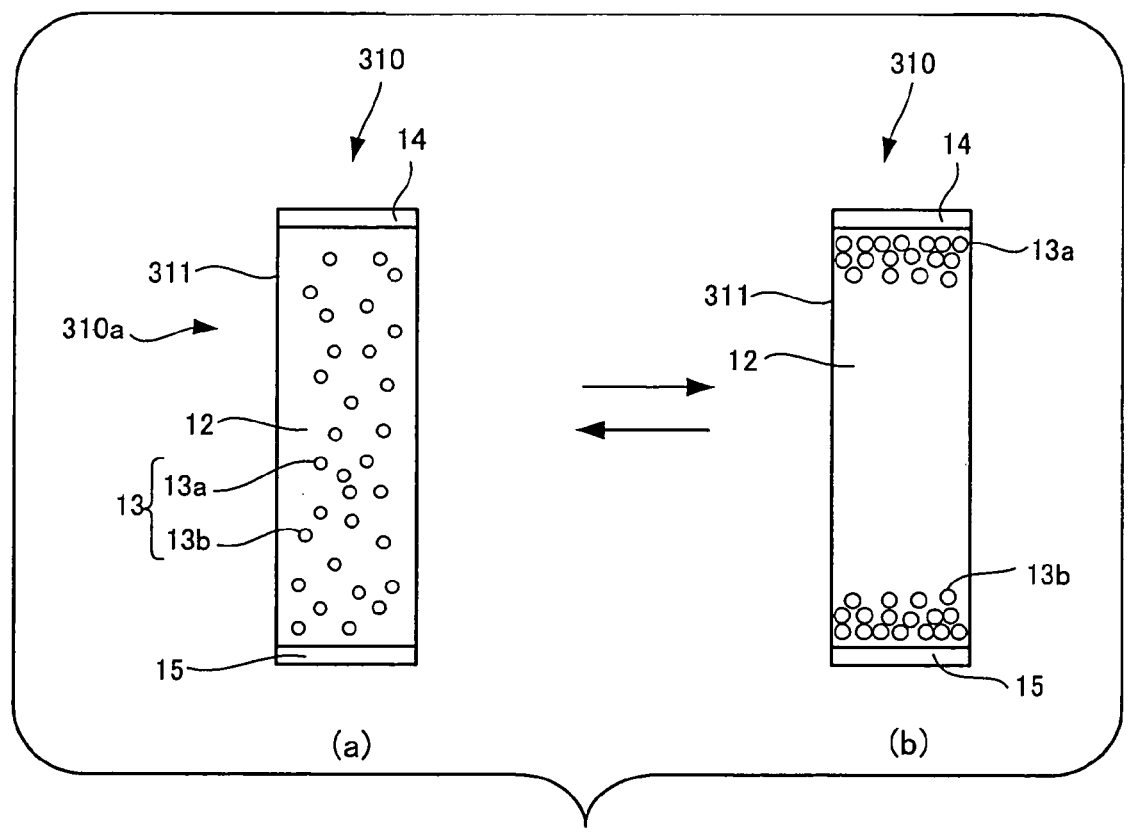
FIG. 38 shows an optical member having a flat plate shape.

FIG. 38 is a diagram showing optical members having a flat plate shape.

The optical members 310 are configured similarly as the optical member 10 having a lens form shown in FIG. 10, except for the shape of a container 311. In the optical member 310, the refraction of light passing through the light passage region 310a is controlled through electrophoresis of the dispersoid 13 which is dispersed in the light-transmissive dispersion medium 12 enclosed in the container 311 having the flat shape, the electrophoresis being effected according to the voltage applied between the cathode 14 and the anode 15. The optical member 310 is therefore obtained as a refractive index-variable plate having a refractive index determined by the dispersion medium 12 and the amount of movement of the dispersoid 13 in the light passage region 310a caused by electrophoresis.

When no voltage is applied between the cathode 14 and the anode 15, the dispersoid 13 is uniformly dispersed in the dispersion medium 12, as shown in part (a) of FIG. 38.

When a predetermined voltage is applied between the cathode 14 and the anode 15, the positively charged nanoparticles 13a in the dispersoid 13 uniformly dispersed in the dispersion medium 12 are attracted to the cathode 14 and the negatively charged nanoparticles 13b are attracted to the anode 15, as shown in part (b) of FIG. 38. The optical member 310 therefore has a comparatively low refractive index determined by the refractive index of the dispersion medium 12 only.

Now, explanation will be made on adjustment of light path using a refractive index-variable plate.

Figure 39:
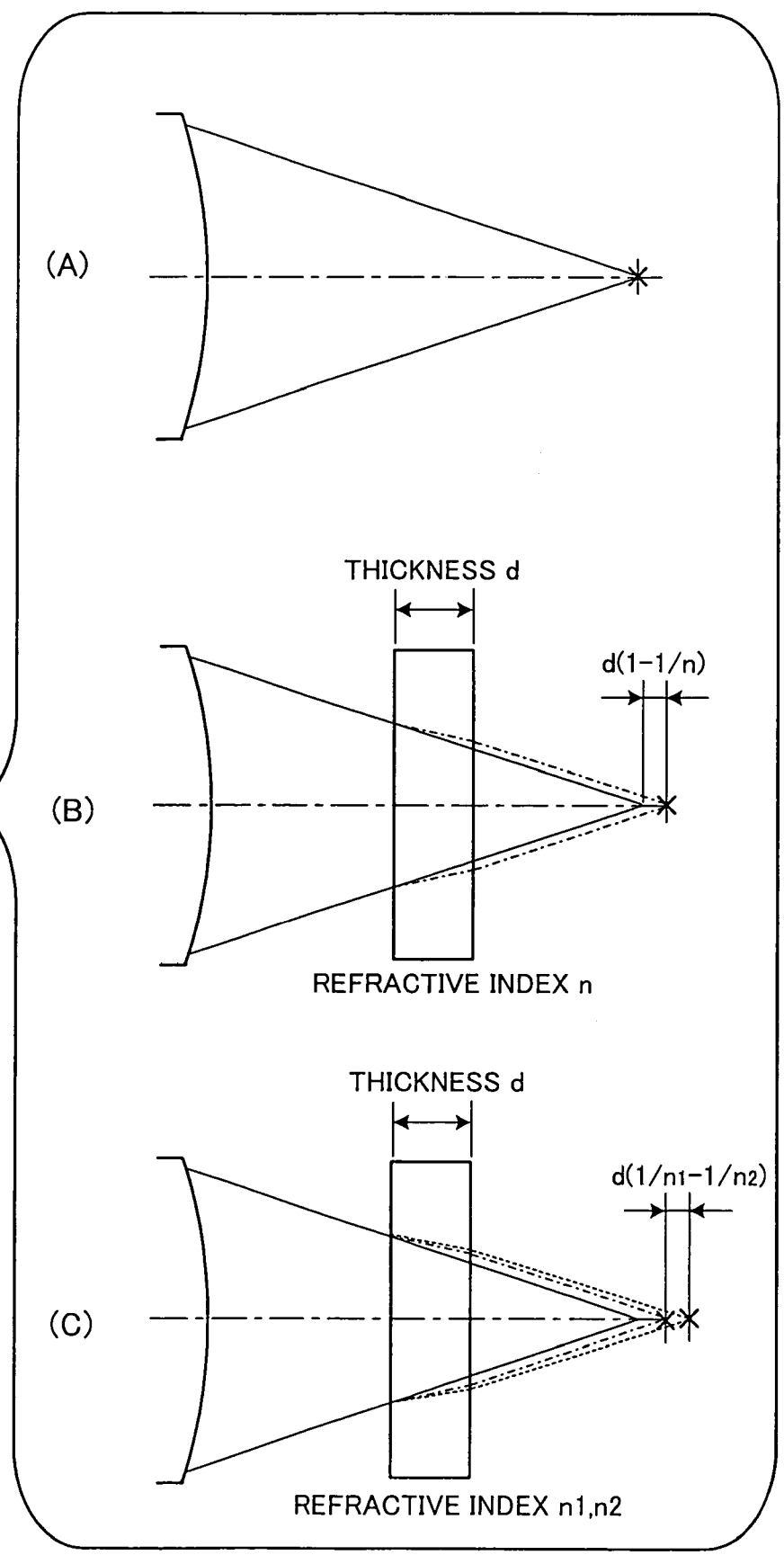
FIG. 39 is a diagram for explaining shifting of an imaging point in a refractive-index-variable plate.

FIG. 39 is a diagram for explaining shifting of an imaging point in a refractive index-variable plate.

An imaging point at which an image is formed by subject light from a convex lens is shown in part (A) of FIG. 39. The refractive index-variable plate having a thickness d and a refractive index n is inserted in the image space, as shown in part (B) of FIG. 39. The equivalent air length of the plate is expressed as a value (d/n) obtained by dividing the thickness d by the refractive index n. Consequently, the imaging point is shifted rearward (to the left as viewed in FIG. 39) by d(1−1/n).

In a case where two refractive index-variable plates having the same thickness d and having different refractive indices (n1 and n2) are provided and selectively inserted in the image space, the difference Δd between the imaging points determined by the plates is d(1/n1−1/n2), as shown in part (C) of FIG. 39. Since the distance of the imaging point from the rear focus in a lens system having a focal length f when the object distance is D is $f^2/D$, focusing to an infinite-distance object and an object at the distance shown by $f^2/D$ can be performed by inserting and removing the plates having the difference refractive indices. Adjustment of the focal length for this focusing can be performed by controlling the refraction of light through electrophoresis of the dispersoid 13 using the optical member 310 shown in FIG. 38 instead of inserting and removing the two refractive index-variable plates.

Also, various embodiments of the optical member 310 having a lens form can be applied to the optical member having a flat shape. For example, the optical member 310 may be provided with the insulating film 24 similar to the optical member 20 in FIG. 15. Or the anode 41 may be disposed on the back surface of the light passage region 310a similarly to the optical member 40 in FIG. 17. Further, plural electrodes may be provided in which the patterns of electrode elements in FIG. 25 can be applied as they are.

Subsequently, an example of an optical member having a prism shape will be explained.

Figure 40:
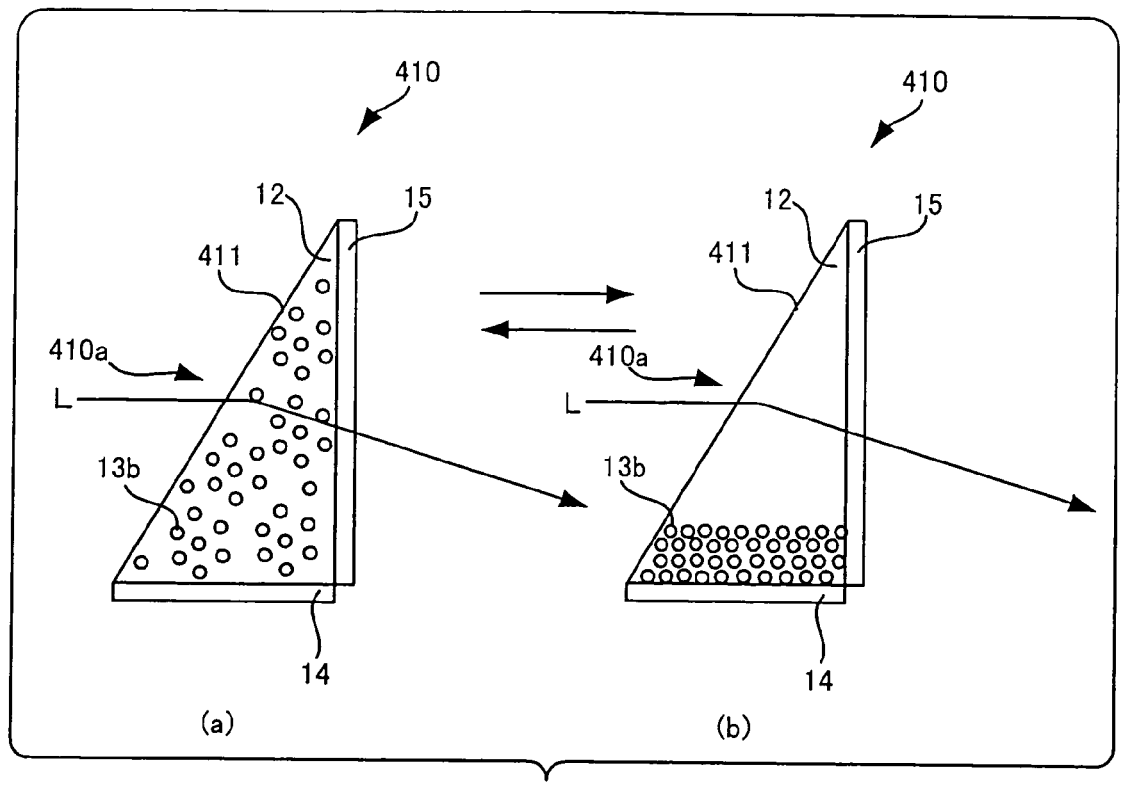
FIG. 40 shows an optical member having a prism shape.
Figure 41:
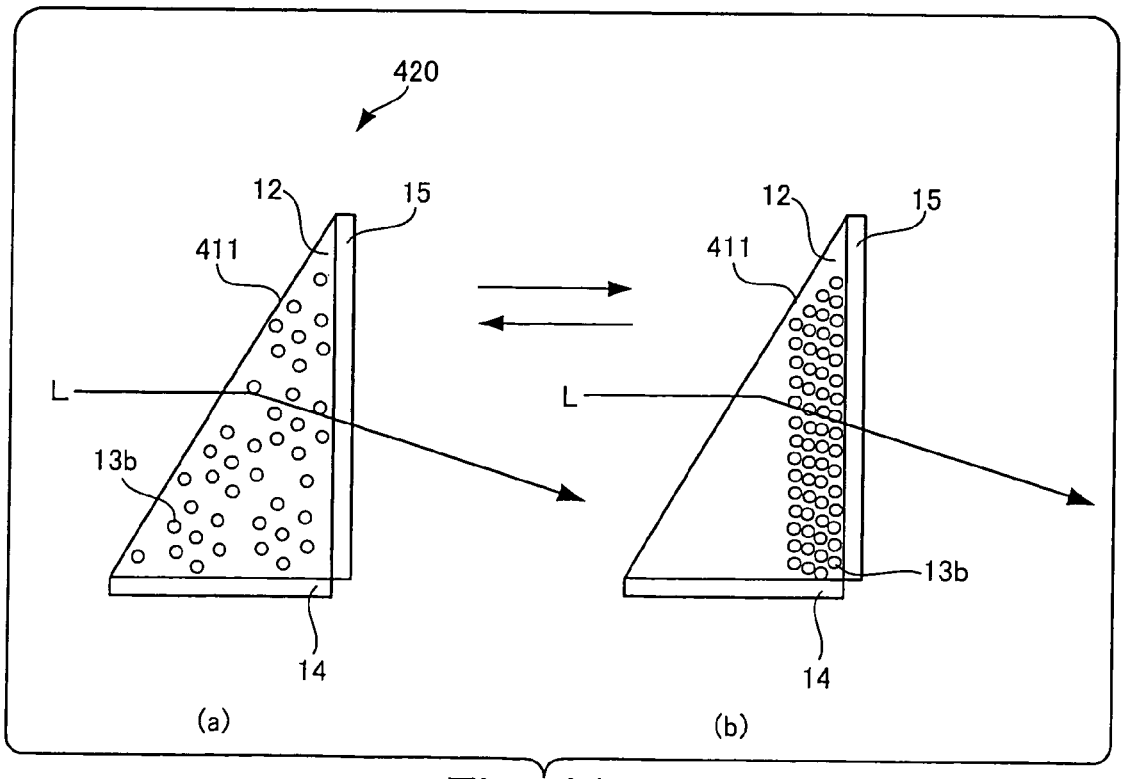
FIG. 41 shows an optical member having a prism shape.

FIGS. 40 and 41 show optical members having prism shape.

The optical members 410 in FIG. 40 are configured similarly as the optical member 10 having a lens form of FIG. 10 and the optical member 310 having a flat plate shape of FIG. 38, but is different in that external diameter of a container 411 is prism-shaped and a cathode is disposed in such a position as not to block a light passage region 410a. In addition, the optical member 410 only contains positively charged nanoparticles 13a without negatively-charged nanoparticles 13b.

When no voltage is applied between the cathode 14 and the anode 15, the positively charged nanoparticles 13a are uniformly dispersed in the dispersion medium 12, as shown in part (a) of FIG. 40. At that time the optical member has a refractive index determined according to the dispersion medium 12 and the amount of positively charged nanoparticles 13a present in the light passage region 410a. Therefore the light L incident on the optical member 410 has relatively large refraction.

When a predetermined voltage is applied between the cathode 14 and the anode 15, the positively charged nanoparticles 13a uniformly dispersed in the dispersion medium 12 are attracted to the cathode 14, as shown in part (b) of FIG. 40. The refractive index of the optical member 410 therefore is determined by the refractive index of the dispersion medium 12 only, which is smaller than that in the state shown in part (a) of FIG. 40. Thus the light L incident on the optical member 410 has smaller refraction.

The optical member 420 in FIG. 41 is configured similarly as the optical member 410 in FIG. 40, but contains negatively charged nanoparticles 13b in place of positively charged nanoparticles 13a.

When a predetermined voltage is applied between the cathode 14 and the anode 15, the negatively charged nanoparticles 13b uniformly dispersed in the dispersion medium 12 are attracted to the anode 15, as shown in part (b) of FIG. 41. Consequently, refractive index of the optical member 420 rises, leading to larger refraction of the light L incident on the optical member 420.

In this way, refraction of light can also be controlled using the optical member having a prism shape. Further, various embodiments such as provision of electrodes and insulating films can be applied to the optical members 410 and 420 respectively shown in FIGS. 40 and 41 similarly as in the case of the optical member having a lens shape and a flat shape.

Explanation has been made on the optical members which control refraction of light by using electrophoresis of the dispersoid dispersed in the dispersion medium. Now, description will be made on the optical member which controls refraction of light by using magnetophoresis of the magnetic dispersoid dispersed in the dispersion medium.

Figure 42:
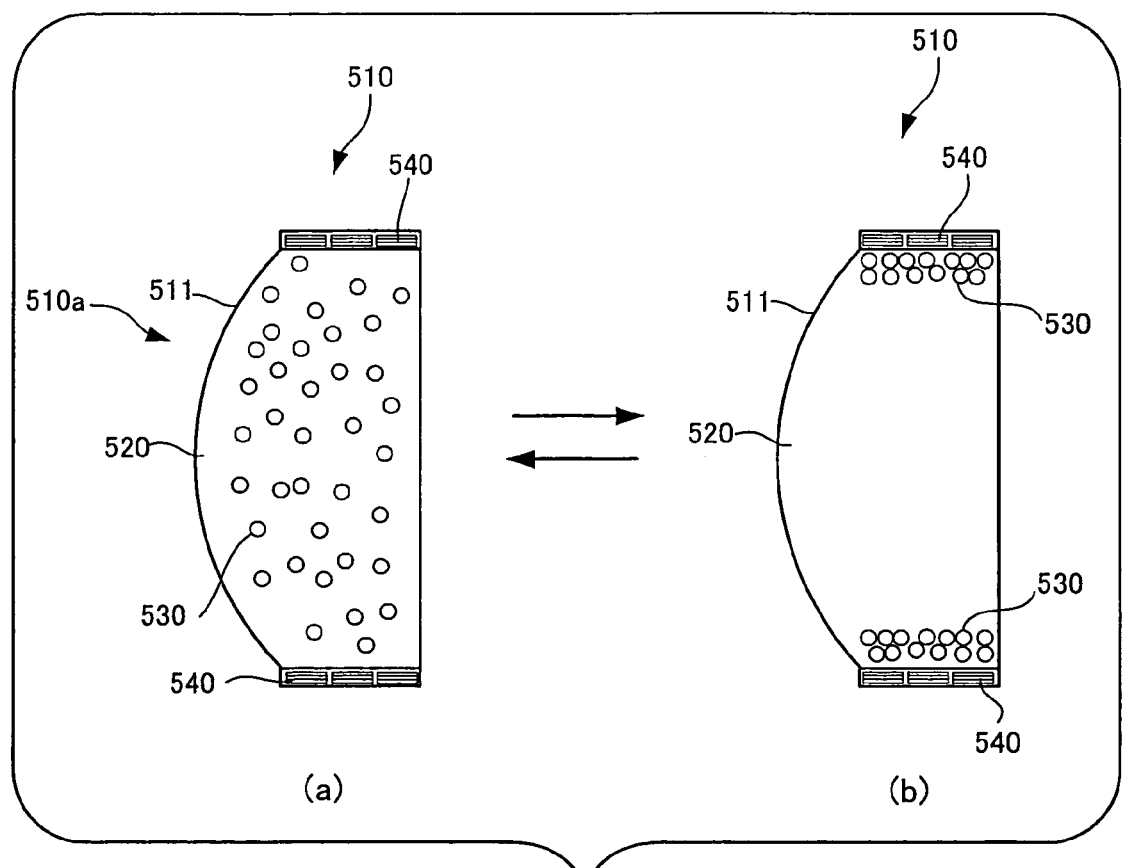
FIG. 42 is a diagram showing a sectional configuration of an optical member in which the refraction of light is changed by causing magnetophoresis of a dispersoid.

FIG. 42 is a diagram showing a sectional configuration of an optical member in which the diffraction of light is changed by effecting magnetophoresis of a dispersoid.

An optical member 510 shown in FIG. 42 has the shape of a lens, as does the container 11 of the optical member 10 shown in FIG. 10, and has a transparent dispersion medium 520 and transparent magnetic nanoparticles 530 enclosed in a container 511 which is light-transmissive at least in a light passage region 510a. As the dispersoid 520, the same fluid as the dispersion medium 12 in the optical member 10 shown in FIG. 10 can be used. As the material of the transparent magnetic nanoparticles 530, titanium-cobalt dioxide or the like can be used.

In the optical member 510, coils 540 for generating magnetic fields for causing magnetophoresis of magnetic nanoparticles 530 are provided in place of the electrodes (cathode 14 and anode 15) of the optical member 10 shown in FIG. 10. The coils 540 are an example of the electromagnetic field generator in accordance with the present invention and correspond to the magnetic field generator in accordance with the present invention.

Figure 43:
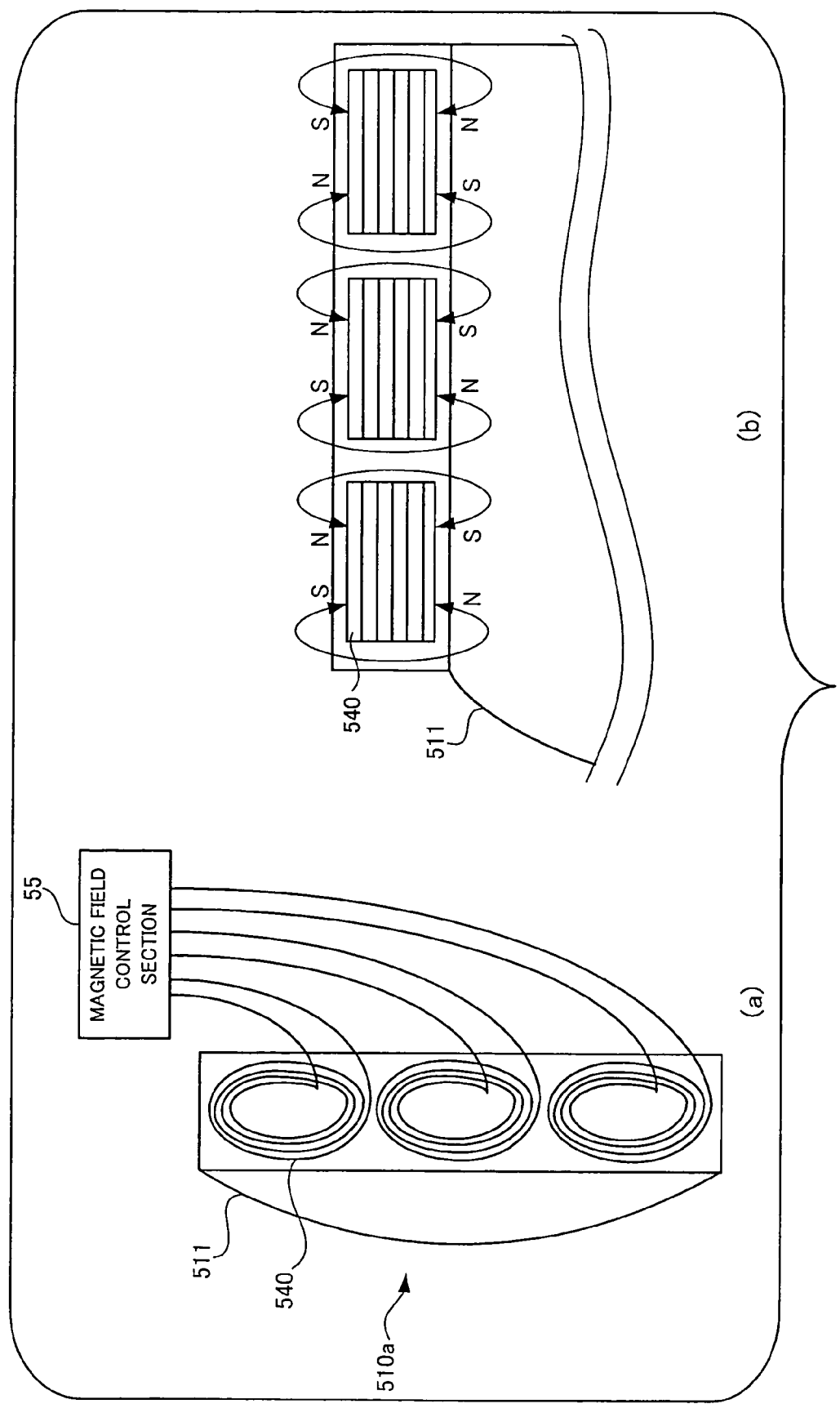
FIG. 43 schematically shows the optical member in FIG. 42.

FIG. 43 is a diagram schematically showing the construction of the optical member 510 shown in FIG. 42.

Part (a) of FIG. 43 shows a top view of the optical member 510.

Three wound coils 540 are placed side by side on upper and lower surfaces of the container 511. A magnetic field control section 55 for controlling magnetic fields generated from the coils 540 by causing currents to flow through the coils 540 are connected to the coils 540.

Part (b) of FIG. 43 shows an enlarged view of the optical member 510 in the vicinity of the coils 540.

For example, the magnetic field control section 55 shown in part (a) of FIG. 43 supplies currents in the same direction to the three coils 540. Magnetic fields are thereby generated through the three coils 540. That is, magnetic fields in which north and south poles are alternately arranged are applied to the container 511, as shown in part (b) of FIG. 43. The polarity of each of the magnetic fields applied from the coils 540 to the container 511 for magnetophoresis of magnetic nanoparticles 530 may be either of the north pole and the south pole. Also, the directions of the currents supplied to the three coils 540 may be different from each other. The magnitudes of the magnetic fields applied from the magnetic field generation section 540 to the container 511 and the regions through which the magnetic fields are applied can be accurately controlled by individually adjusting the directions and magnitudes of the currents supplied to the three coils 540.

A further description will be made by referring again to FIG. 42.

When no magnetic fields are generated by the coils 540, the magnetic nanoparticles 530 are uniformly dispersed in the dispersion medium 520, as shown in part (a) of FIG. 42.

When currents are supplied to the coils 540 by the magnetic field control section 55 shown in part (a) of FIG. 43, magnetic fields according to the directions and magnitudes of the supplied currents are generated by the coils 540. The magnetic nanoparticles 530 uniformly dispersed in the dispersion medium 520 are attracted by the magnetic forces of the coils 540 to reduce the refractive index of the optical member 510, as shown in part (b) of FIG. 42.

Thus, the refraction of light passing through the optical member 510 can be controlled by effecting magnetophoresis of the dispersoid dispersed in the dispersion medium instead of electrophoresis.

Figure 44:
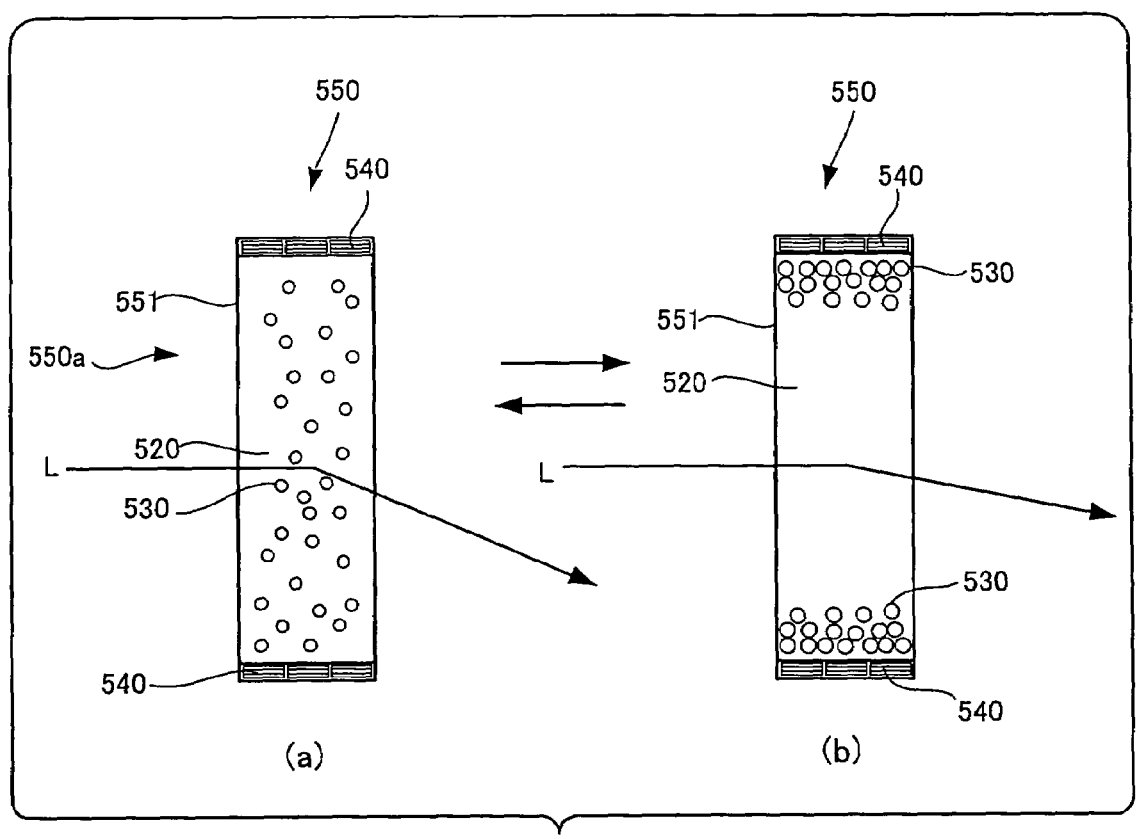
FIG. 44 is a diagram showing a sectional configuration of an optical member having a flat plate shape in which the refraction of light is changed by causing magnetophoresis of a dispersoid.

FIG. 44 is a diagram showing a sectional configuration of an optical member in the form of a flat plate capable of changing the refraction of light by effecting magnetophoresis of a dispersoid. Here, explanation will be made on the case in which the light L enters the optical member from the left side of FIG. 44 where the light source is disposed.

The optical member 550 shown in FIG. 44 has a container 551 in the form of a flat plate similar to the container 311 of the optical member 310 shown in FIG. 38. The container 551 has a transparent dispersion medium 520 and a transparent magnetic nanoparticles 530 enclosed therein, as does the container of the optical member 510 shown in FIG. 42.

Coils 540 for generating magnetic fields for magnetophoresis of nanoparticles 530 are placed in such a position on the container 551 as to surround a light passage region 550a, as are those in the optical member 510 shown in FIG. 30.

When no magnetic fields are generated by the coils 540, the nanoparticles 530 are uniformly dispersed in the dispersion medium 520, as shown in part (a) of FIG. 44. In this state, the optical member 550 has a comparatively high refractive index resulting from the refractive index of the dispersion medium 520 and the amount (number) of nanoparticles 530 uniformly dispersed in the dispersion medium 520. Therefore, the light L incident on the optical member 550 has relatively large refraction.

When currents are supplied to the coils 540, magnetic fields are generated by the coils 540. The magnetic nanoparticles 530 are attracted by the magnetic fields generated by the coils 540, as shown in part (b) of FIG. 44. In this state, therefore, the optical member 550 has a comparatively low refractive index determined by the refractive index of the dispersion medium 520 only. Thus the light incident on the optical member has smaller refraction than the state shown in part (a) of FIG. 44. When the supply of the currents to the coils 540 is stopped, the optical member 550 is again settled in the state shown in part (a) of FIG. 44.

Thus, a variable-refractive-index plate capable of changing the focal length can also be formed in a magnetophoretic optical element.

Figure 45:
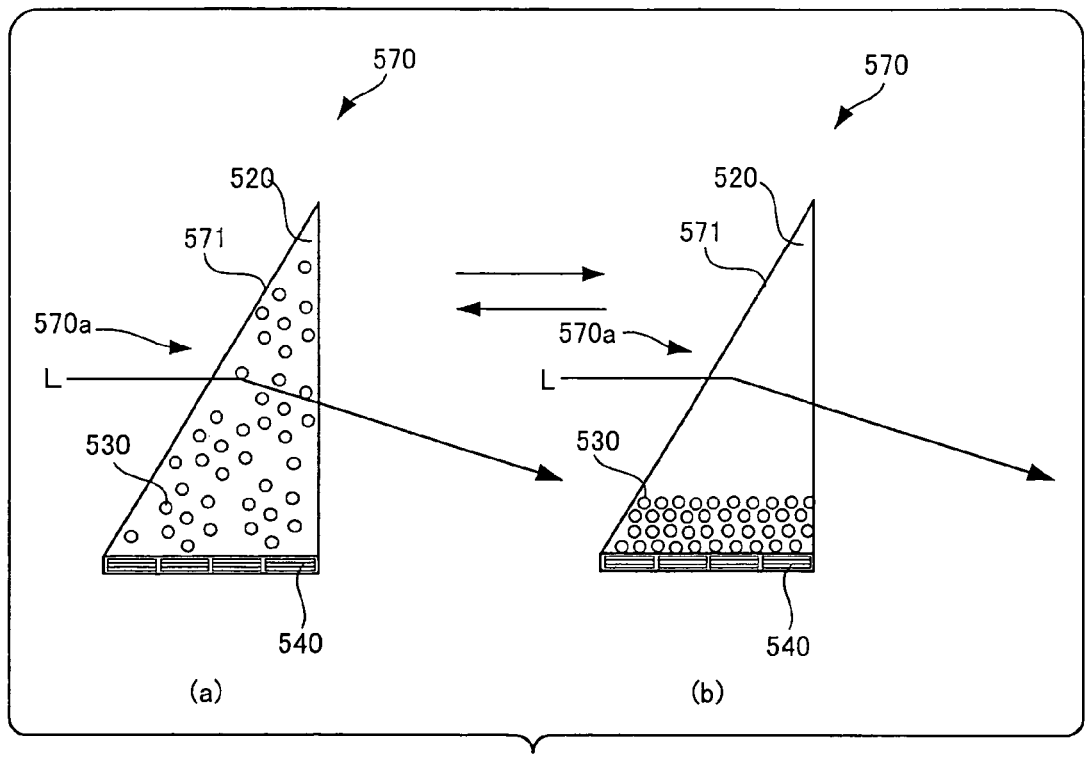
FIG. 45 is a diagram showing a sectional configuration of an optical member having a prism shape in which the refraction of light is changed by causing magnetophoresis of a dispersoid.
Figure 46:
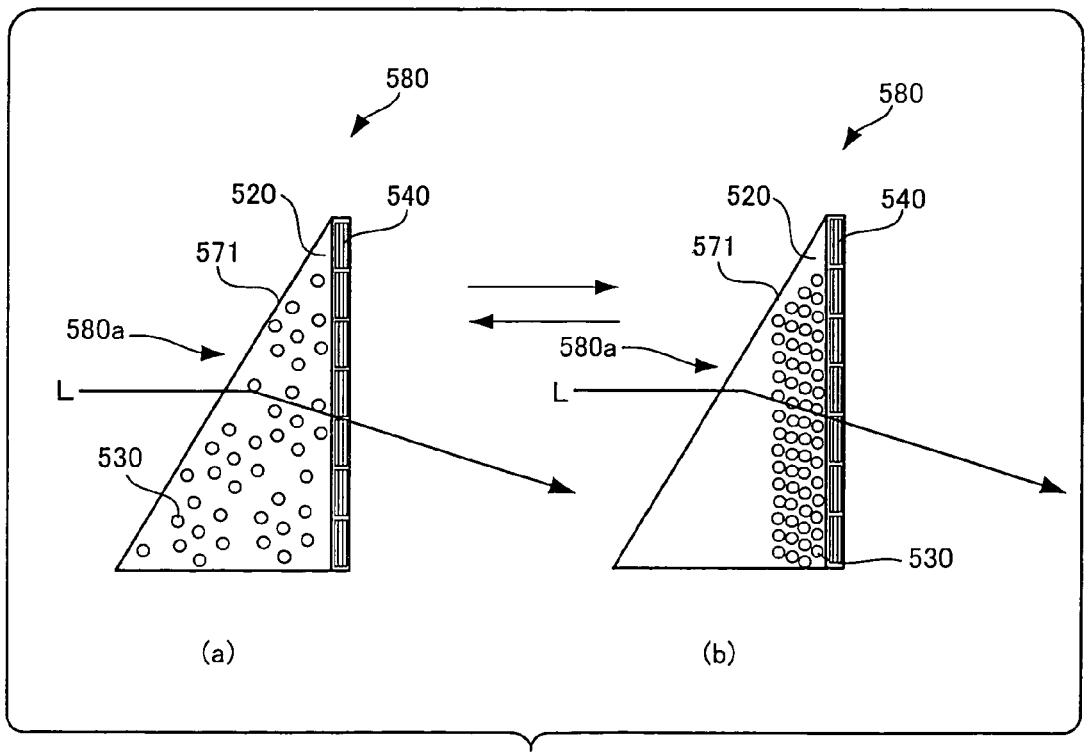
FIG. 46 is a diagram showing a sectional configuration of an optical member having a prism shape in which the refraction of light is changed by causing magnetophoresis of a dispersoid.

FIG. 45 and FIG. 46 are diagrams showing a sectional configuration of an optical member having a prism shape in which the diffraction of light is changed by effecting magnetophoresis of a dispersoid. Also in FIGS. 45 and 46, the light L enters the optical member from the left side of FIGS. 45 and 46 where the light source is disposed.

An optical member 570 shown in FIG. 45 has a container 571 having a prism shape similarly to the optical member 410 in FIG. 40 and has a transparent dispersion medium 520 and transparent magnetic nanoparticles 530 enclosed in the container 571. In addition, in the optical member 570, coils 540 are provided in such a position as not to block the light passage region 570a.

When no magnetic fields are generated by the coils 540, the nanoparticles 530 are uniformly dispersed in the dispersion medium 520, as shown in part (a) of FIG. 45. In this state, the optical member 570 has a comparatively high refractive index resulting from the refractive index of the dispersion medium 520 and the amount (number) of nanoparticles 530 uniformly dispersed in the dispersion medium 520. Therefore, the light L incident on the optical member 550 has relatively large refraction.

When magnetic fields are generated by the coils 540, the magnetic nanoparticles 530 that have been uniformly dispersed in the dispersion medium 520 are now attracted by the magnetic fields generated by the coils 540. This causes the refractive index of the optical member 570 to be determined by the refractive index of the dispersion medium 520 only, which is smaller than the state shown in part (b) of FIG. 45, and thus the light incident on the optical member has smaller refraction than the state shown in part (a) of FIG. 45.

Therefore, a variable refractive-index prism capable of changing the focal length can also be formed in a magnetophoretic optical element.

An optical member 580 has the same configuration as the optical member 570 shown in FIG. 45, but is different in that the coil 540 is disposed on the back surface of the light passage region 560a.

When predetermined electric current is applied to the coils 540, the magnetic nanoparticles 530 that have been uniformly dispersed in the dispersion medium 520 are attracted to the side of the coils 540, which consequently increases the refraction index of the optical member 580 and thus enlarges refraction of the light incident on the optical member 580.

Thus, by disposing the coil on the back surface of the light passage region, refraction index of the optical member can be increased.

If plural small coils are placed in a stripe pattern, a magnetic field pattern similar to the electric field pattern in the case of use of the cathode 141 shown in part (a) of FIG. 25 can be formed. If plural coils differing in size are placed on concentric circles, a magnetic field pattern similar to the electric field pattern in the case of use of the cathode 142 shown in part (b) of FIG. 25 can be formed. If small coils are arranged in matrix form, a magnetic field pattern similar to the electric field pattern in the case of use of the cathode 143 shown in FIG. 25 can be formed.

While the coils capable of generating magnetic fields by being supplied with currents have been described as an example of the magnetic field generator in accordance with the present invention, the magnetic field generator in accordance with the present invention may be a permanent magnet which generates a magnetic field by itself. In such a case, magnetophoresis of the dispersoid is realized by moving the permanent magnet.

In the above description of the optical members effecting magnetophoresis has been made. Now, an AF auxiliary light emitting device which is a third embodiment of the light emitting unit will be described.

Figure 47:
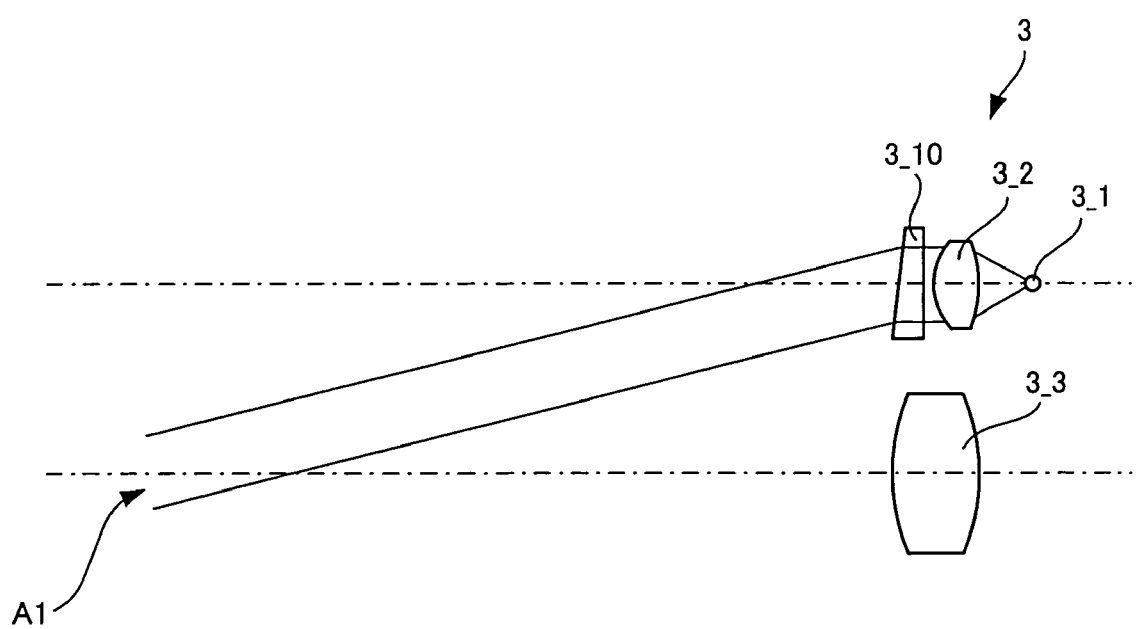
FIG. 47 is a diagram showing a sectional configuration of an AF auxiliary light emitting device which is a third embodiment of the light emitting unit of the present invention.
Figure 48:
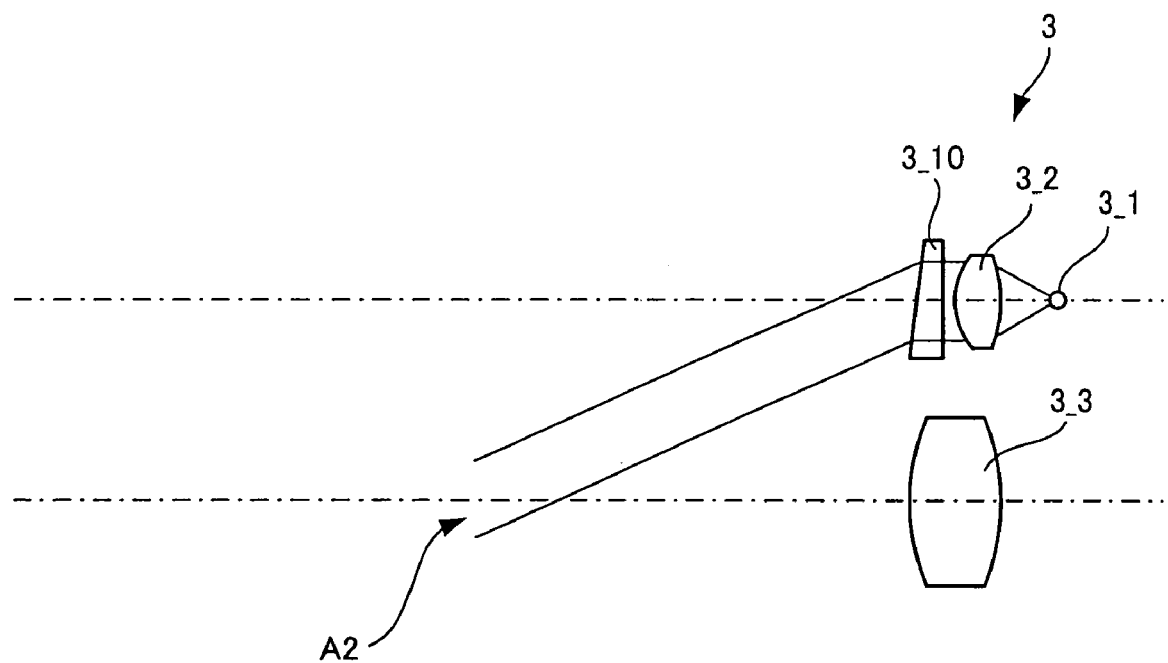
FIG. 48 is a diagram showing a state in which the direction in which distance-measuring auxiliary light is output is controlled for radiation to a short distance in the AF auxiliary light emitting device shown in FIG. 47.

FIG. 47 is a diagram showing a sectional configuration of the AF auxiliary light emitting device 3 which is the third embodiment of the light emitting unit of the present invention. FIG. 48 is a diagram showing a state in which the direction in which distance-measuring auxiliary light is output is controlled for radiation to a short distance in the AF auxiliary light emitting device 3 shown in FIG. 47.

The AF auxiliary light emitting device 3 shown in FIG. 47 is a device for assisting an automatic focusing (AF) function by emitting distance-measuring auxiliary light at the time of picture taking under low illumination. The AF auxiliary light emitting device 3 has a light source 3_1, a projection lens 3_2 provided in front of the light source 3_1 and an optical member 3_10 formed as a wedge prism for projecting light from the projection lens 3_2 in a predetermined output direction. A picture taking lens 3_3 is provided below the AF auxiliary light emitting device 3.

Light emitted from the light source 3_1 constituting the AF auxiliary light emitting device 3 is collected by the projection lens 3_2 to enter the optical member 3_10. The optical member 3_10 can be controlled so that the refractive index is changed in two steps. When the optical member 3_10 is controlled so that the refractive index is low, distance-measuring auxiliary light output from the optical member 3_10 reaches a point at a long distance from the light emitting device, and can illuminate a subject A1 at the long distance, as shown in FIG. 48. When the optical member 3_10 is controlled so that the refractive index is high, distance-measuring auxiliary light output from the optical member 3_10 reaches a point at a short distance from the light emitting device, and can illuminate a subject A2 at the short distance, as shown in FIG. 48.

Distance-measuring auxiliary light radiated to the subject and reflected by the subject travels via the picture taking lens 3_3 and a focusing lens (not shown) to enter an image pickup device (charge-coupled device (CCD)). The image pickup device produces an image signal from the light. A focusing operation is performed on the basis of this image signal. In this focusing operation, continuous AF processing based on a so-called "mountain climbing method" for example is performed. That is, an in-focus position is determined in such a manner that the focusing lens is gradually moved to a position corresponding to the maximum of an evaluated focus value while moving the focusing lens in small steps forward and rearward along the optical axis and checking the direction of increase/reduction in the evaluated focus value.

The AF auxiliary light emitting device 3 is placed above the optical axis of the picture taking lens 3_3, but it irradiates a subject with distance-measuring auxiliary light by controlling the refractivity of the optical member 3_10. Therefore, any hindrance to the AF operation due to the influence of a parallax can be prevented even in the case of irradiating a subject at a short distance with distance-measuring auxiliary light. Also, there is no need to use a larger light source for emitting distance-measuring auxiliary light. The AF auxiliary light emitting device 3 can be designed so as to be smaller in size while limiting the power consumption.

As a characteristic of the optical member used in the present invention, a low liability to deterioration of the performance can be expected in comparison with a lens constituted by an electroconductive aqueous solution and a fluid having an insulating property. In the above-described lens, there is a possibility of the performance of the lens being deteriorated due to occurrence of bubbles when the temperature rises closer to the boiling point of water. In a case where silicone oil is suitably used as a dispersion medium free from decomposition or deterioration by heat in the optical member used in the present invention, limitation of the deterioration of the lens performance can be expected even when the temperature rises to a point in the vicinity of 300° C.

Basic embodiments for implementation of the concept of the present invention have been described. For practical use of the optical member used in the present invention, however, it is preferable to use a device for preventing foreign materials or water droplets from being attached to a portion on the optical axis to cause a deterioration of the lens performance.

For example, it is preferable to apply a water-repellent coating on an external surface intersecting the optical path of the container containing a fluid (which surface hereinafter referred to as "light-transmissive surface"). If the light-transmissive surface is given water repellency, attachment of foreign materials and water droplets or the like is prevented and high transmissivity of the optical element can be maintained. As a material constituting this water-repellent coating, a silicone resin, a block copolymer of organopolysiloxane, a fluorine-based polymer, polytetrafluoroethane and the like are preferred.

It is also preferable to apply a hydrophilic film on the light-transmissive surface of the container constituting the optical member. Attachment of foreign materials to the light-transmissive surface can also be prevented by giving a hydrophilicity and oil repellency to the light-transmissive surface. As the hydrophilic film, a film formed of an acrylate polymer, a film coated with a surfactant such as a nonionic organosilicone-based surfactant and the like are preferred. As a method of making the hydrophilic film, plasma polymerization of a silane monomer, ion beam processing or the like may be used.

It is also preferable to apply a photocatalyst on the light-transmissive surface of the container constituting the optical member. The photocatalyst reacting with light decomposes a contamination or the like to keep the light-transmissive surface clean.

Further, it is preferable to apply an antistatic film on the light-transmissive surface of the container constituting the optical member. If static electricity is accumulated on the light-transmissive surface of the container, or if the light-transmissive surface is charged through the electrodes, there is a possibility of foreign materials and dust sticking to the light-transmissive surface. Attachment of such unnecessary materials can be prevented by applying an antistatic film on the light-transmissive surface, thereby maintaining the transmissivity of the optical member. Preferably, the antistatic film is formed of a polymer alloy-based material. Particularly preferably, the polymer alloy-based material is a polyether-based material, polyether ester amide-based material, a material having a cationic group, or REOLEX (commercial name, DAI-ICHI KOGYO SEIYAKU CO., LTD.). Preferably, the antistatic film is made by a mist method.

An antifouling material may be used for the container constituting the optical member. A fluororesin is preferred as the antifouling material. More specifically, a fluorine-containing alkyl alkoxysilane compound, a fluoroalkyl group-containing polymer or oligomer and the like are preferred. One having a functional group crosslinkable to the above-mentioned curable resin is particularly preferred. Preferably, the amount of addition of the antifouling material is set to the minimum necessary for the desired antifouling effect.

Figure 49:
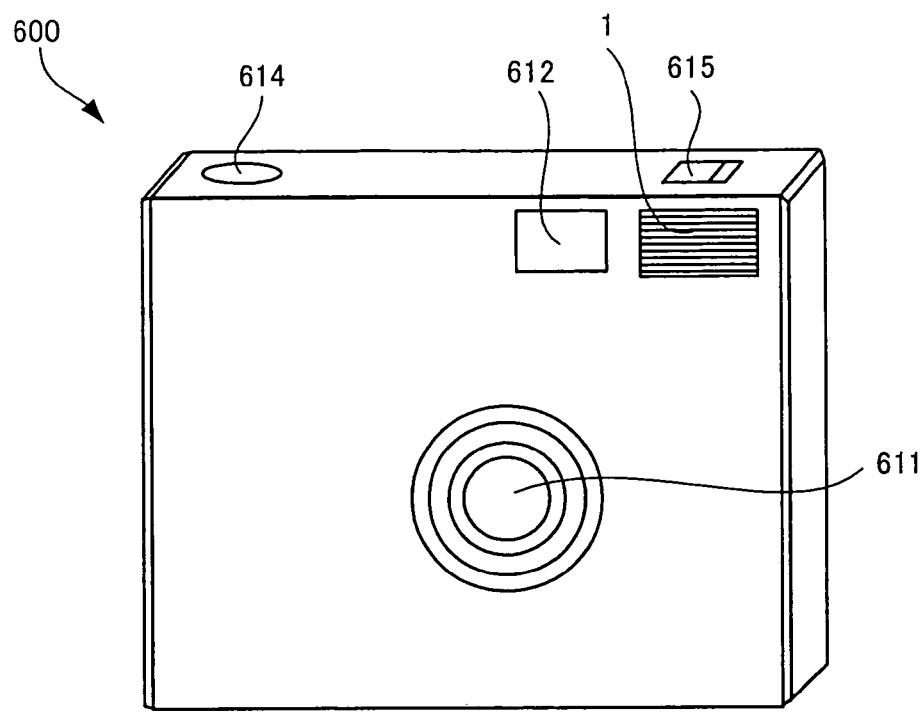
FIG. 49 is a front perspective view obliquely from above of an external appearance of a digital camera in which the light emitting unit in the first embodiment of the present invention is incorporated.
Figure 50:
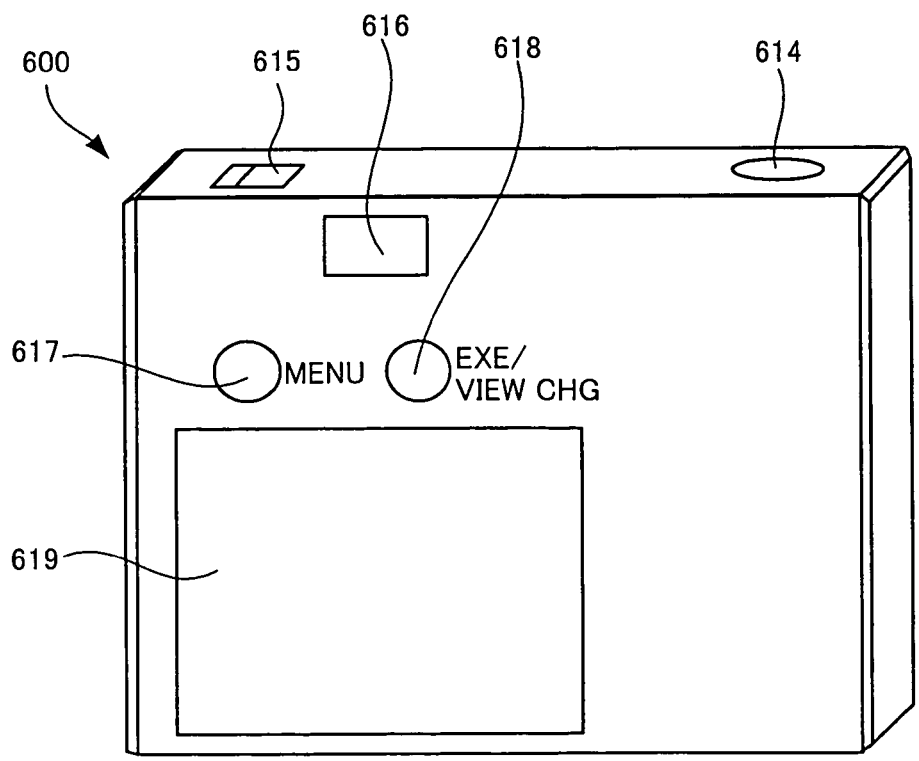
FIG. 50 is a rear perspective view obliquely from above of an external appearance of the digital camera shown in FIG. 49.

FIG. 49 is a front perspective view obliquely from above of an external appearance of a digital camera in which the light emitting unit in the first embodiment of the present invention is incorporated. FIG. 50 is a rear perspective view obliquely from above of an external appearance of the digital camera shown in FIG. 49.

As shown in FIG. 49, a picture taking lens 311 is provided in a central front portion of the digital camera 600. An optical finder objective window 612 and the flashlight unit 1 described above with reference to FIG. 1 are provided in upper front portions of the digital camera 600. A shutter button 614 and a slide-type power switch 615 are provided in upper surface portions of the digital camera 600.

Further, an optical finder ocular window 616, a menu switch 617, an execution/view change switch 618 and an image monitor. 619 are provided in rear surface portions of the digital camera 600, as shown in FIG. 50.

Figure 51:
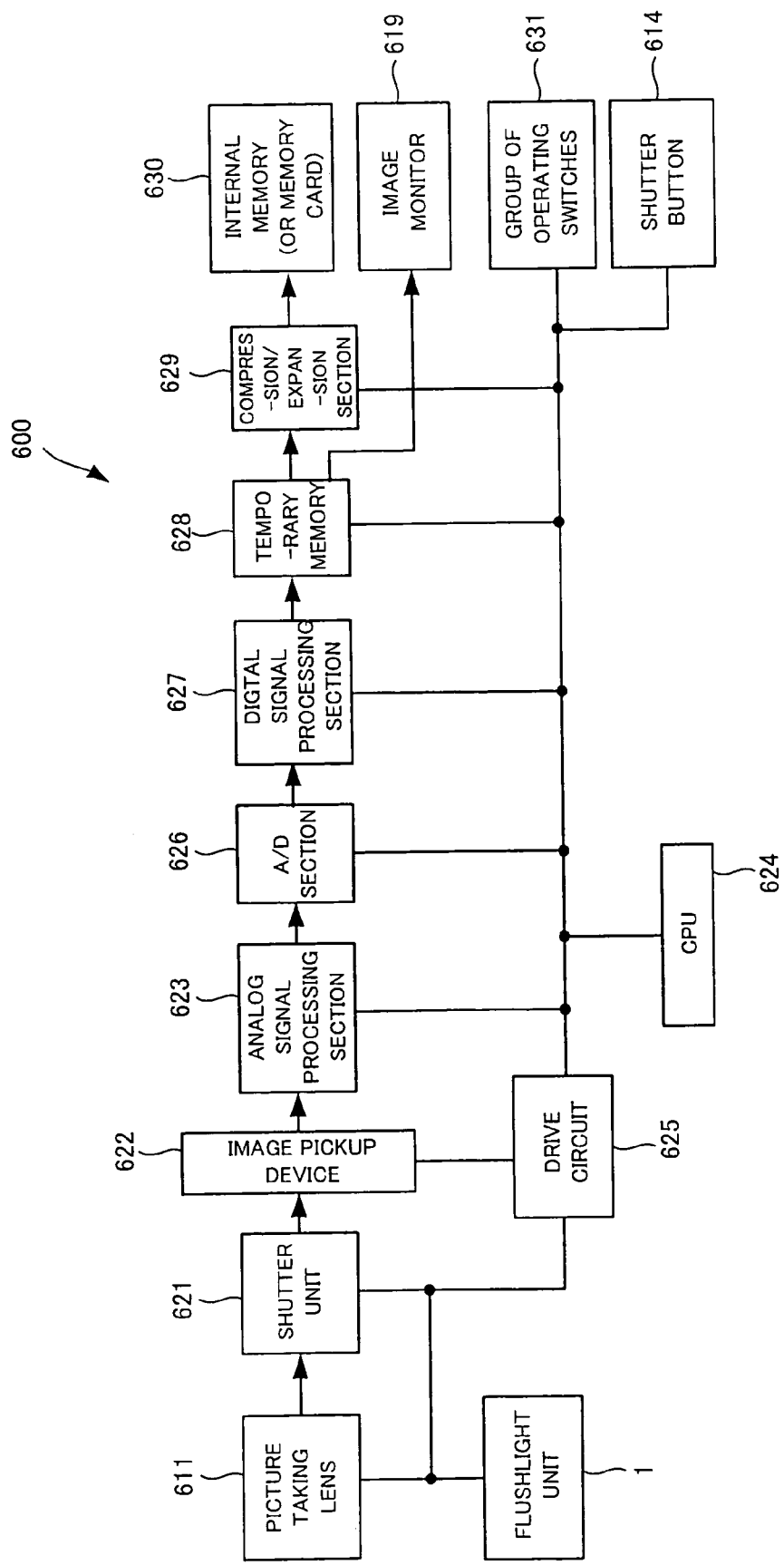
FIG. 51 is a block diagram showing a circuit configuration of the digital camera shown in FIG. 49.
Figure 52:
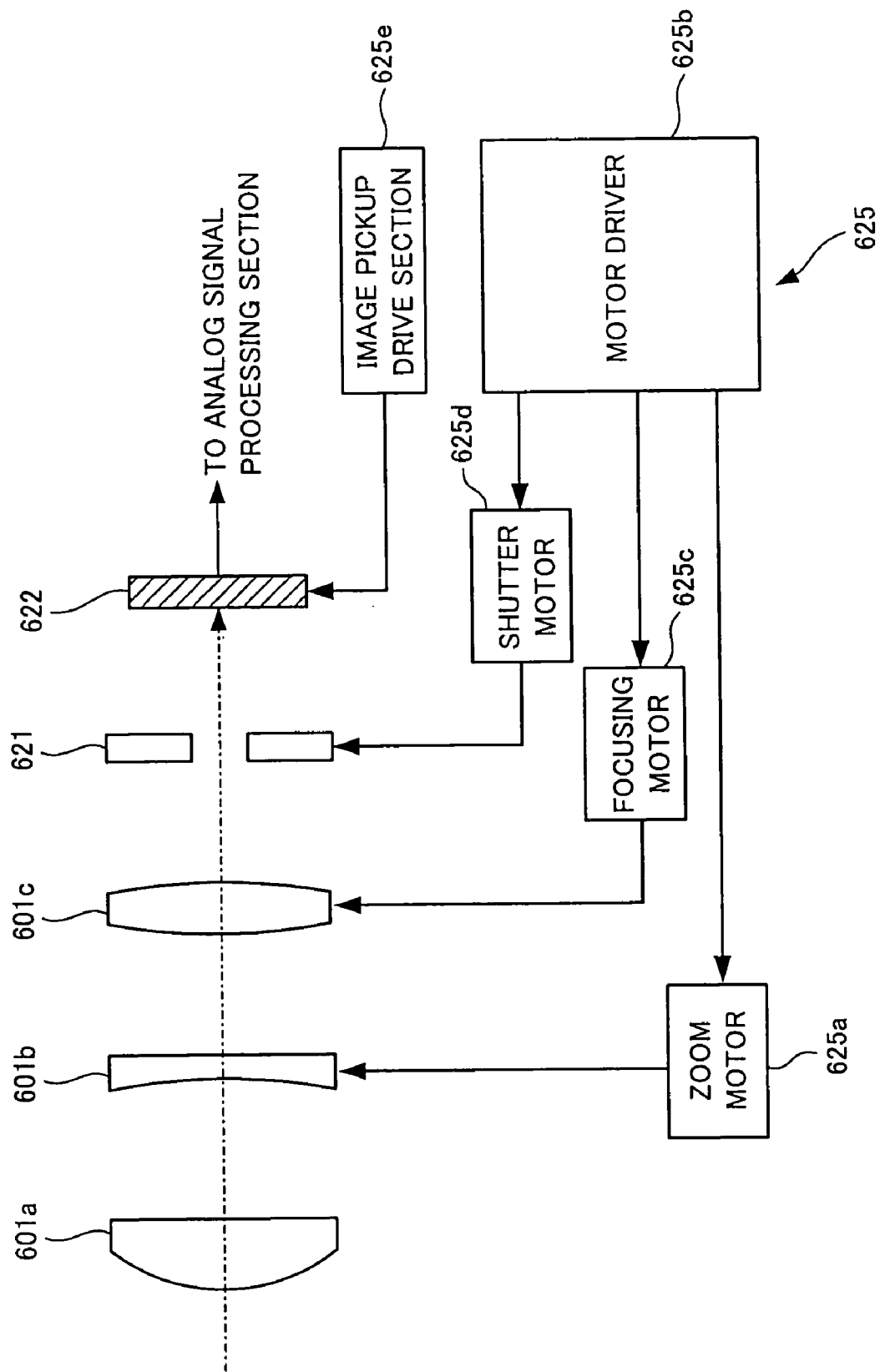
FIG. 52 is a diagram showing the placement and configuration of a picture taking lens, a shutter unit, an image pickup device and a drive circuit shown in FIG. 51.

FIG. 51 is a block diagram showing a circuit configuration of the digital camera shown in FIG. 49. FIG. 52 is a diagram showing the placement and configuration of a picture taking lens, a shutter unit, an image pickup device and a drive circuit shown in FIG. 51.

The digital camera 600 has the picture taking lens 611 and the flashlight unit 1. The digital camera 600 also has the shutter unit 621, the image pickup device (CCD) 622, an analog signal processing section 623, a CPU 624 for performing overall control of the digital camera 600, the drive circuit 625, and an analog/digital (AD) section 626. The drive circuit 625 drives the flashlight unit 1 so that the flashlight distribution angle is changed in two steps according to a picture taking situation. The picture taking lens 611 includes a front lens group 601a, a rear lens group 601b and a focusing lens 601c. The drive circuit 625 includes a zoom motor 625a for driving the rear lens group 601b, a focusing motor 625c for driving the focusing lens 601c, and a shutter motor 625d for driving the shutter unit 621. The drive circuit 625 further includes a motor driver 625b for applying voltages to the zoom motor 625a, the focusing motor 625c and the shutter motor 625d, and an image pickup device drive section 625e for driving the image pickup device 622.

Subject light coming in via the picture taking lens 611 and the shutter unit 621 enters the image pickup device 622. The image pickup device 622 converts the subject light into an electrical signal, i.e., an analog image signal, and outputs this signal to the analog signal processing section 623.

The analog signal processing section 623 performs processing including noise reduction processing on the analog image signal output from the image pickup device 622, and outputs the processed analog image signal to the A/D section 626. The A/D section 626 performs A/D (analog/digital) conversion processing on the analog image signal and outputs a digital image signal obtained by the conversion processing.

The digital camera 600 also has a digital signal processing section 627, a temporary memory 628, a compression/expansion section 629, an internal memory (or a memory card) 630 and the above-mentioned image monitor 319. The digital image signal converted by A/D conversion processing in the A/D section 626 is input to the digital signal processing section 627. The digital signal processing section 627 performs predetermined digital signal processing on the input digital image signal to complete image data representing the subject image of the present imaged scene, and temporarily stores the image data in the temporary memory 628. The data stored in the temporary memory 628 is compressed by the compression/expansion section 629 and is thereafter recorded in the internal memory (or memory card) 630. In some picture taking mode, the data may be directly recorded in the internal memory 630 without undergoing the compression step. The data stored in the temporary memory 628 is read out to the image monitor 619 to enable the subject image to be displayed on the image monitor 619.

The digital camera 600 further has an operating switch section 331 including the menu switch 617 and the execution/view change switch 618, and the shutter button 614. When a picture is taken, the operating switch section 631 is operated to set the system in a desired picture taking condition, and the shutter button 614 is depressed. Since the above-described flashlight unit 1 is provided in the digital camera 600, the flashlight output angle can be controlled with high accuracy over a long time period by the light emitting unit provided in a compact configuration.

In the above description, only one embodiment of the image taking apparatus of the present invention being applied to a digital camera has been described, but it may be also applied to a silver-salt camera and a portable phone.

What is claimed is:
1. A light emitting unit comprising:
a light source; and
an optical member provided in front of the light source, the optical member outputting light emitted from the light source by expanding the light through a predetermined output angle and/or by setting the direction of output of the light to a predetermined output direction, the optical member having:
a container which is light-transmissive at least in a light passage region;
a light-transmissive dispersion medium enclosed in the container;

a dispersoid which is dispersed in the dispersion medium, which is light-transmissive, and which has a refractive index different from the refractive index of the dispersion medium; and an electromagnetic field generator controlling the output angle and/or the output direction of the light emitted from the light source and passing through the light passage region by moving the dispersoid dispersed in the dispersion medium using electromagnetic force.

2. The light emitting unit according to claim 1, wherein the electromagnetic field generator is an electrode which causes electrophoresis of the dispersoid.

3. The light emitting unit according to claim 2, wherein the dispersoid comprises titanium oxide.

4. The light emitting unit according to claim 2, wherein the dispersoid comprises alumina.

5. The light emitting unit according to claim 2, wherein the dispersion medium is an organic dispersion medium.

6. The light emitting unit according to claim 2, wherein the dispersion medium is a hydrocarbon-based organic dispersion medium.

7. The light emitting unit according to claim 2, wherein an inner surface of the electrode is coated with an insulating film, and the insulating film is placed in contact with the dispersion medium.

8. The light emitting unit according to claim 7, wherein the insulating film is a polyimide insulating film.

9. The light emitting unit according to claim 1, wherein the dispersoid is magnetic and the electromagnetic field generator is a magnetic field generator which causes magnetophoresis of the dispersoid.

10. The light emitting unit according to claim 9, wherein the dispersoid comprises titanium-cobalt oxide.

11. The light emitting unit according to claim 1, further comprising a reflector which is provided at the rear of the light source, and which reflects toward the optical member the light emitted from the light source and traveling rearward.

12. The light emitting unit according to claim 1, wherein at least the light passage region of the container comprises a container having the shape of a lens having a positive refractive power.

13. The light emitting unit according to claim 1, wherein at least the light passage region of the container comprises a container having the shape of a lens having a negative refractive power.

14. The light emitting unit according to claim 1, wherein at least the light passage region of the container comprises a container having the shape of an aspheric lens.

15. The light emitting unit according to claim 1, wherein at least the light passage region of the container comprises a container having the shape of a wedge.

16. The light emitting unit according to claim 1, wherein the dispersoid comprises nonoparticles.

17. The light emitting unit according to claim 1, wherein the dispersoid comprises nanoparticles having a particle size of approximately 5 nm to 100 nm.

18. The light emitting unit according to claim 1, wherein the dispersion medium comprises water.

19. The light emitting unit according to claim 1, wherein at least the light passage region of the container is formed by a plastic.

20. An image taking apparatus comprising the light emitting unit according to claim 1, wherein an image taking operation is performed by using subject light from a subject irradiated by the light, the output angle and/or the output direction of which is controlled in the light emitting unit.

21. The image taking apparatus according to claim 20, wherein the subject light is used for detecting an in-focus position to focus on the subject.

22. The image taking apparatus according to claim 20, wherein the subject light is used for an actual image taking operation to obtain an image of the subject.

* * * * *